US 011722070B2

(12) United States Patent
Chen et al.

(10) Patent No.: US 11,722,070 B2
(45) Date of Patent: Aug. 8, 2023

(54) ALTERNATING CURRENT TO DIRECT CURRENT CONVERSION CIRCUIT

(71) Applicant: SILERGY SEMICONDUCTOR TECHNOLOGY (HANGZHOU) LTD, Zhejiang (CN)

(72) Inventors: Wei Chen, Zhejiang (CN); Chen Zhao, Zhejiang (CN)

(73) Assignee: SILERGY SEMICONDUCTOR TECHNOLOGY (HANGZHOU) LTD, Zhejiang (CN)

( * ) Notice: Subject to any disclaimer, the term of this patent is extended or adjusted under 35 U.S.C. 154(b) by 0 days.

(21) Appl. No.: 17/552,905

(22) Filed: Dec. 16, 2021

(65) Prior Publication Data

US 2022/0190738 A1 Jun. 16, 2022

(30) Foreign Application Priority Data

Dec. 16, 2020 (CN) .......................... 202011483022.X

(51) Int. Cl.
*H02M 7/49* (2007.01)
*H02M 7/217* (2006.01)
*H02M 7/12* (2006.01)
*H02M 1/00* (2006.01)
*H02M 1/14* (2006.01)
(Continued)

(52) U.S. Cl.
CPC ............. *H02M 7/12* (2013.01); *H02M 1/007* (2021.05); *H02M 1/143* (2013.01); *H02M 1/4233* (2013.01); *H02M 3/07* (2013.01); *H02M 7/2176* (2013.01); *H02M 7/49* (2013.01)

(58) Field of Classification Search
CPC .............................. H02M 7/2176; H02M 7/49
USPC ............................................................. 363/65
See application file for complete search history.

(56) References Cited

U.S. PATENT DOCUMENTS

2013/0285628 A1 10/2013 Giannopoulos et al.
2015/0171763 A1 6/2015 Kondo et al.
(Continued)

FOREIGN PATENT DOCUMENTS

CN 101039078 A 9/2007
CN 106451710 A 2/2017
(Continued)

OTHER PUBLICATIONS

Kawa, "The flying-capacitor SEPIC converter with the balancing circuit" Archives of Electrical Engineering, vol. 65(3), 2016, pp. 411-424.
(Continued)

*Primary Examiner* — Gary A Nash
(74) *Attorney, Agent, or Firm* — Cantor Colburn LLP

(57) ABSTRACT

An alternating current to direct current conversion circuit includes N first power converters instead of a boost circuit including a power switch with a high withstand voltage. The N first power converters each have an input end and theses input ends are connected in series, to perform power factor correction. Therefore, the alternating current to direct current conversion circuit includes no power switch with a high withstand voltage, so that the alternating current to direct current conversion circuit has a small volume, low switching loss, less energy loss, and good heat dissipation, thereby increasing power density.

18 Claims, 35 Drawing Sheets

(51) Int. Cl.
  *H02M 1/42* (2007.01)
  *H02M 3/07* (2006.01)

(56) References Cited

U.S. PATENT DOCUMENTS

| | | | | |
|---|---|---|---|---|
| 2015/0372614 | A1* | 12/2015 | Yamada | H02M 3/156 363/89 |
| 2017/0237339 | A1* | 8/2017 | Young | H02M 1/4225 363/126 |
| 2018/0183335 | A1* | 6/2018 | Fan | H02M 3/01 |
| 2018/0269779 | A1 | 9/2018 | Wang et al. | |
| 2020/0379496 | A1 | 12/2020 | Wang et al. | |

FOREIGN PATENT DOCUMENTS

| | | |
|---|---|---|
| CN | 106532888 A | 3/2017 |
| CN | 106849639 A | 6/2017 |
| CN | 107231097 A | 10/2017 |
| CN | 110212741 A | 9/2019 |
| JP | H08214546 A | 8/1996 |

OTHER PUBLICATIONS

CNIPA First Office Action for corresponding CN Application No. 202011481149.8; dated Sep. 16, 2021.
CNIPA First Office Action for corresponding CN Application No. 202011483022.X; dated Sep. 3, 2021.
Qin et al., "A 99.1% Efficient, 490 W/in3 Power Density Power Factor Correction Front End Based on a 7-Level Flying Capacitor Multilevel Converter"; Dept of Electrical & Computer Engineering, Univ of Illinois Urbana-Campaign; 2018; pp. 729-736.
You et al., "A Family of Un-isolated Modular DC/DC Converters", IEEE, 8th International Power Electronics and Motion Control Conference (IPEMC-ECCE Asia), 2016, 8 pages.
Li et al., "Novel Family of Single-Stage Three-Level AC Choppers"; IEEE Transactions on Power Electronics, vol. 26, No. 2, Feb. 2011; pp. 504-511.
Tang et al., "Detection and identification of power switch failures for fault-tolerant operation of flying capacitor Buck-boost converters", Microelectronics Reliability; 2018; 6 pages.
CNIPA The Second Office Action for corresponding CN Application No. 202011481149.8; dated May 7, 2022.

\* cited by examiner

ALTERNATING CURRENT TO DIRECT CURRENT CONVERSION CIRCUIT

CROSS REFERENCE TO RELATED APPLICATIONS

The present application claims priority under 35 U.S.C. § 119 to Chinese Patent Application No. 202011483022.X, titled "ALTERNATING CURRENT TO DIRECT CURRENT CONVERSION CIRCUIT", filed on Dec. 16, 2020, the entire content of which is incorporated herein.

FIELD

The present disclosure relates to the field of power electronics, and in particular to an alternating current to direct current conversion circuit.

BACKGROUND

With the development of society, various electrical appliances are used to meet personal deeds. Some electrical appliances only operate under direct current (DC) power, and thus an alternating current (AC) to direct current (DC) conversion device is required to convert AC power into DC power applicable to an electrical appliance, so as to drive the electrical appliance. An AC to DC conversion circuit according to the conventional technology includes a rectifier circuit, a boost circuit and a flyback circuit. An input end of the rectifier circuit receives an inputted AC voltage. An output end of the rectifier circuit is coupled to an input end of the boost circuit. An output end of the boost circuit is coupled to an input end of the flyback circuit. An output end of the flyback circuit is coupled to a load. The rectifier circuit converts AC power into DC power. The boost circuit performs power factor correction. The flyback circuit generates DC power applicable to the load, so as to drive the load.

According to the conventional technology, the boost circuit is coupled to the output end of the rectifier circuit. Therefore, the boost circuit generally includes a power switch implemented by a high-voltage device (for example, a device with a withstand voltage of 600V) to adapt to a common inputted AC voltage (which ranges from 90 Vac to 264 Vac). Compared with a low-voltage device (for example, a device with a withstand voltage of 48V), the high-voltage device has a larger volume, so that the AC to DC conversion circuit has a large volume and low power density. Further, at a same switching frequency, the high-voltage device has much greater switching loss than the low-voltage device, resulting in more energy loss.

SUMMARY

In view of this, an AC to DC conversion circuit is provided according to the present disclosure, to solve the technical problem that the circuit according to the conventional technology has the low power density and the high energy loss due to a power switch with a high withstand voltage.

An AC to DC conversion circuit is provided according to an embodiment of the present disclosure. The AC to DC conversion circuit includes a rectifier circuit, a first DC to DC conversion module and a second DC to DC conversion module. The rectifier circuit is configured to receive an AC input voltage, convert the AC input voltage into a DC input voltage, and output the converted DC input voltage. An input end of the first DC to DC conversion module is coupled to an output end of the rectifier circuit, and an output end of the first DC to DC conversion module is coupled to an input end of the second DC to DC conversion module, so that a waveform of an input current of the first DC to DC conversion module corresponds to a waveform of the DC input voltage, so as to perform power factor correction. The first DC to DC conversion module includes N first power converters each including an input end, and input ends of the N first power converters are connected in series to receive the DC input voltage, to reduce a voltage across the power switch in the first DC to DC conversion module, where N is a positive integer. An output end of the second DC to DC conversion module is coupled to a load, and the second DC to DC conversion module is configured to convert a signal outputted by the first DC to DC conversion module into a first output signal, to drive the load.

In an embodiment, the input ends of the N first power converters are connected in series between a high potential input terminal of the first DC to DC conversion module and a ground. The N first power converters each include an output end, and output ends of the N first power converters serve as N output ends of the first DC to DC conversion module correspondingly.

In an embodiment, each of the N first power converters is a non-isolated DC to DC converter.

In an embodiment, for each of the N first power converters, at least one power switch in the first power converter is controlled to be turned on, to reduce a voltage across each power switch.

In an embodiment, the AC to DC conversion circuit further includes N first control circuits configured to control the N first power converters, respectively. Each of the N first control circuits is configured to control a first power converter corresponding to the first control circuit to operate at a fixed frequency or a variable frequency.

In an embodiment, the AC to DC conversion circuit further includes N first control circuits. Each of the N first control circuits is configured to: generate a first duty cycle signal based on an output voltage sampling signal, an input voltage sampling signal and an inductor current sampling signal of a first power converter corresponding to the first control circuit; and generate a control signal based on the first duty cycle signal, to control each power switch in the first power converter to be turned on or off. The first duty cycle signal indicates a duty cycle of the power switch.

In an embodiment, each of the N first control circuits includes a voltage compensation module, a current reference signal generation module and a current compensation module. The voltage compensation module is configured to receive the output voltage sampling signal and a voltage reference signal, and generate a voltage compensation signal. The current reference signal generation module is configured to configured to receive the voltage compensation signal and the input voltage sampling signal, and generate a current reference signal. The current compensation module is configured to receive the current reference signal and the inductor current sampling signal, and output the first duty cycle signal. The current reference signal is positively correlated with a product of the voltage compensation signal and the input voltage sampling signal.

In an embodiment, each of the N first power converters includes at least one first power switch and at least one second power switch, the at least one first power switch is configured to be turned on or off simultaneously, the at least one second power switch is configured to be turned on or off simultaneously, and a switching state of the first power switch is complementary to a switching state of the second power switch.

In an embodiment, the first control circuit further includes a pulse-width modulation (PWM) generation module. The PWM generation module is configured to generate the control signal based on the first duty cycle signal, to control the power switch in the first power converter corresponding to the first control circuit to be turned on or off. The PWM generation module includes a conduction control circuit and a turn-off control circuit. The conduction control circuit is configured to determine, based on a clock signal, a time instant when the first power switch in the first power converter is turned on. The turn-off control circuit is configured to receive the first duty cycle signal and determine, based on the first duty cycle signal, a time instant when the first power switch in the first power converter is turned off. The conduction control circuit and the turn-off control circuit are further configured to control the second power switch in the first power converter, so that the switching state of the second power switch is complementary to the switching state of the first power switch.

In an embodiment, the AC to DC conversion circuit further includes N first control circuits configured to control the N first power converters, respectively. Each of the N first control circuits is configured to determine, for each power switch in a first power converter corresponding to the first control circuit and based on an output voltage sampling signal and an inductor current of the first power converter, a time instant when the power switch is turned on and a time instant when the power switch is turned off.

In an embodiment, each of the N first power converters includes at least one first power switch and at least one second power switch, all the at least one first power switch is configured to be turned on or off simultaneously, all the at least one second power switch is configured to be turned on or off simultaneously, and a switching state of the first power switch is complementary to a switching state of the second power switch.

In an embodiment, the first control circuit includes a conduction control circuit and a turn-off control circuit. The conduction control circuit is configured to receive the inductor current, and generate a conduction trigger signal when the inductor current is equal to zero, to control the at least one first power switch in the first power converter corresponding to the first control circuit to be turned on. The turn-off control circuit is configured to receive the output voltage sampling signal and a first proportional coefficient, generate a conduction duration signal, and determine, based on the conduction duration signal, a time instant when the at least one first power switch in the first power converter is turned off. The conduction control circuit and the turn-off control circuit are further configured to control the second power switch in the first power converter, so that the switching state of the second power switch is complementary to the switching state of the first power switch.

In an embodiment, the turn-off control circuit includes a voltage compensation circuit, a conduction duration generation circuit and a conduction duration timer. The voltage compensation circuit is configured to receive the output voltage sampling signal and a voltage reference signal, and generate a voltage compensation signal. The conduction duration generation circuit is configured to receive the voltage compensation signal and the first proportional coefficient, and generate the conduction duration signal. The conduction duration timer is configured to start timekeeping from a time instant at which the at least one first power switch in the first power converter is turned on, and turn off the at least one first power switch when recorded duration matches the conduction duration signal. The conduction duration signal is positively correlated with a product of the voltage compensation signal and the first proportional coefficient.

In an embodiment, the second DC to DC conversion module includes N second power converters each including an input end, and input ends of the N second power converters are coupled to output ends of the N first power converters respectively. N is integer greater than 1

In an embodiment, the N second power converters each include an output end, and output ends of the N second power converters are independent of each other, or connected in series, or in parallel.

In an embodiment, each of the N second power converters is an isolated DC to DC converter for electrical isolation.

In an embodiment, the N second power converters each include a transformer, and N transformers of the N second power converters are integrated into an N-phase integrated transformer with a single magnetic core.

In an embodiment, in a case that the output ends of the N second power converters are connected in series or in parallel, two adjacent second power converters are under a phase-shifted control, to reduce an output ripple.

In an embodiment, the AC to DC conversion circuit further includes a second control circuit. The second control circuit is configured to control operation states of the N second power converters, to control the first output signal outputted by the second DC to DC conversion module to drive the load.

Compared with the conventional technology, the technical solutions according to the present disclosure have the following advantages. The AC to DC conversion circuit according to the present disclosure includes a rectifier circuit, a first DC to DC conversion module and a second DC to DC conversion module. The rectifier circuit is configured to receive an AC input voltage, convert the AC input voltage into a DC input voltage, and output the converted DC input voltage. An input end of the first DC to DC conversion module is coupled to an output end of the rectifier circuit, and an output end of the first DC to DC conversion module is coupled to an input end of the second DC to DC conversion module. An operation state of the first DC to DC conversion module is controlled, to perform power factor correction. An output end of the second DC to DC conversion module is coupled to a load, and the second DC to DC conversion module is configured to drive the load. The first DC to DC conversion module includes N first power converters each having an input end and the input ends are connected in series. Multiple power switches in the first DC to DC conversion module are controlled to be turned on simultaneously, so that a voltage across each power switch in the first DC to DC conversion module is reduced. The AC to DC conversion circuit according to the present disclosure includes N first power converters instead of a boost circuit including a power switch with a high withstand voltage according to the conventional technology. Each of the N first power converters has an input end and all the input ends of the N first power converters are connected in series with each other, to perform the power factor correction. Therefore, the AC to DC conversion circuit according to the present disclosure includes no power switch with a high withstand voltage, so that the AC to DC conversion circuit has a small volume, low switching loss, less energy loss, good heat dissipation, and high power density.

BRIEF DESCRIPTION OF THE DRAWINGS

The above and other objects, features and advantages of the present disclosure are clearer from the following description of embodiments of the present disclosure with reference to the drawings. In the drawings.

DETAILED DESCRIPTION OF EMBODIMENTS

The present disclosure is described below based on the following embodiments. However, the present disclosure is not limited to the embodiments. In the description of the present disclosure hereinafter, some specific details are described. Those skilled in the art can completely understand the present disclosure without the description of the details. In order to avoid obscuring the substance of the present disclosure, well-known methods, procedures, processes, elements, and circuits are not described in detail.

In addition, those skilled in the art should understand that the drawings are provided herein for illustration, and are unnecessarily drawn to scale.

In addition, it should be understood that in the following description, the term "circuit" indicates a conductive loop formed by at least one element or sub-circuit through electrical connection or electromagnetic connection. When an element or circuit is described as "connected to" another element or "connected" between two nodes, the element or circuit may be directly coupled or connected to another element, or there is other element between the element or circuit and another element. The connection between elements may be physical, logical, or a combination thereof. In addition, when an element is described as "directly coupled" or "directly connected" to another element, there is no element between the element and another element.

Figure 1:
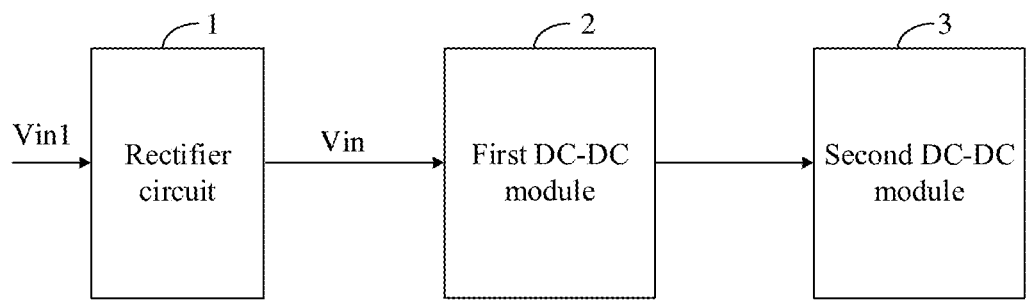
FIG. 1 is a block diagram of an AC to DC conversion circuit according to the embodiments of the present disclosure.

FIG. 1 is a block diagram of an AC to DC conversion circuit according to the present disclosure. The AC to DC conversion circuit includes a rectifier circuit 1, a first DC to DC conversion module 2 and a second DC to DC conversion module 3. The rectifier circuit 1 is configured to receive an AC input voltage Vint, convert the AC input voltage Vin1 into a DC input voltage Vin and output the converted DC input voltage Vin. An input end of the first DC to DC conversion module 2 is coupled to an output end of the rectifier circuit 1. An output end of the first DC to DC conversion module 2 is coupled to an input end of the second DC to DC conversion module 3. An operation state of the first DC to DC conversion module 2 is controlled, to perform power factor correction. An output end of the second DC to DC conversion module 3 is coupled to a load, to generate a first output signal to drive the load. The first DC to DC conversion module 2 includes a multi-level DC to DC converter or N first power converters having input ends that are connected in series. Multiple power switches in the first DC to DC conversion module 2 are controlled to be turned on simultaneously, so that a withstand voltage of each of the power switches in the first DC to DC conversion module 2 is reduced.

Further, the first DC to DC conversion module 2 is implemented by N first power converters. Input ends of the N first power converters are connected in series. Preferably, each of the N first power converters is a non-isolated DC to DC converter.

The rectifier circuit 1 converts the AC input voltage Vin1 from an input source into the DC input voltage Vin, that is, convers AC power into DC power. The rectifier circuit 1 may be implemented by a conventional rectifier circuit, such as a half-bridge rectifier circuit or a full-bridge rectifier circuit. Preferably, the DC input voltage Vin is an absolute value of the AC input voltage Vint.

Further, the first DC to DC conversion module 2 is implemented by a multi-level DC to DC converter. Preferably, the multi-level DC to DC converter is a non-isolated multi-level DC to DC converter.

Further, in a case that the first DC to DC conversion module 2 is implemented by the multi-level DC to DC converter, a voltage outputted by the first DC to DC conversion module 2 is a voltage outputted by the multi-level DC to DC converter. In a case that the first DC to DC conversion module 2 is implemented by the N first power converters, a voltage outputted by the first DC to DC conversion module 2 includes N voltages respectively outputted by the N first power converters.

Further, the second DC to DC conversion module 3 includes an isolated DC to DC converter for electrical isolation. In an embodiment, the second DC to DC conversion module 3 is configured to perform output voltage stabilization or output constant current, which is not limited in the present disclosure.

In an embodiment, the second DC to DC conversion module 3 includes N second power converters. N is greater than 1. In the case that the first DC to DC conversion module 2 is implemented by the multi-level DC to DC converter, input ends of the N second power converters are connected in parallel to receive the voltage outputted by the multi-level DC to DC converter. Output ends of the N second power converters are independent of each other, or connected in series or connected in parallel. In the case that the first DC to DC conversion module 2 is implemented by the N first power converters, the input ends of the N second power converters are coupled to output ends of the N first power converters, respectively. The output ends of the N second power converters are independent of each other, or connected in series or connected in parallel.

Further, the output ends of the N second power converters are connected depending on a to-be-driven load. For example, in a case that the AC to DC conversion circuit according to the present disclosure drives multiple loads, the output ends of the N second power converters are independent of each other. The output ends of the N second power converters each output a driving voltage, so as to drive N loads. In a case that a load requires a large driving voltage, the output ends of the N second power converters are connected in series to generate a large driving voltage to drive the load. In a case that a load requires a large driving current, the output ends of the N second power converters are connected in parallel to generate a large driving current to drive the load. The present disclosure is not limited hereto.

Further, each of the second power converters is an isolated DC to DC converter for electrical isolation.

In the AC to DC conversion circuit in the present disclosure, the first DC to DC conversion module is implemented by a non-isolated multi-level DC to DC converter or N non-isolated DC to DC converters with input ends being connected in series instead of the non-isolated DC to DC converter according to the conventional technology, to perform power factor correction (PFC). In the embodiments of the present disclosure, switching devices with a low withstand voltage are connected in series, or the switching devices with a low withstand voltage form modules and the modules are cascaded, to replace the switching device with a high withstand voltage in the conventional non-isolated DC to DC converter and perform the same function as the switching device with a high withstand voltage in the conventional non-isolated DC to DC converter, so that the power switches in the first DC to DC conversion module each have a low voltage withstand. Further, the multiple power switches in the first DC to DC conversion module are controlled to be turned on simultaneously, to reduce the withstand voltage of each of the power switches in the first DC to DC conversion module, so that a switching device with a low withstand voltage is applicable to the first DC to DC conversion module. In the present disclosure, the first DC to DC conversion module no longer includes a switching device with a high voltage withstand, but includes the switching devices with a low voltage withstand, so that the AC to DC conversion circuit has a smaller volume, higher power density, as well as less switching loss and less energy loss than a circuit including the switching device with a high withstand voltage at a same switching frequency. The first DC to DC conversion module according to the present disclosure includes multiple power switches with a low withstand voltage instead of a power switch with a high withstand voltage, so that the AC to DC conversion circuit has a good heat dissipation performance. With the switching devices with a low withstand voltage in the first DC to DC conversion module according to the present disclosure, the switching frequency can be effectively increased and volumes of relevant passive devices (such as an inductor and a capacitor) can be reduced, thereby further improving the power density of the AC to DC conversion circuit. The AC to DC conversion circuit according to the present disclosure includes a front-stage AC-DC structure and a post-stage DC to DC structure. The front-stage AC-DC structure includes the rectifier circuit and the first DC to DC conversion module. Switching devices with a low withstand voltage are connected in series, or the switching devices with a low withstand voltage form modules and the modules are cascaded, to achieve the equivalent switching states of a non-isolated DC to DC converter, to perform power factor correction. That is, an operation state of the first DC to DC conversion module is controlled, so that an envelope of an input current of the first DC to DC conversion module synchronizes with an envelope of an input voltage of the first DC to DC conversion module. The post-stage DC to DC structure includes a DC to DC converter capable of electrical isolation to drive a load. The post-post DC to DC structure may include multiple DC to DC converters. The AC to DC conversion circuit according to the present disclosure includes the front-stage AC-DC structure and the post-stage DC to DC structure, thereby achieving high power density. The AC to DC conversion circuit according to the present disclosure is applicable to a scenario of ultra-thin/ultra-small adapter, and is also applicable to other scenarios having high requirements for circuit power density and switching loss, which is not limited in the present disclosure. Moreover, the first DC to DC conversion module according to the present disclosure may operate in three operation modes, namely, a CCM mode, a DCM mode and a BCM mode. When the first DC to DC conversion module operates in the CCM mode, the first DC to DC conversion module is controlled in a first manner. That is, the first DC to DC conversion module operates at a fixed frequency (in which an operation period is controlled to be constant and conductive duration is adjusted). When the first DC to DC conversion module operates in the BCM mode, the first DC to DC conversion module is controlled in a second manner. That is, the first DC to DC conversion module operates at a variable frequency (in which conductive duration is controlled to be constant and a turn-off time instant is adjusted so as to adjust an operation period). A manner for controlling the first DC to DC conversion module that operates in the DCM mode is similar to the manner for controlling the first DC to DC conversion module that operates in the BCM mode. That is, when operating in the DCM mode, the first DC to DC conversion module operates at a variable frequency. A manner for determining a time instant when the power switch is turned off in the DCM mode is different from that in the BCM mode, and is not described in detail thereinafter.

Figure 2:
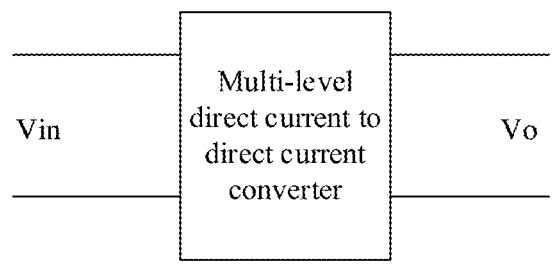
FIG. 2 is a block diagram showing a first example of a first DC to DC (DC to DC) conversion module according to the embodiments of the present disclosure.

FIG. 2 is a block diagram showing a first example of the first DC to DC conversion module according to the present disclosure. The first DC to DC conversion module 2 includes a multi-level DC to DC converter. An input end of the multi-level DC to DC converter receives the DC input voltage Vin. A voltage Vo outputted from an output end of the multi-level DC to DC converter serves as a voltage outputted by the first DC to DC conversion module. In the case that the first DC to DC conversion module 2 includes one multi-level DC to DC converter, the second DC to DC conversion module 3 is implemented by an isolated DC to DC converter or N isolated DC to DC converters. Input ends of the N isolated DC to DC converters are connected in parallel.

Based on the block diagram shown in FIG. 2, the AC to DC conversion circuit further includes a first control circuit. The first control circuit is configured to control an operation state of the multi-level DC to DC converter, so as to perform the power factor correction. The first control circuit controls the operation state of the multi-level DC to DC converter in two manners. The two manners correspond to two structures of the first control circuit respectively.

In a first manner, a first duty cycle signal representing a duty cycle is generated according to an output voltage sampling signal, an input voltage sampling signal and an inductor current sampling signal of the multi-level DC to DC converter. In addition, for each of the power switches in the first DC to DC conversion module, a control signal is generated according to the first duty cycle signal, to control the power switch to be turned on or off. In an embodiment, in the first manner, an operation period is controlled to be constant, and the duty cycle is adjusted by adjusting conductive duration (that is, the first DC to DC conversion module operates at the fixed frequency).

The first control circuit with a first structure includes a voltage compensation module, a current reference signal generation module, a current compensation module and a PWM generation module. The voltage compensation module receives an output voltage sampling signal of the multi-level DC to DC converter and a voltage reference signal, and outputs a voltage compensation signal. The current reference signal generation module receives an input voltage sampling signal of the multi-level DC to DC converter and the voltage compensation signal, and outputs a current reference signal. The current compensation module receives an inductor current sampling signal of the multi-level DC to DC converter and the current reference signal, and outputs a first duty cycle signal. The PWM generation module is configured to generate, for each of the power switches in the multi-level DC to DC converter, control signals based on the first duty cycle signal, to drive the power switches. In the first manner, a structure of each of the voltage compensation module, the current reference signal generation module and the current compensation module is the same for the multi-level DC to DC converter with different structures, and a structure of the PWM generation module varies with the structure of the multi-level DC to DC converter.

In a second manner, each power switch in the multi-level DC to DC converter is controlled to be turned on or off based on the output voltage sampling signal and an inductor current of the multi-level DC to DC converter. In an embodiment, in the second manner, the conductive duration is controlled to be constant, and the operation period (that is, a frequency) is adjusted to adjust the duty cycle (that is, the first DC to DC conversion module operates at the variable frequency).

The first control circuit with a second structure includes a turn-off control circuit and a conduction control circuit. The turn-off control circuit receives an output voltage sampling signal of the multi-level DC to DC converter and a first proportional coefficient, to generate a conduction duration signal, and determines a time instant when a power switch is turned off (and determines a time instant when another power switch is turned on, where switching states of the power switch and the another power switch are complementary) in the multi-level DC to DC converter based on the conduction duration signal. The conduction control circuit receives the inductor current of the multi-level DC to DC converter and determines a time instant when a power switch is turned on (and determines a time instant when another power switch is turned off, where switching states of the power switch and the another power switch are complementary) in the multi-level DC to DC converter. Further, the turn-off control circuit includes a voltage compensation circuit, a conduction duration generation circuit and a conduction duration timer. The voltage compensation circuit receives the output voltage sampling signal of the multi-level DC to DC converter and the voltage reference signal, and outputs the voltage compensation signal. The conduction duration generation circuit receives the voltage compensation signal and the first proportional coefficient, and outputs the conduction duration signal. The conduction duration timer starts timekeeping from the time instant when the power switch is turned on. The power switch is turned off when conduction duration timed by the conduction duration timer reaches the conduction duration signal. In the second manner, a structure of the turn-off control circuit is the same for the multi-level DC to DC converter with different structures. A structure of the conduction control circuit varies with the structure of the multi-level DC to DC converter. The second manner has a good effect in a multi-level DC to DC boost converter circuit, and the corrected power factor theoretically reaches 1. When a multi-level DC to DC converter circuit other than the multi-level DC to DC boost converter circuit is controlled in the second manner, a power factor can also be corrected, but the corrected power factor cannot reach 1 theoretically, which is explained hereby.

It should be noted that the multi-level DC to DC converter has types respectively corresponding to various levels. Therefore, the present disclosure is described in detail below by taking a four-level DC to DC converter as an example. A structural diagram of (N+1)-level DC to DC converter is shown. In addition, since multiple multi-level DC to DC converters with various structures are provided according to embodiments of the present disclosure hereinafter, in order to avoid unnecessary repetition, the manner in which the multi-level DC to DC converter is controlled and the first control circuit are described by taking a multi-level DC to DC buck converter as an example. Other multi-level DC to DC converter is controlled in the same manner as the multi-level DC to DC buck converter. For the same or similar parts, reference is made to the multi-level DC to DC buck converter.

Figure 3:
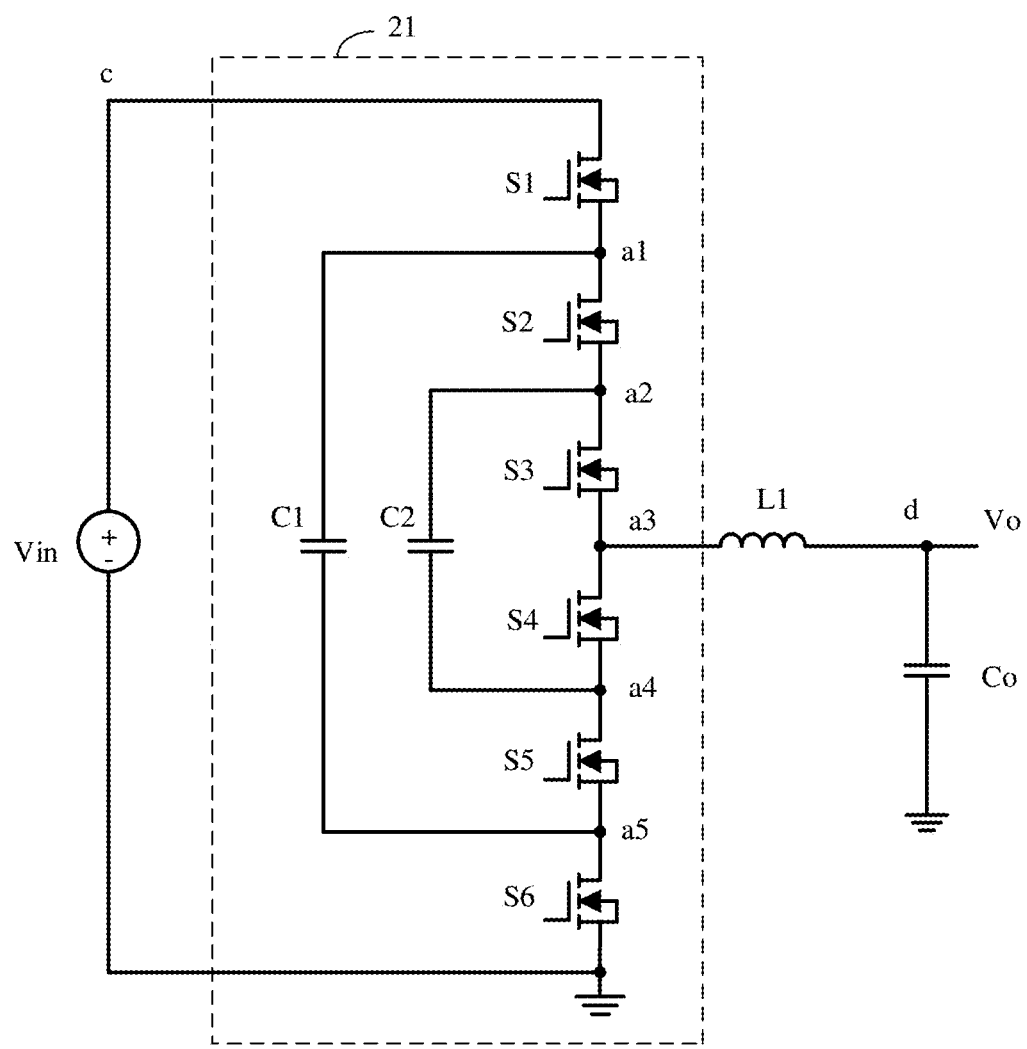
FIG. 3 is a schematic circuit diagram of the first DC to DC conversion module according to a first embodiment of the present disclosure.

FIG. 3 is a schematic circuit diagram of a first DC to DC conversion module according to a first embodiment of the present disclosure. The first DC to DC conversion module includes a four-level DC to DC buck converter. The four-level DC to DC buck converter includes a switched-capacitor circuit 21 and a first inductor L1. A first end of the switched-capacitor circuit 21 serves as a high potential input terminal c of the first DC to DC conversion module, and receives the DC input voltage Vin. A second end of the switched-capacitor circuit 21 is coupled to a first terminal of the first inductor L1. A second terminal of the first inductor L1 is coupled to a high potential output terminal d of the first DC to DC conversion module. a low potential input terminal of the first DC to DC conversion module is grounded. A low potential output terminal of the first DC to DC conversion module is grounded.

In the first embodiment, the switched-capacitor circuit 21 includes power switches S1 to S6 and flying capacitors C1 and C2. The power switches S1 to S6 are connected in series sequentially between the high potential input terminal c of the first DC to DC conversion module and the ground, thereby forming first intermediate nodes a1 to a5. The flying capacitor C1 is coupled between the first intermediate nodes a1 and a5. The flying capacitor C2 is coupled between the first intermediate nodes a2 and a4. The first intermediate node a3 serves as the second end of the switched-capacitor circuit 21, and is coupled to the first terminal of the first inductor L1. In another embodiment, the four-level DC to DC buck converter further includes an output capacitor Co. The output capacitor Co is coupled between the high potential output terminal d of the first DC to DC conversion module and the ground.

Figure 4:
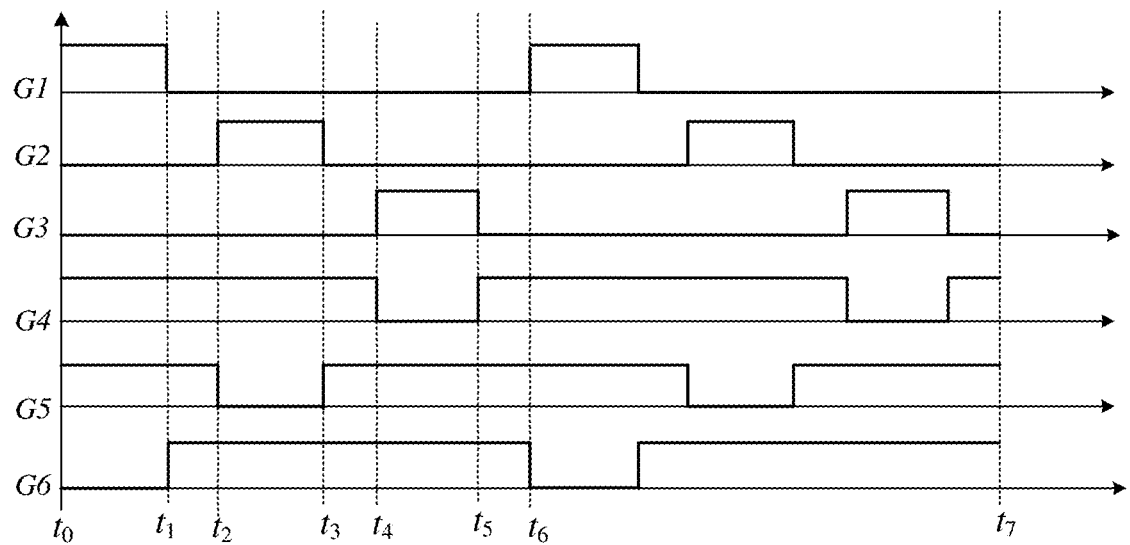
FIG. 4 is a schematic diagram showing operation waveforms of the first DC to DC conversion module according to the first embodiment of the present disclosure.

FIG. 4 is a schematic diagram showing operation waveforms of the first DC to DC conversion module according to the first embodiment of the present disclosure. Control signals G1 to G6 are used to drive the power switches S1 to S6, respectively. During a time interval from a time instant $t_0$ to a time instant $t_1$, the control signals G1, G4 and G5 each are at a high level, the power switches S1, S4 and S5 are on, and the inductor current increases. During a time interval from the time instant $t_1$ to a time instant $t_2$, the control signals G4, G5 and G6 each are at a high level, the power switches S4, S5 and S6 are on, and the inductor current decreases. During a time interval from the time instant $t_2$ to a time instant $t_3$, the control signals G2, G4 and G6 each are at a high level, the power switches S2, S4 and S6 are on, and the inductor current increases. During a time interval from the time instant $t_3$ to a time instant $t_4$, the control signals G4, G5 and G6 each are at a high level, the power switches S4, S5 and S6 are on, and the inductor current decreases. During a time interval from the time instant $t_4$ to a time instant $t_5$, the control signals G3, G5 and G6 each are at a high level, the power switches S3, S5 and S6 are on, and the inductor current increases. During a time interval from the time instant $t_5$ to a time instant $t_6$, the control signals G4, G5 and G6 each are at a high level, the power switches S4, S5 and S6 are on, and the inductor current decreases. A time interval from the time instant $t_0$ to the time instant $t_6$ is a switching period.

It can be seen from FIG. 4 that the switching states of the power switch S1 and the power switch S6 are complementary. The switching states of the power switch S2 and the power switch S5 are complementary. The switching states of the power switch S3 and the power switch S4 are complementary. In order to prevent a transient short circuit caused by delayed turn-off of the power switch, there is a dead time period between a time instant when one of a pair of complementary transistors switches and a time instant when the other of the pair of complementary transistors switches, which is applicable to the following complementary transistors. Moreover, it can be seen that at any time instant in a time period during which the four-level DC to DC buck converter operates, three power switches are in the turn-on state, so that a voltage across each of the power switches is equal to a third of the DC input voltage, that is, Vin/3. In a buck converter according to the conventional technology, a voltage across a single power switch is equal to the DC input voltage, that is, Vin. It can be seen that with the four-level DC to DC buck converter, a withstand voltage of each of the power switches is reduced. Therefore, the power switches each are implemented by a switching device with a low withstand voltage. Moreover, in a case that each of the power switches operates at a frequency fs, an equivalent switching frequency for the inductor current is equal to 3×fs. Therefore, in the first embodiment, the first inductor L1 is implemented by an inductor with small inductance, and a ripple of the output capacitor Co is small.

The AC to DC conversion circuit further includes a first control circuit. The first control circuit is configured to control, in two manners, an operation state of the multi-level DC to DC converter, so as to perform the power factor correction. The two manners correspond to two structures of the first control circuit, respectively.

Figure 5:
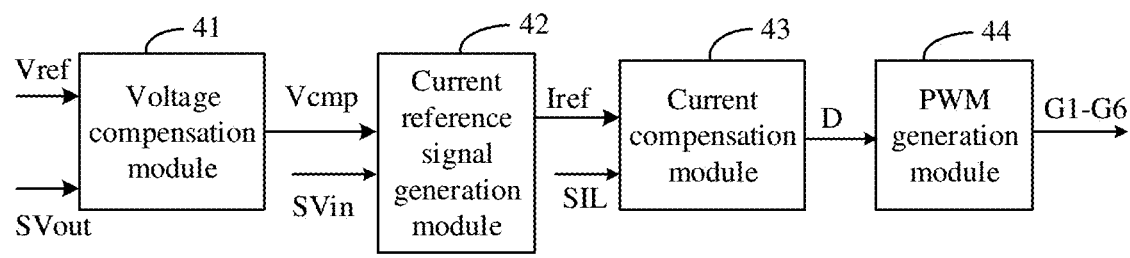
FIG. 5 is schematic diagram of a first control circuit with a first structure according to the first embodiment of the present disclosure.

FIG. 5 is schematic diagram of the first control circuit with a first structure according to the first embodiment of the present disclosure. The first control circuit with the first structure is configured to generate a first duty cycle signal D representing a duty cycle based on an output voltage sampling signal SVout, an input voltage sampling signal SVin and an inductor current sampling signal SIL of the four-level DC to DC buck converter, and generate, for each of the power switches in the four-level DC to DC buck converter, control signals based on the first duty cycle signal D, to control each of the power switches to be switched on or off.

The first control circuit with the first structure controls an output voltage Vout by a voltage loop, and controls an inductor current IL by a current loop. The first control circuit includes a voltage compensation module 41, a current reference signal generation module 42, a current compensation module 43 and a PWM generation module 44. The voltage compensation module 41 receives the output voltage sampling signal Svout and a voltage reference signal Vref, and outputs a voltage compensation signal Vcmp. The voltage compensation module 41 generates the voltage compensation signal Vcmp based on a difference between the output voltage sampling signal Svout and the voltage reference signal Vref. The current reference signal generation module 42 receives the voltage compensation signal Vcmp and the input voltage sampling signal SVin, and outputs a current reference signal Iref. The current reference signal Iref is positively correlated with a product of the voltage compensation signal Vcmp and the input voltage sampling signal SVin. Preferably, the current reference signal Iref is equal to the product of the voltage compensation signal Vcmp and the input voltage sampling signal SVin, that is, Iref=Vcmp× SVin. The current compensation module 43 receives the current reference signal Iref and the inductor current sampling signal SIL, and outputs the first duty cycle signal D. The current compensation module 43 generates the first duty cycle signal D representing the duty cycle based on a difference between the current reference signal Iref and the inductor current sampling signal SIL. The PWM generation module 44 generates the control signals G1 to G6 based on the first duty cycle signal D, to drive the power switches in the first DC to DC conversion module.

Figure 6:
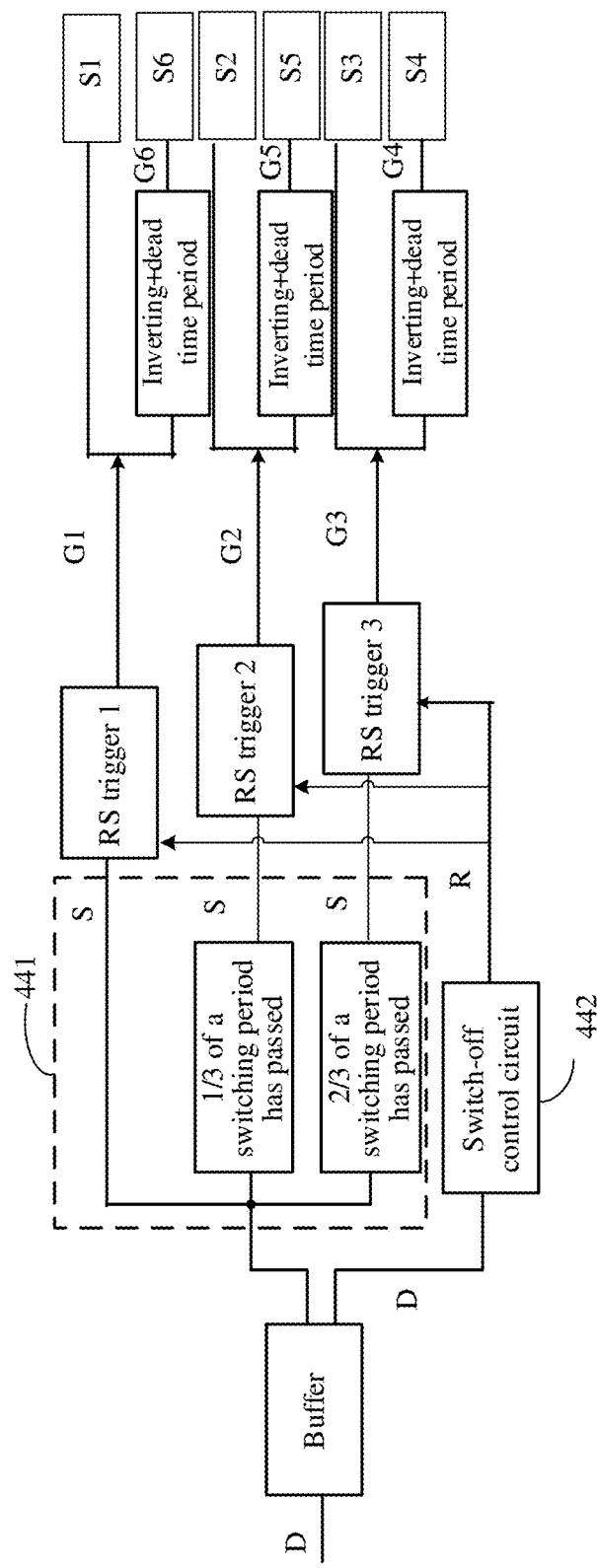
FIG. 6 is a schematic diagram of a PWM generation module according to the first embodiment of the present disclosure.

FIG. 6 is a schematic diagram of the PWM generation module according to the first embodiment of the present disclosure. The PWM generation module 44 includes a conduction control circuit 441 and a turn-off control circuit 442. The conduction control circuit 441 is configured to turn on the power switches S1 to S3 sequentially. Among the power switches S1 to S3, a power switch turned on previously switches on ⅓ of the switching period earlier than a power switch turned on subsequently. The turn-off control circuit 442 receives the first duty cycle signal D, and determines, for each of the power switches S1 to S3, a time instant when each of the power switches is turned off based on the first duty cycle signal D. The conduction control circuit 441 and the turn-off control circuit 442 are further configured to control the power switches S4 to S6, so that the switching state of the power switch S6 is complementary to the switching state of the power switch S1, the switching state of the power switch S5 is complementary to the switching state of the power switch S2, and the switching state of the power switch S4 is complementary to the switching state of the power switch S3.

The operation process of the PWM generation circuit is described in combination with FIG. 4. The conduction control circuit 441 controls the power switch S1 to be turned on at the time instant $t_0$. The turn-off control circuit 442 determines a time instant $t_1$ when the power switch S1 is turned off based on the first duty cycle signal D, with an equation of $(t_1-t_0)/(t_2-t_0)=D$. A time period from the time instant $t_0$ to the time instant $t_2$ is equal to ⅓ of the switching period. The conduction control circuit 441 controls the power switch S2 to be turned on at a time instant (that is, the time instant $t_2$) when ⅓ of the switching period expires from the time instant $t_0$. The turn-off control circuit 422 determines a time instant $t_3$ when the power switch S2 is turned off based on the first duty cycle signal D, with an equation of $(t_3-t_2)/(t_4-t_2)=D$. A time period from the time instant $t_2$ to the time instant $t_4$ is equal to ⅓ of the switching period. The conduction control circuit 441 controls the power switch S3 to be turned on at a time instant (that is, the time instant $t_4$) when ⅔ of the switching period expires from the time instant $t_0$. The turn-off control circuit 422 determines a time instant $t_5$ when the power switch S3 is turned off based on the first duty cycle signal D, with an equation of $(t_5-t_4)/(t_6-t_4)=D$. A time period from the time instant $t_4$ to the time instant $t_6$ is equal to ⅓ of the switching period. Preferably, the time instant $t_0$ when the power switch S1 is turned on in each switching period is determined based on a clock signal. In the switching period, there is a relationship of $((t_1-t_0)+(t_3-t_2)+(t_5-t_4))/(t_6-t_0)=D$, where a time period form the time instant $t_0$ to the time instant $t_6$ is equal to the switching period.

In an embodiment, the PWM generation module 44 further includes RS triggers 1 to 3. The RS triggers 1 to 3 are configured to generate control signals G1 to G3 to control the power switches S1 to S3 to be turned on or off, respectively. The conduction control circuit 441 outputs a set signal to an S terminal of the RS trigger 1 at the time instant $t_0$, outputs a set signal to an S terminal of the RS trigger 2 at a time instant when ⅓ of the switching period expires from the time instant $t_0$, and outputs a set signal to an S terminal of the RS trigger 3 at a time instant when ⅔ of the switching period expires from the time instant $t_0$. For each of the power switches S1 to S3, the turn-off control circuit 442 outputs a reset signal to an R terminal of the RS trigger corresponding to the power switch, to determine, based on the first duty cycle signal D, a time instant when the power switch is turned off in a ⅓ of the switching period corresponding to the power switch, so that conduction duration of each of the power switches divided by ⅓ of the switching period is equal to D. Signals outputted by the RS triggers 1 to 3 are control signals G1 to G3, respectively. Since the switching state of the power switch S6 is complementary to the switching state of the power switch S1, the switching state of the power switch S5 is complementary to the switching state of the power switch S2, and the switching state of the power switch S4 is complementary to the switching state of the power switch S3, control signals G6, G5 and G4 are respectively obtained by inverting the control signals G1 to G3, so as to control the power switches S6, S5 and S4 to be turned off or on, respectively. In an embodiment, the conduction control circuit further includes a buffer. The buffer is configured to store the first duty cycle signal D.

Figure 7:
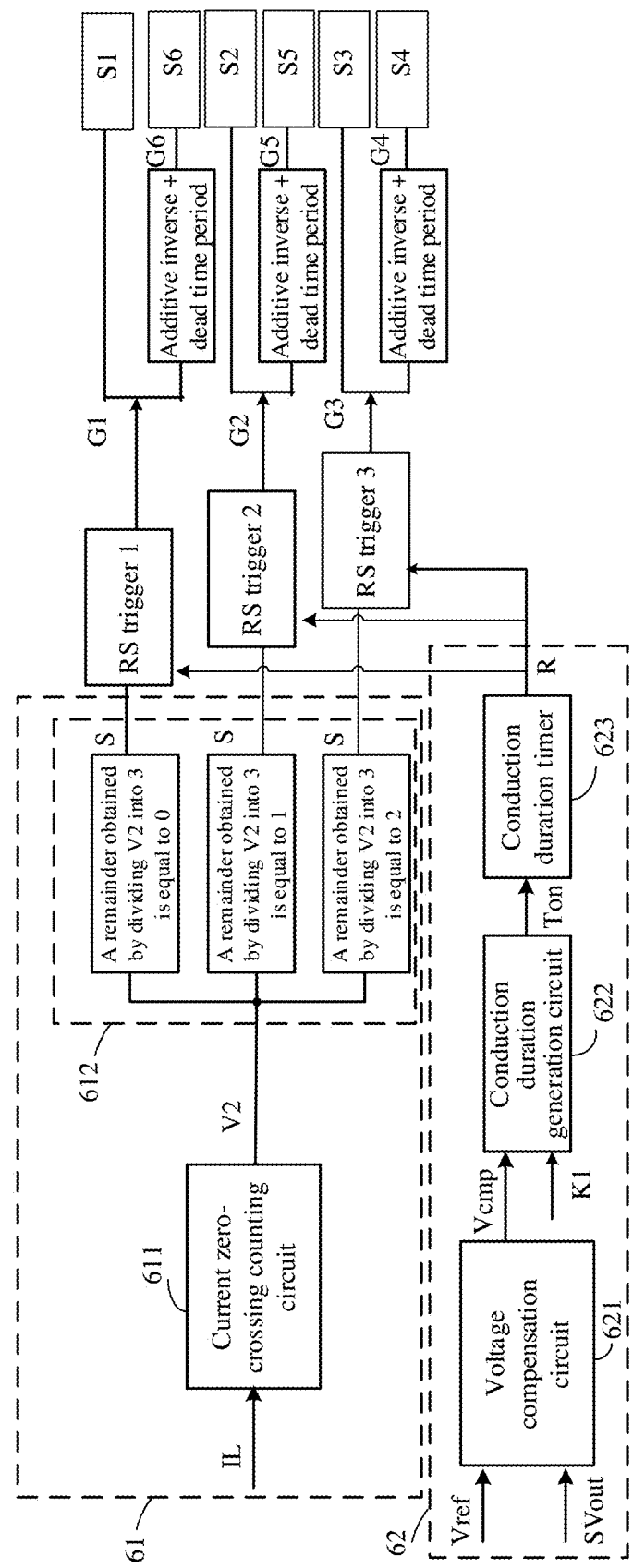
FIG. 7 is schematic diagram of the first control circuit with a second structure according to the first embodiment of the present disclosure.

FIG. 7 is schematic diagram of the first control circuit with a second structure according to the first embodiment of the present disclosure. The first control circuit with the second structure is configured to determine, for each of the power switches in the four-level DC to DC buck converter, a time instant when the power switch is turned on and a time instant when the power switch is turned off based on the output voltage sampling signal SVout and the inductor current IL of the four-level DC to DC buck converter.

The first control circuit with the second structure includes a conduction control circuit 61 and a turn-off control circuit 62. The conduction control circuit 61 receives the inductor current IL, and acquires a second signal V2 representing the number that the inductor current reaches zero. Each time the inductor current is equal to zero, the conduction control circuit 61 generates, for each of the power switches S1 to S3, a conduction trigger signal based on the second signal V2, to control the power switch to be turned on. The turn-off control circuit 62 receives the output voltage sampling signal SVout and the first proportional coefficient K1, to generate a conduction duration signal Ton, and determines, for each of the power switches S1 to S3, a time instant when the power switch is turned off based on the conduction duration signal Ton. The conduction control circuit 61 and the turn-off control circuit 62 are further configured to control the power switches S4 to S6, so that the switching state of the power switch S6 is complementary to the switching state of the power switch S1, the switching state of the power switch S5 is complementary to the switching state of the power switch S2, and the switching state of the power switch S4 is complementary to the switching state of the power switch S3.

The conduction control circuit 61 includes a current zero-crossing counting circuit 611 and a conduction trigger signal generation circuit 612. The current zero-crossing counting circuit 611 receives the inductor current IL and outputs the second signal V2 representing the number that the inductor current passing reaches zero. The conduction trigger signal generation circuit 612 receives the second signal V2 and generates a conduction trigger signal based on the second signal V2. In a case that a remainder obtained by dividing the second signal V2 into 3 is equal to p, the conduction trigger signal generation circuit 612 generates a conduction trigger signal corresponding to a (p+1)-th power switch Sp+1, to control the (p+1)-th power switch Sp+1 to be turned on, where p is equal to 0, 1 or 2.

The turn-off control circuit 62 includes a voltage compensation circuit 621, a conduction duration generation circuit 622 and a conduction duration timer 623. The voltage compensation circuit 621 receives the output voltage sampling signal SVout and the voltage reference signal Vref, and outputs the voltage compensation signal Vcmp. The voltage compensation module 621 generates the voltage compensation signal Vcmp based on a difference between the output voltage sampling signal SVout and the voltage reference signal Vref. The conduction duration generation circuit 622 receives the voltage compensation signal Vcmp and the first proportional coefficient K1, and outputs a conduction duration signal Ton. The conduction duration signal Ton is positively correlated with a product of the voltage compensation signal Vcmp and the first proportional coefficient K1. Preferable, the conduction duration signal Ton is equal to the product of the voltage compensation signal Vcmp and the first proportional coefficient K1, that is, Ton=Vcmp×K1. For each of the power switches S1 to S3, the conduction duration timer 623 starts timekeeping from a time instant when the power switch is turned on, and the power switch is turned off when the recorded duration matches the conduction duration signal Ton.

In the first embodiment, the first control circuit further includes RS triggers 1 to 3. The RS triggers 1 to 3 are configured to generate control signals G1 to G3 to control the power switches S1 to S3 to be turned on or off, respectively. In a case that a remainder obtained by dividing the second signal V2 into 3 is equal to 0, the conduction control circuit 61 generates a conduction trigger signal corresponding to the power switch S1. The conduction trigger signal serves as a set signal and is outputted to an S terminal of the RS trigger 1. In a case that a remainder obtained by dividing the second signal V2 into 3 is equal to 1, the conduction control circuit 61 generates a conduction trigger signal corresponding to the power switch S2. The conduction trigger signal serves as a set signal and is outputted to an S terminal of the RS trigger 2. In a case that a remainder obtained by dividing the second signal V2 into 3 is equal to 2, the conduction control circuit 61 generates a conduction trigger signal corresponding to the power switch S3. The conduction trigger signal serves as a set signal and is outputted to an S terminal of the RS trigger 3. For each of the power switches S1 to S3, the turn-off control circuit 62 starts the timekeeping at a time instant when the power switch is turned on, and outputs a reset signal to an R terminal of one of the RS triggers 1 to 3 corresponding to the power switch when the recorded duration reaches the conduction duration signal Ton. Signals outputted by the RS triggers 1 to 3 are the control signals G1 to G3, respectively. Since the switching state of the power switch S6 is complementary to the switching state of the power switch S1, the switching state of the power switch S5 is complementary to the switching state of the power switch S2, and the switching state of the power switch S4 is complementary to the switching state of power switch S3, the control signals G6, G5 and G4 are respectively obtained by inverting the control signals G1 to G3, to control the power switches S6, S5 and S4 to be turned on or off, respectively.

Figure 8:
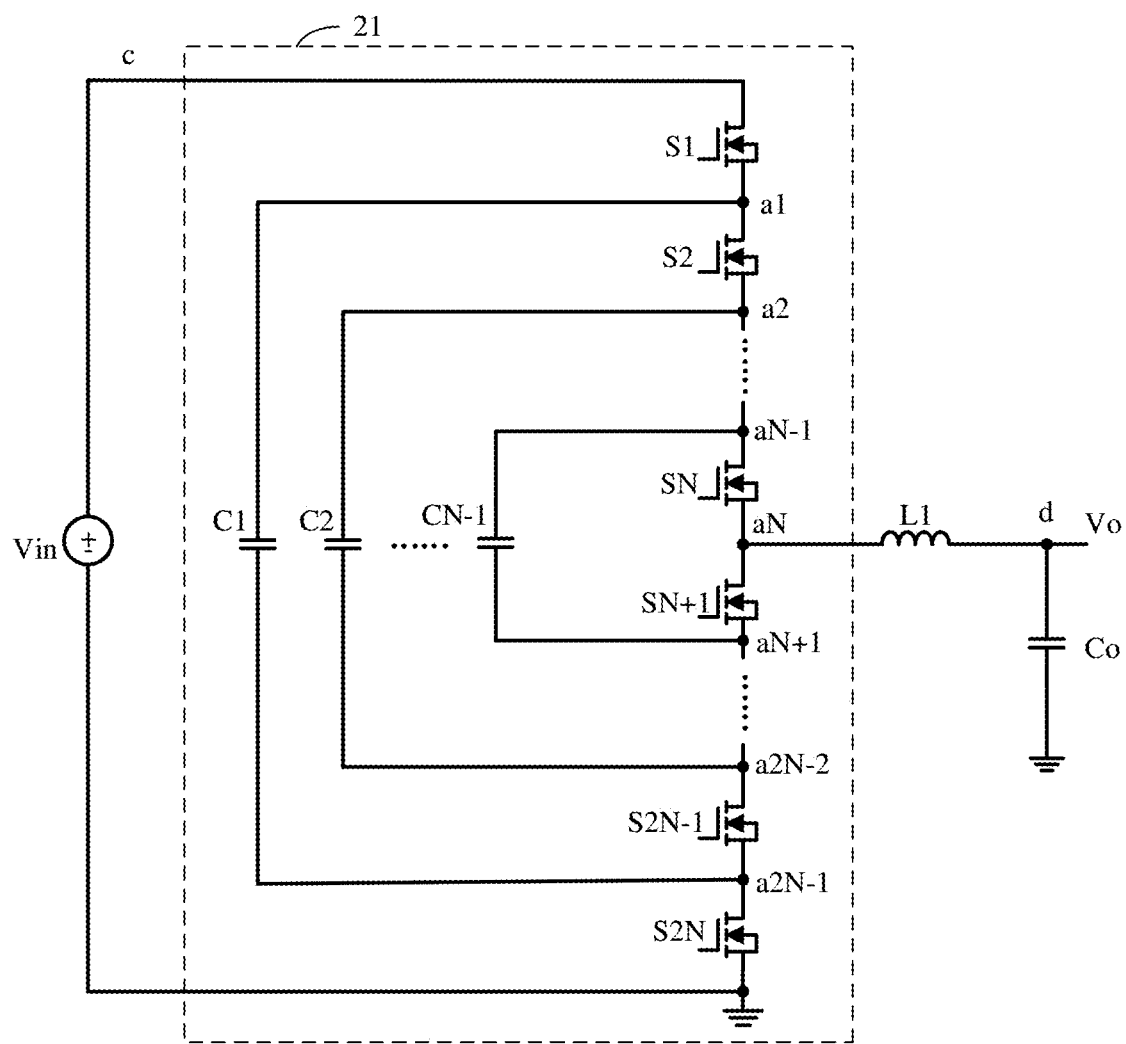
FIG. 8 is a schematic circuit diagram of a first DC to DC conversion module according to a second embodiment of the present disclosure.

In the first embodiment, the first DC to DC conversion module is implemented by a four-level DC to DC buck converter. In another embodiment, the first DC to DC conversion module is implemented by a DC to DC buck converter with another level. Reference is made to FIG. 8, which is a schematic circuit diagram of a first DC to DC conversion module according to a second embodiment of the present disclosure. The first DC to DC conversion module is implemented by an (N+1)-level DC to DC buck converter, and N is greater than 1.

The (N+1)-level DC to DC buck converter includes a switched-capacitor circuit 21 and a first inductor L1. A first end of the switched-capacitor circuit 21 serves as a high potential input terminal c of the first DC to DC conversion module, and receives the DC input voltage Vin. A second end of the switched-capacitor circuit 21 is coupled to a first terminal of the first inductor L1. A second terminal of the first inductor L1 is coupled to a high potential output terminal d of the first DC to DC conversion module. The first DC to DC conversion module in the second embodiment is different from the first DC to DC conversion module in the first embodiment in that the switched-capacitor circuit 21 in the second embodiment is different from the switched-capacitor circuit 21 in the first embodiment.

In the second embodiment, the switched-capacitor circuit 21 includes 2N power switches S1 to S2N and N−1 flying capacitors C1 to CN−1. The 2N power switches S1 to S2N are connected in series sequentially between the high potential input terminal c of the first DC to DC conversion module and the ground, to form 2N−1 first intermediate nodes a1 to a2N−1. An m-th flying capacitor Cm is coupled between an m-th first intermediate node am and a (2N−m)-th first intermediate node a2N−m. An N-th first intermediate node aN serves as the second end of the switched-capacitor circuit and is coupled to the first terminal of the first inductor L, where m is less than or equal to N−1.

In the (N+1)-level DC to DC buck converter, a (2N−n+1)-th power switch S2N−n+1 is complementary to an n-th power switch Sn, and n is less than or equal to N. At any time instant in a time period during which the (N+1)-level DC to DC buck converter operates, N power switches are in the turn-on state, so that a voltage across each of the power switches is equal to the DC input voltage divided by N, that is, Vin/N. In a buck converter according to the conventional technology, a voltage across a single power switch is equal to the DC input voltage, that is, Vin. It can be seen that with the (N+1)-level DC to DC buck converter, a withstand voltage of each of the power switches is reduced. Therefore, the power switches are each implemented by a switching device with a low withstand voltage. Moreover, in a case that each of the power switches operates at a frequency fs, an equivalent switching frequency for the inductor current is equal to N×fs. Therefore, in the second embodiment, the first inductor L1 is implemented by an inductor with small inductance, and a ripple of the output capacitor Co is small.

The AC to DC conversion circuit further includes a first control circuit. The first control circuit is configured to control an operation state of the (N+1)-level DC to DC buck converter, so as to perform the power factor correction.

The first control circuit with a first structure according to the second embodiment is similar to the first control circuit with the first structure according to the first embodiment, with a difference in that a structure of the PWM generation module 44 according to the second embodiment is different from the structure of the PWM generation module 44 according to the first embodiment, and the PWM generation module 44 according to the second embodiment is configured to control switching states of the 2N power switches. In the second embodiment, the PWM generation module 44 includes a conduction control circuit 441 and a turn-off control circuit 442. The conduction control circuit 441 is configured to turn on first N power switches S1 to SN sequentially. Among the N power switches S1 to SN, a power switch turned on previously switches on 1/N of the switching period earlier than a power switch turned on subsequently. Preferably, a time instant when a first power switch S1 is turned on in each switching period is determined based on a clock signal. The turn-off control circuit 442 receives the first duty cycle signal D, and determines, for each of the N power switches S1 to SN, a time instant when the power switch is turned off based on the first duty cycle signal D. The conduction control circuit 441 and the turn-off control circuit 442 are further configured to control the last N power switches SN+1 to S2N, so that the switching state of a (2N−n+1)-th power switch S2N−n+1 is complementary to the switching state of an n-th power switch Sn, and n is less than or equal to N.

The first control circuit with a second structure according to the second embodiment is similar to the first control circuit with the second structure according to the first embodiment, with a difference in that a structure of the conduction control circuit 61 according to the second embodiment is different from the structure of the conduction control circuit 61 according to the first embodiment, and the conduction control circuit 61 according to the second embodiment is configured to control switching states of the 2N power switches. In the second embodiment, the first control circuit includes a conduction control circuit 61 and a turn-off control circuit 62. The conduction control circuit 61 receives the inductor current IL and acquires a second signal V2 representing the number that the inductor current reaches zero. Each time the inductor current is equal to zero, the conduction control circuit 61 generates, for each of the first N power switches S1 to SN, a conduction trigger signal based on the second signal V2, to control the power switch to be turned on. The turn-off control circuit 62 receives the output voltage sampling signal SVout and the first proportional coefficient K1 to generate a conduction duration signal Ton, and determines, for each of the power switches S1 to SN, a time instant when the power switch is turned off based on the conduction duration signal Ton. The conduction control circuit 61 and the turn-off control circuit 62 are further configured to control the last N power switches SN+1 to S2N, so that the switching state of a (2N−n+1)-th power switch S2N−n+1 is complementary to the switching state of an n-th power switch Sn, where n is less than or equal to N. The conduction control circuit 61 includes a current zero-crossing counting circuit 611 and a conduction trigger signal generation circuit 612. The current zero-crossing counting circuit 611 receives the inductor current IL and outputs the second signal V2 representing the number that the inductor current reaches zero. The conduction trigger signal generation circuit 612 receives the second signal V2 and generates a conduction trigger signal based on the second signal V2. In a case that a remainder obtained by dividing the second signal V2 into N is equal to p, the conduction trigger signal generation circuit 612 generates a conduction trigger signal corresponding to a (p+1)-th power switch $S_{p+1}$, to control the (p+1)-th power switch Sp+1 to be turned on, where p is less than N.

Figure 9:
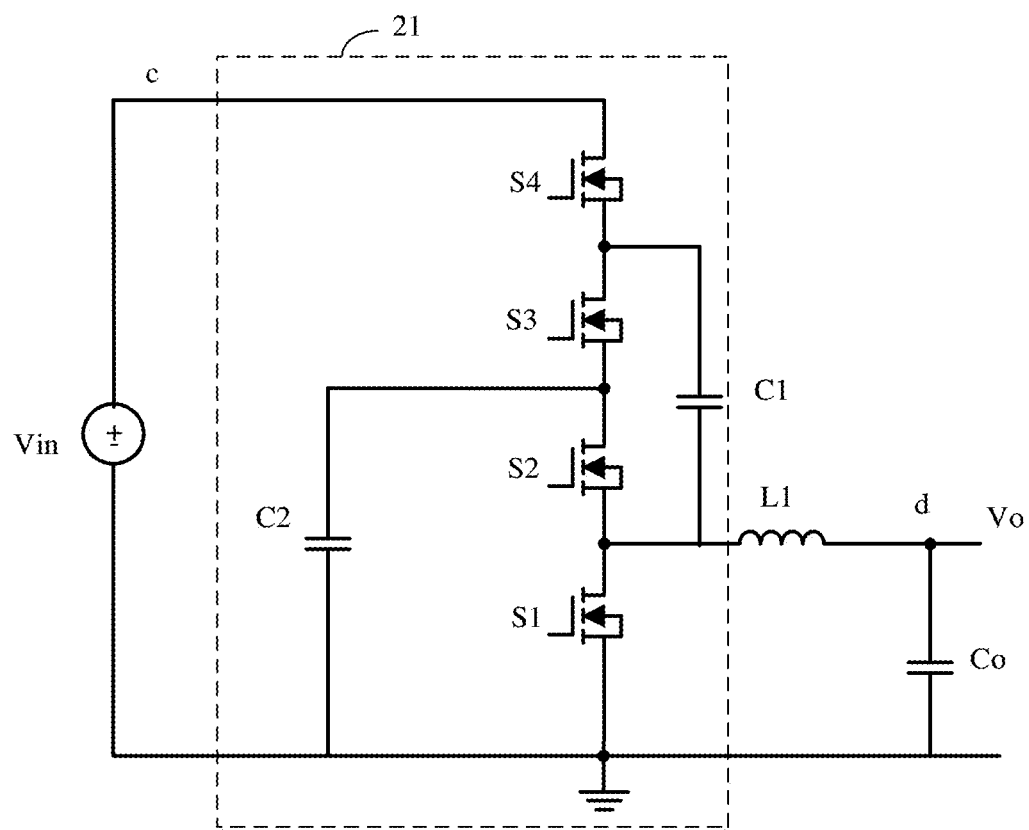
FIG. 9 is a schematic circuit diagram of a first DC to DC conversion module according to a third embodiment of the present disclosure.

The switched-capacitor circuit 21 according to the first embodiment and the switched-capacitor circuit 21 according to the second embodiment each may be replaced with a switched-capacitor converter. FIG. 9 is a schematic circuit diagram of a first DC to DC conversion module according to a third embodiment of the present disclosure. The first DC to DC conversion module is implemented by a switched-capacitor DC to DC buck converter. The first DC to DC conversion module according to the third embodiment is different from the first DC to DC conversion module according to the first embodiment in that only a structure of the switched-capacitor circuit 21 according to the third embodiment is different from the structure of the switched-capacitor circuit 21 according to the first embodiment. In the third embodiment, the switched-capacitor circuit 21 is implemented by a switched-capacitor converter. The switched-capacitor circuit 21 includes power switches S1 to S4, a capacitor C1 and a capacitor C2. The power switches S4 to S1 are connected in series sequentially between a high potential input terminal c of the first DC to DC conversion module and the ground. A first terminal of the first inductor L1 is coupled to a common terminal of the power switch S1 and the power switch S2, and a second terminal of the first inductor L1 is coupled to a high potential output terminal d of the first DC to DC conversion module. A first terminal of the capacitor C1 is coupled to a common terminal of the power switch S4 and the power switch S3. A second terminal of the capacitor C1 is coupled to the first terminal of the first inductor L1. A first terminal of the capacitor C2 is coupled to a common terminal of the power switch S3 and the power switch S2. A second terminal of the capacitor C2 is grounded. The power switch S1 and the power switch S3 are turned on at the same time, and are turned off at the same time. The power switch S2 and the power switch S4 are turned on at the same time, and are turned off at the same time. The switching state of the power switch S1 is complementary to the switching state of the power switch S2.

The AC to DC conversion circuit further includes a first control circuit. The first control circuit is configured to control an operation state of the switched-capacitor DC to DC buck converter according to the third embodiment, to perform the power factor correction.

The first control circuit with a first structure according to the third embodiment is similar to the first control circuit with the first structure according to the first embodiment, with a difference in that a structure of the PWM generation module 44 according to the third embodiment is different from the structure of the PWM generation module 44 according to the first embodiment, and the PWM generation module 44 according to the third embodiment is configured to control switching states of the power switches S4 to S1. In the third embodiment, the PWM generation module 44 includes a conduction control circuit 441 and a turn-off control circuit 442. The conduction control circuit 441 is configured to simultaneously turn on the power switches S1 and S3. The turn-off control circuit 442 receives the first duty cycle signal D, and determines, for each of the power switches S1 and S3, a time instant when the power switch is turned off based on the first duty cycle signal D. The conduction control circuit 441 and the turn-off control circuit 442 are further configured to control switching states of the power switches S2 and S4, so that the switching state of the power switch S2 is complementary to the switching state of the power switch S1, and the switching state of the power switch S4 is complementary the switching state of to the power switch S3. In an embodiment, for each of the power switches S1 and S3, a time instant when the power switch is turned on is determined based on a clock signal.

The first control circuit with a second structure according to the third embodiment is similar to the first control circuit with the second structure according to the first embodiment, with a difference in that a structure of a conduction control circuit 61 according to the third embodiment is different from the structure of the conduction control circuit 61 according to the first embodiment, and the conduction control circuit 61 according to the third embodiment is configured to control the switching states of the power switches S4 to S1. In the third embodiment, the first control circuit includes a conduction control circuit 61 and a turn-off control circuit 62. The conduction control circuit 61 receives the inductor current IL. Each time the inductor current IL is equal to zero, the conduction control circuit 61 generates a conduction trigger signal, to control the power switches S1 and S3 to be turned on. The turn-off control circuit 62 receives the output voltage sampling signal SVout and the first proportional coefficient K1 to generate a conduction duration signal Ton, and determines, for each of the power switches S1 and S3, a time instant when the power switch is turned off based on the conduction duration signal Ton. The conduction control circuit 61 and the turn-off control circuit 62 are further configured to control switching states of the power switches S2 and S4, so that the switching state of the power switch S2 is complementary to the switching state of the power switch S1, and the switching state of the power switch S4 is complementary to the switching state of the power switch S3.

It should be noted that only an example in which the switched-capacitor circuit 21 is implemented by the switched-capacitor converter is provided according to the third embodiment. In another embodiment, the switched-capacitor circuit 21 is implemented by a switched-capacitor converter with various structures. The power switch in the switched-capacitor DC to DC buck converter operates in the same way as a power switch in the switched-capacitor converter when operating independently (for example, when the switched-capacitor converter in the third embodiment operates independently, the power switch S1 and the power switch S3 are turned on at the same time and are turned off at the same time, the power switch S2 and the power switch S4 are turned on at the same time and are turned off at the same time, and the switching state of the power switch S1 is complementary to the switching state of the power switch S2). Therefore, the operation state of the switched-capacitor DC to DC buck converter is controlled in two manners.

Figure 10:
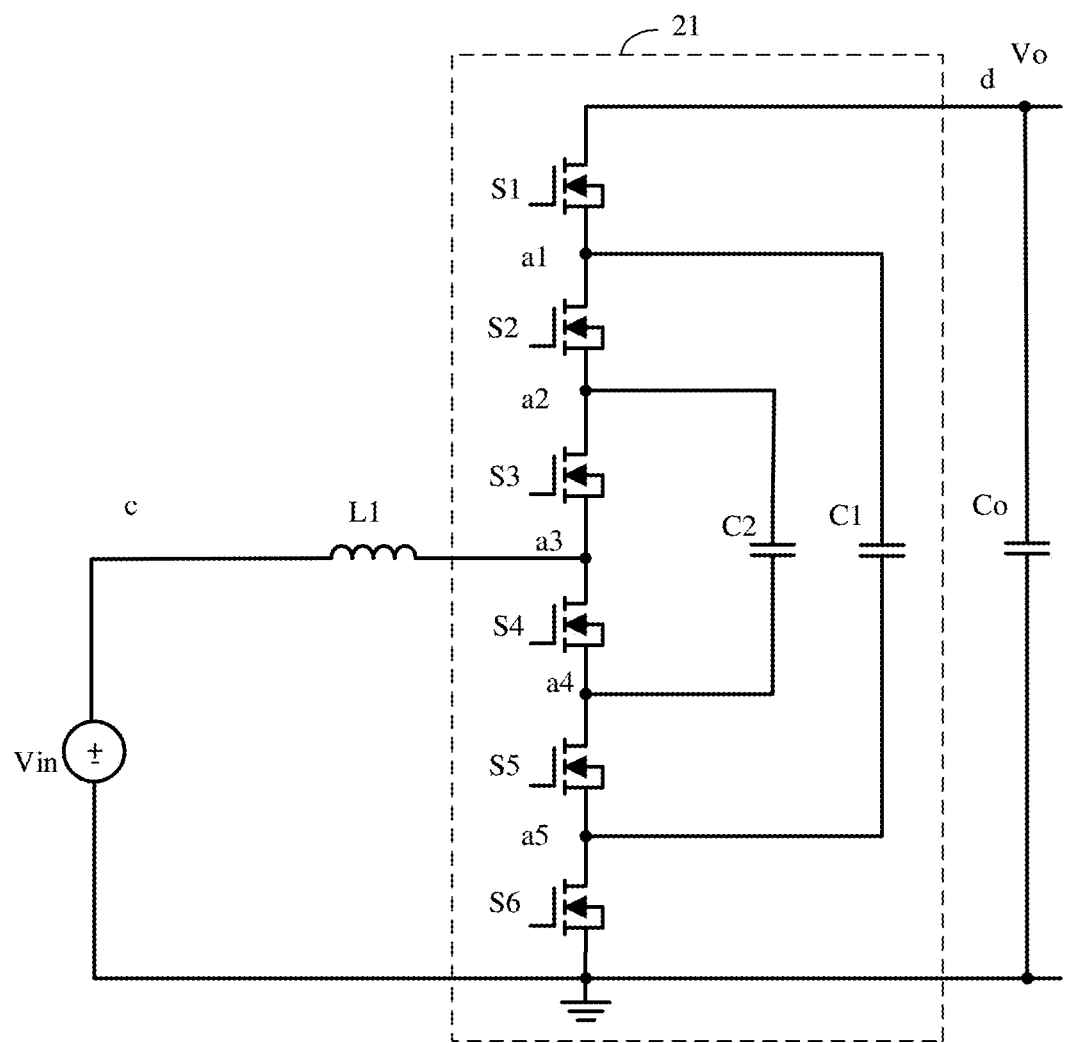
FIG. 10 is a schematic circuit diagram of a first DC to DC conversion module according to a fourth embodiment of the present disclosure.

FIG. 10 is a schematic circuit diagram of a first DC to DC conversion module according to a fourth embodiment of the present disclosure. The first DC to DC conversion module includes a four-level DC to DC boost converter. The four-level DC to DC boost converter includes a switched-capacitor circuit 21 and a first inductor L1. A first terminal of the first inductor L1 is coupled to a high potential input terminal c of the first DC to DC conversion module, and receives the DC input voltage Vin. A second terminal of the first inductor L1 is coupled to a first end of the switched-capacitor circuit 21. A second end of the switched-capacitor circuit 21 serves as a high potential output terminal d of the first DC to DC conversion module. a low potential input terminal of the first DC to DC conversion module is grounded. A low potential output terminal of the first DC to DC conversion module is grounded.

In the fourth embodiment, the switched-capacitor circuit 21 includes power switches S1 to S6 and flying capacitors C1 and C2. The power switches S1 to S6 are connected in series sequentially between the high potential output terminal d of the first DC to DC conversion module and the ground, to form first intermediate nodes a1 to a5. The flying capacitor C1 is coupled between the first intermediate nodes a1 and a5. The flying capacitor C2 is coupled between the first intermediate nodes a2 and a4. The first intermediate node a3 serves as the first end of the switched-capacitor circuit 21, and is coupled to the second terminal of the first inductor L1. In an embodiment, the four-level DC to DC boost converter further includes an output capacitor Co. The output capacitor Co is coupled between the high potential output terminal d of the first DC to DC conversion module and the ground.

Figure 11:
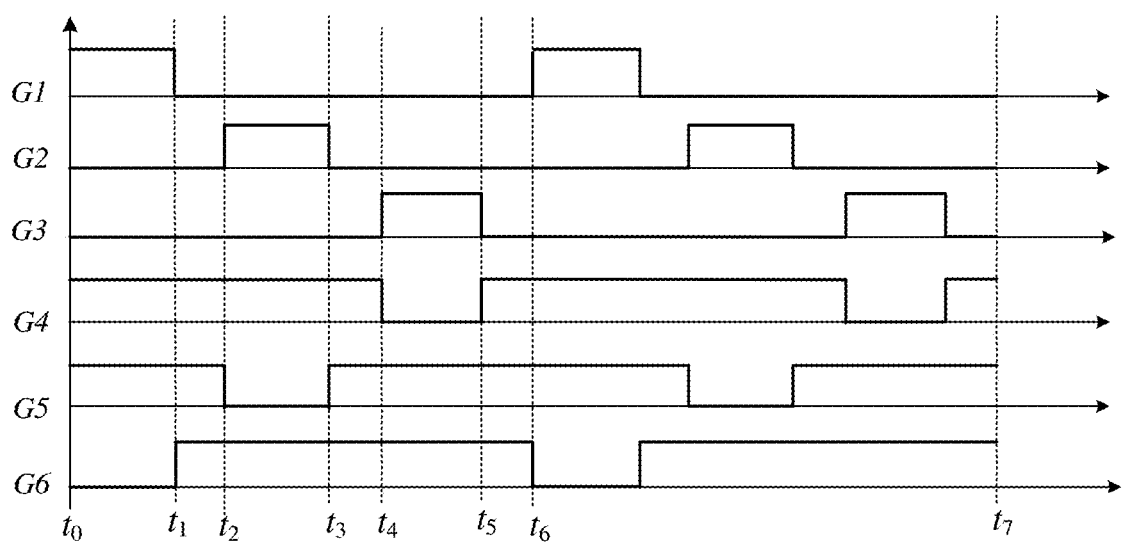
FIG. 11 is a schematic diagram showing operation waveforms of the first DC to DC conversion module according to the fourth embodiment of the present disclosure.

FIG. 11 is a schematic diagram showing operation waveforms of the first DC to DC conversion module according to the fourth embodiment of the present disclosure. Control signals G1 to G6 are used to drive the power switches S1 to S6, respectively. During a time interval from a time instant $t_0$ to a time instant $t_1$, the control signals G1, G4 and G5 each are at a high level, the power switches S1, S4 and S5 are on, and the inductor current decreases. During a time interval from the time instant $t_1$ to a time instant $t_2$, the control signals G4, G5 and G6 each are at a high level, the power switches S4, S5 and S6 are on, and the inductor current increases. During a time interval from the time instant $t_2$ to a time instant $t_3$, the control signals G2, G4 and G6 each are at a high level, the power switches S2, S4 and S6 are on, and the inductor decreases. During a time interval from the time instant $t_3$ to a time instant $t_4$, the control signals G4, G5 and G6 each are at a high level, the power switches S4, S5 and S6 are on, and the inductor current increases. During a time interval from the time instant $t_4$ to a time instant $t_5$, the control signals G3, G5 and G6 are at a high level, the power switches S3, S5 and S6 are on, and the inductor current decreases. During a time interval from the time instant $t_5$ to a time instant $t_6$, the control signals G4, G5 and G6 each are at a high level, the power switches S4, S5 and S6 are on, and the inductor current increases. A time interval from the time instant $t_0$ to the time instant $t_6$ is a switching period.

It can be seen from FIG. 11 that the switching states of the power switch S1 and the power switch S6 are complementary. The switching states of the power switch S2 and the power switch S5 are complementary. The switching states of the power switch S3 and the power switch S4 are complementary. Moreover, it can be seen that at any time instant in a time period during which the four-level DC to DC boost converter operates, three power switches are in the turn-on state, so that a voltage across each of the power switches is equal to one-third of the output voltage, that is, Vo/3. In a boost converter according to the conventional technology, a voltage across a single power switch is equal to the output voltage, that is, Vo. It can be seen that with the four-level DC to DC boost converter, a withstand voltage of each of the power switches is reduced. Therefore, the power switches each are implemented by a switching device with a low withstand voltage. Moreover, in a case that each of the power switches operates at a frequency fs, an equivalent switching frequency for the inductor current is equal to 3×fs. Therefore, in the fourth embodiment, the first inductor L1 is implemented by an inductor with small inductance, and a ripple of the output capacitor Co is small.

In the fourth embodiment, the AC to DC conversion circuit further includes a first control circuit. The first control circuit is configured to control, in two manners, an operation state of the multi-level DC to DC boost converter, so as to perform the power factor correction. The first control circuit with a first structure according to the fourth embodiment is the same as the first control circuit with the first structure according to the first embodiment, and the first control circuit with a second structure according to the fourth embodiment is the same as the first control circuit with the second structure according to the first embodiment. Therefore, the first control circuit according to the fourth embodiment is not described in detail herein.

Figure 12:
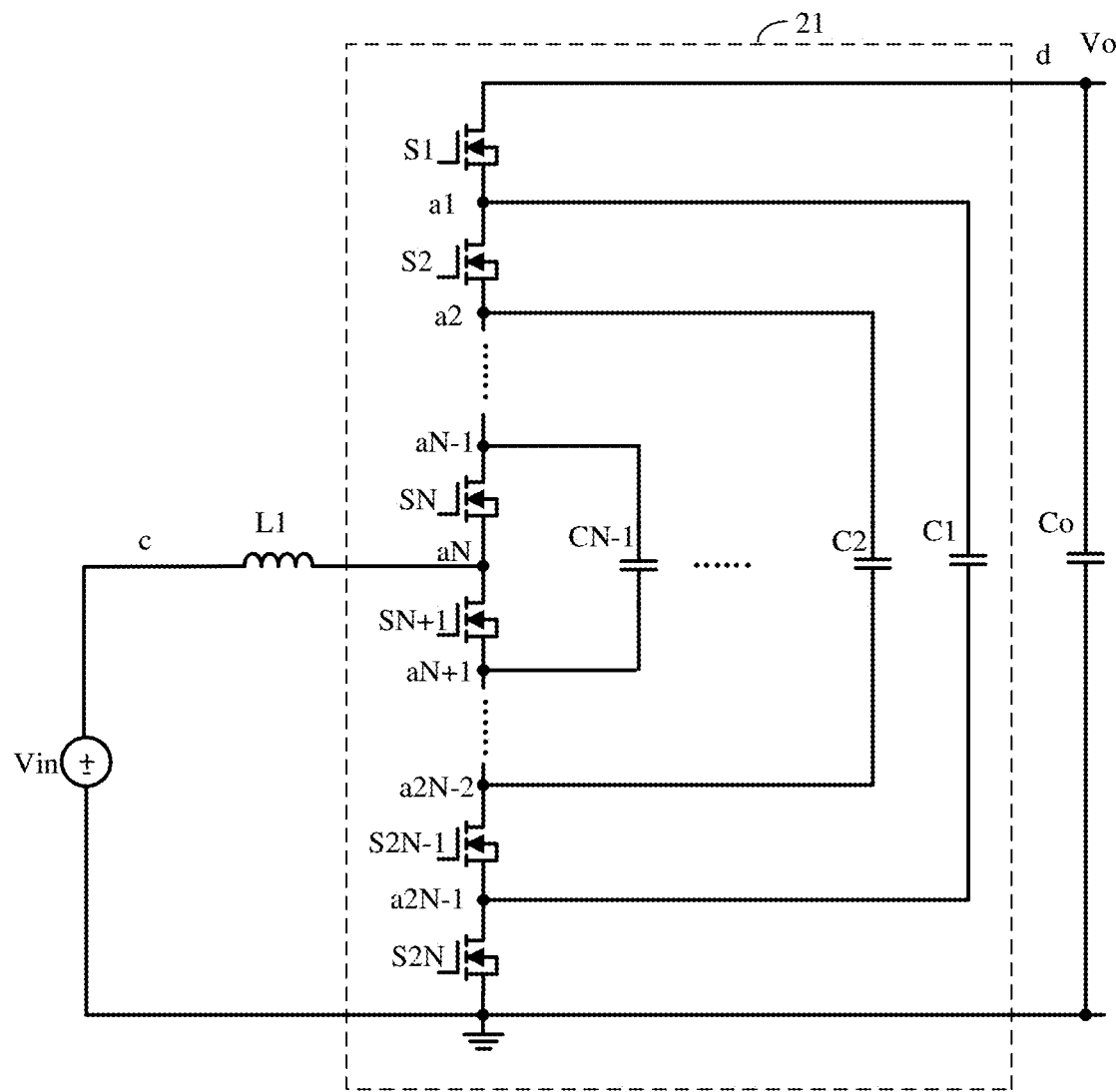
FIG. 12 is a schematic circuit diagram of a first DC to DC conversion module according to a fifth embodiment of the present disclosure.

In the fourth embodiment, the first DC to DC conversion module is implemented by a four-level DC to DC boost converter. In another embodiment, the first DC to DC conversion module is implemented by a DC to DC boost converter with another level. Reference is made to FIG. 12, which is a schematic circuit diagram of a first DC to DC conversion module according to a fifth embodiment of the present disclosure. The first DC to DC conversion module is implemented by an (N+1)-level DC to DC boost converter, and N is greater than 1.

The (N+1)-level DC to DC boost converter includes a switched-capacitor circuit 21 and a first inductor L1. A first terminal of the first inductor L1 is coupled to a high potential input terminal c of the first DC to DC conversion module, and receives the DC input voltage Vin. A second terminal of the first inductor L1 is coupled to a first end of the switched-capacitor circuit 21. A second end of the switched-capacitor circuit 21 serves as a high potential output terminal d of the first DC to DC conversion module. The first DC to DC conversion module in the fifth embodiment is different from the first DC to DC conversion module in the fourth embodiment in that only the switched-capacitor circuit 21 in the fifth embodiment is different from the switched-capacitor circuit 21 in the fourth embodiment.

In the fifth embodiment, the switched-capacitor circuit 21 includes 2N power switches S1 to S2N and N−1 flying capacitors C1 to CN−1. The 2N power switches S1 to S2N are connected in series sequentially between the high potential output terminal d of the first DC to DC conversion module and the ground, to form 2N−1 first intermediate nodes a1 to a2N−1. An m-th flying capacitor Cm is coupled between an m-th first intermediate node am and a (2N−m)-th first intermediate node a2N−m. An N-th first intermediate node aN serves as a first end of the switched-capacitor circuit, and is coupled to the second terminal of the first inductor L, where m is less than or equal to N−1.

In the (N+1)-level DC to DC boost converter, a switching state of a (2N−n+1)-th power switch S2N−n+1 is complementary to a switching state of an n-th power switch Sn, and n is less than or equal to N. At any time instant in a time period during which the (N+1)-level DC to DC boost converter operates, N power switches are in the turn-on state, so that a voltage across each of the power switches is equal to the output voltage divided by N, that is, Vo/N. In a boost converter according to the conventional technology, a voltage across a single power switch is equal to the output voltage, that is, Vo. It can be seen that with the (N+1)-level DC to DC boost converter, a withstand voltage of each of the power switches is reduced. Therefore, the power switches are each implemented by a switching device with a low withstand voltage. Moreover, in a case that each of the power switches operates at a frequency fs, an equivalent switching frequency for the inductor current is equal to N×fs. Therefore, in the fifth embodiment, the first inductor L1 is implemented by an inductor with small inductance, and a ripple of the output capacitor Co is small.

The AC to DC conversion circuit further includes a first control circuit. The first control circuit is configured to control an operation state of the (N+1)-level DC to DC boost converter in two manners, to perform the power factor correction. The first control circuit with a first structure according to the fifth embodiment is the same as the first control circuit with the first structure according to the second embodiment, and the first control circuit with a second structure according to the fifth embodiment is the same as the first control circuit with the second structure according to the second embodiment. Therefore, the first control circuit according to the fifth embodiment is not described in detail herein.

In addition, the switched-capacitor circuit 21 according to the fourth embodiment and the fifth embodiment each may be replaced with a switched-capacitor converter. The switched-capacitor converter according to the fourth embodiment and the fifth embodiment is similar to the switched-capacitor converter according to the third embodiment in structure and control.

Figure 13:
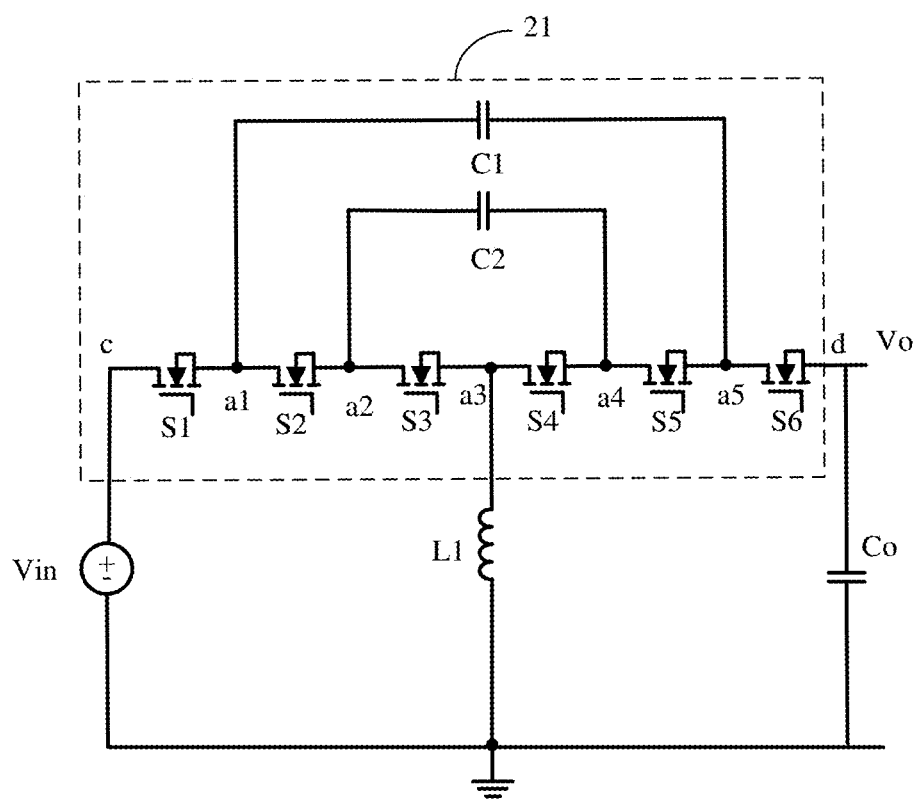
FIG. 13 is a schematic circuit diagram of a first DC to DC conversion module according to a sixth embodiment of the present disclosure.

FIG. 13 is a schematic circuit diagram of a first DC to DC conversion module according to a sixth embodiment of the present disclosure. The first DC to DC conversion module includes a four-level DC to DC buck-boost (negative voltage) converter. The four-level DC to DC buck-boost converter includes a switched-capacitor circuit 21 and a first inductor L1. A first end of the switched-capacitor circuit 21 serves as a high potential input terminal c of the first DC to DC conversion module, and receives the DC input voltage Vin. A second end of the switched-capacitor circuit 21 serves as a high potential output terminal d of the first DC to DC conversion module. A third end of the switched-capacitor circuit 21 is coupled to a first terminal of the first inductor L1. A second terminal of the first inductor L1 is grounded a low potential input terminal of the first DC to DC conversion module is grounded. A low potential output terminal of the first DC to DC conversion module is grounded.

In the sixth embodiment, the switched-capacitor circuit 21 includes power switches S1 to S6 and flying capacitors C1 and C2. The power switches S1 to S6 are connected in series sequentially between the high potential input terminal c and the high potential output terminal d of the first DC to DC conversion module, to form first intermediate nodes a1 to a5. The flying capacitor C1 is coupled between the first intermediate nodes a1 and a5. The flying capacitor C2 is coupled between the first intermediate nodes a2 and a4. The first intermediate node a3 serves as the third end of the switched-capacitor circuit 21, and is coupled to the first terminal of the first inductor L1. In an embodiment, the four-level DC to DC buck-boost converter further includes an output capacitor Co. The output capacitor Co is coupled between the high potential output terminal d of the first DC to DC conversion module and the ground.

Figure 14:
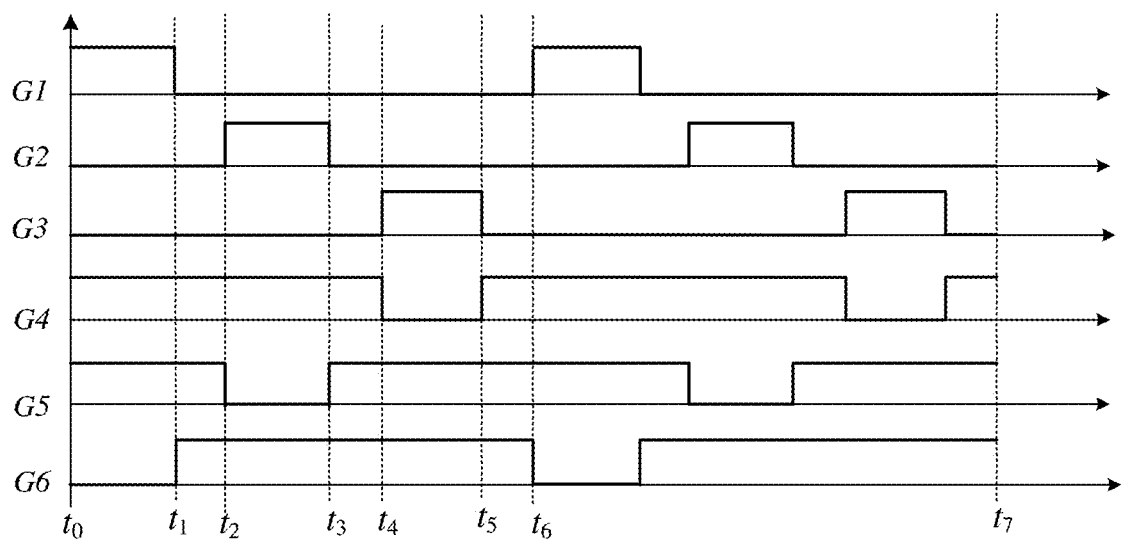
FIG. 14 is a schematic diagram showing operation waveforms of the first DC to DC conversion module according to the sixth embodiment of the present disclosure.

FIG. 14 is a schematic diagram showing operation waveforms of the first DC to DC conversion module according to the sixth embodiment of the present disclosure. Control signals G1 to G6 are used to drive the power switches S1 to S6, respectively. During a time interval from a time instant $t_0$ to a time instant $t_1$, the control signals G1, G4 and G5 each are at a high level, the power switches S1, S4 and S5 are on, and the inductor current increases. During a time interval from the time instant $t_1$ to a time instant $t_2$, the control signals G4, G5 and G6 each are at a high level, the power switches S4, S5 and S6 are on, and the inductor current decreases. During a time interval from the time instant $t_2$ to a time instant $t_3$, the control signals G2, G4 and G6 each are at a high level, the power switches S2, S4 and S6 are on, and the inductor current increases. During a time interval from the time instant $t_3$ to a time instant $t_4$, the control signals G4, G5 and G6 each are at a high level, the power switches S4, S5 and S6 are on, and the inductor current decreases. During a time interval from the time instant $t_4$ to a time instant $t_5$, the control signals G3, G5 and G6 each are at a high level, the power switches S3, S5 and S6 are on, and the inductor increases. During a time interval from the time instant $t_5$ to a time instant $t_6$, the control signals G4, G5 and G6 each are at a high level, the power switches S4, S5 and S6 are on, and the inductor current decreases. A time interval from the time instant $t_0$ to the time instant $t_6$ is a switching period.

It can be seen from FIG. 14 that the switching states of the power switch S1 and the power switch S6 are complementary. The switching states of the power switch S2 and the power switch S5 complementary. The switching states of the power switch S3 and the power switch S4 are complementary. Moreover, it can be seen that at any time instant in a time period during which the four-level DC to DC buck-boost converter operates, three power switches are in the turn-on state, so that a voltage across each of the power switches is equal to one-third of a sum of the DC input voltage Vin and the output voltage Vo, that is, (Vin+Vo)/3. In a buck-boost (negative voltage) converter according to the conventional technology, a voltage across a single power switch is equal to the sum of the DC input voltage Vin and the output voltage Vo, that is, Vin+Vo. It can be seen that with the four-level DC to DC buck-boost converter, a withstand voltage of each of the power switches is reduced, so that the power switches each are implemented by a switching device with a low withstand voltage. Moreover, in a case that each of the power switches operates at a frequency fs, an equivalent switching frequency for the inductor current is equal to 3×fs. Therefore, in the sixth embodiment, the first inductor L1 is implemented by an inductor with small inductance, and a ripple of the output capacitor Co is small.

In the sixth embodiment, the AC to DC conversion circuit further includes a first control circuit. The first control circuit controls an operation state of the four-level DC to DC buck-boost (negative voltage) converter in two manners, to perform the power factor correction. The first control circuit with a first structure according to the sixth embodiment is the same as the first control circuit with the first structure according to the first embodiment, and the first control circuit with a second structure according to the sixth embodiment is the same as the first control circuit with the second structure according to the first embodiment. Therefore, the first control circuit according to the sixth embodiment is not described in detail herein.

Figure 15:
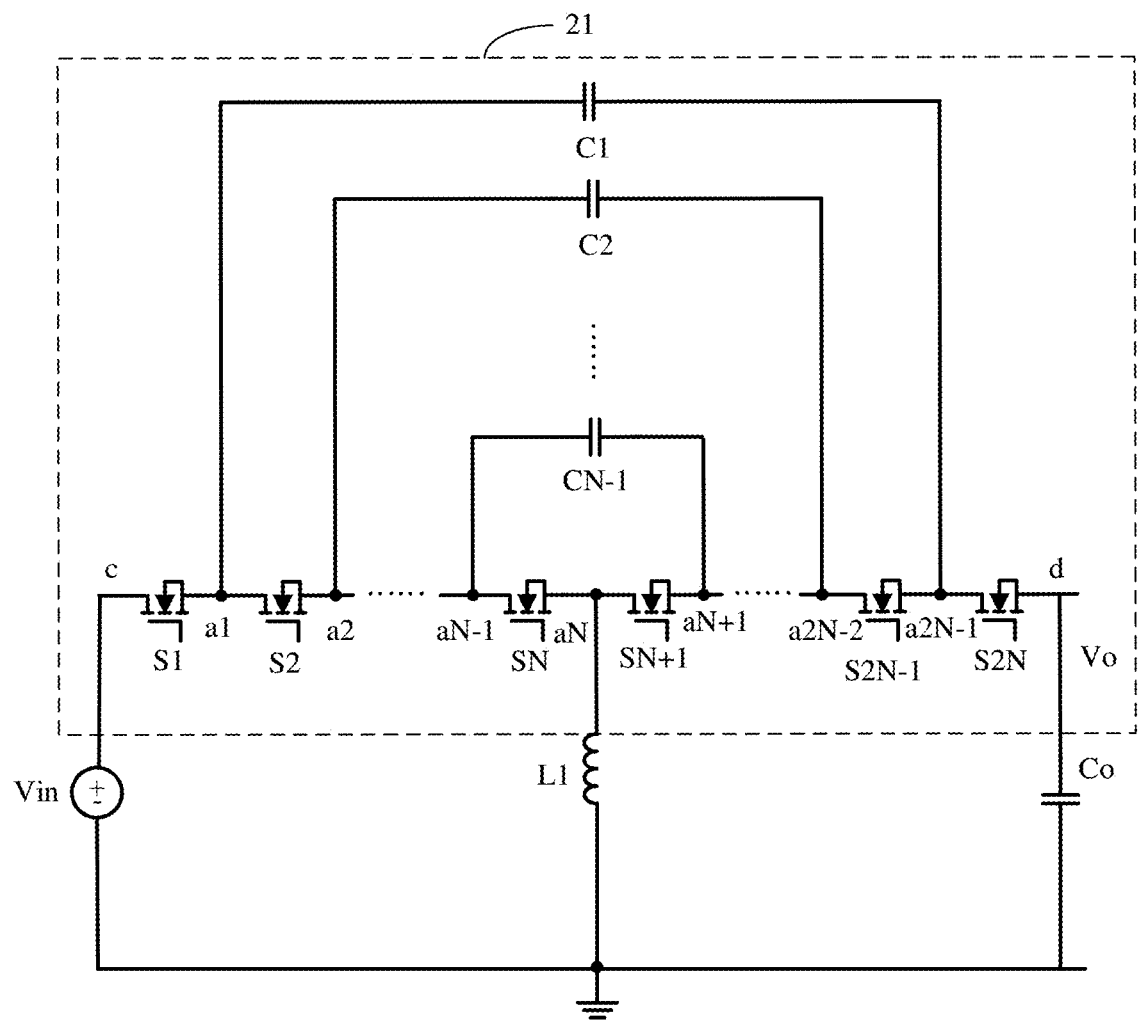
FIG. 15 is a schematic circuit diagram of a first DC to DC conversion module according to a seventh embodiment of the present disclosure.

In the sixth embodiment, the first DC to DC conversion module is implemented by a four-level DC to DC buck-boost (negative voltage) converter. In another embodiment, the first DC to DC conversion module is implemented by a DC to DC buck-boost converter of another level. Reference is made to FIG. 15, which is a schematic circuit diagram of a first DC to DC conversion module according to a seventh embodiment of the present disclosure. The first DC to DC conversion module is implemented by an (N+1)-level DC to DC buck-boost (negative voltage) converter, and N is greater than 1.

The (N+1)-level DC to DC buck-boost converter includes a switched-capacitor circuit 21 and a first inductor L1. A first end of the switched-capacitor circuit 21 serves as a high potential input terminal c of the first DC to DC conversion module, and receives the DC input voltage Vin. A second end of the switched-capacitor circuit 21 serves as a high potential output terminal d of the first DC to DC conversion module. A third end of the switched-capacitor circuit 21 is coupled to a first terminal of the first inductor L1. A second terminal of the first inductor L1 is grounded. The first DC to DC conversion module in the seventh embodiment is different from the first DC to DC conversion module in the sixth embodiment in that only the switched-capacitor circuit 21 in the seventh embodiment is different from the switched-capacitor circuit 21 in the sixth embodiment.

In the seventh embodiment, the switched-capacitor circuit 21 includes 2N power switches S1 to S2N and N−1 flying capacitors C1 to CN−1. The 2N power switches S1 to S2N are sequentially connected in series sequentially between the high potential input terminal c and the high potential output terminal d of the first DC to DC conversion module, to form 2N−1 first intermediate nodes a1 to a2N−1. An m-th flying capacitor Cm is coupled between an m-th first intermediate node am and a (2N−m)-th first intermediate node a2N−m. The N-th first intermediate node aN serves as the third end of the switched-capacitor circuit 21, and is coupled to the first terminal of the first inductor L, where m is less than or equal to N−1.

In the (N+1)-level DC to DC buck-boost (negative voltage) converter, a switching state of a (2N−n+1)-th power switch S2N−n+1 is complementary to a switching state of an n-th power switch Sn, and n is less than or equal to N. At any time instant in a time period during which the (N+1)-level DC to DC buck-boost converter operates, N power switches are in the turn-on state, so that a voltage across each of the power switches is equal to 1/N of a sum of the output voltage Vo and the DC input voltage Vin, that is, (Vo+Vin)/N. In a buck-boost converter according to the conventional technology, a voltage across a single power switch is equal to the sum of the output voltage Vo and the DC input voltage Vin, that is, Vo+Vin. It can be seen that with the (N+1)-level DC to DC buck-boost converter, a withstand voltage of each of the power switches is reduced, so that the power switches each are implemented by a switching device with a low withstand voltage. Moreover, in a case that each of the power switches operates at a frequency fs, an equivalent switching frequency for the inductor current is equal to N×fs. Therefore, in the seventh embodiment, the first inductor L1 is implemented by an inductor with small inductance, and a ripple of the output capacitor Co is small.

The AC to DC conversion circuit further includes a first control circuit. The first control circuit controls an operation state of the (N+1)-level DC to DC buck-boost converter in two manners, to perform the power factor correction. The first control circuit with a first structure according to the seventh embodiment is the same as the first control circuit with the first structure according to the second embodiment, and the first control circuit with a second structure according to the seventh embodiment is the same as the first control circuit with the second structure according to the second embodiment. Therefore, the first control circuit according to the seventh embodiment is not described in detail herein.

In addition, the switched-capacitor circuit 21 according to the sixth embodiment and the switched-capacitor circuit 21 according to the seventh embodiment each may be replaced with a switched-capacitor converter. The switched-capacitor converter according to the sixth embodiment and the seventh embodiment is similar to the switched-capacitor converter according to the third embodiment in structure and control.

Figure 16:
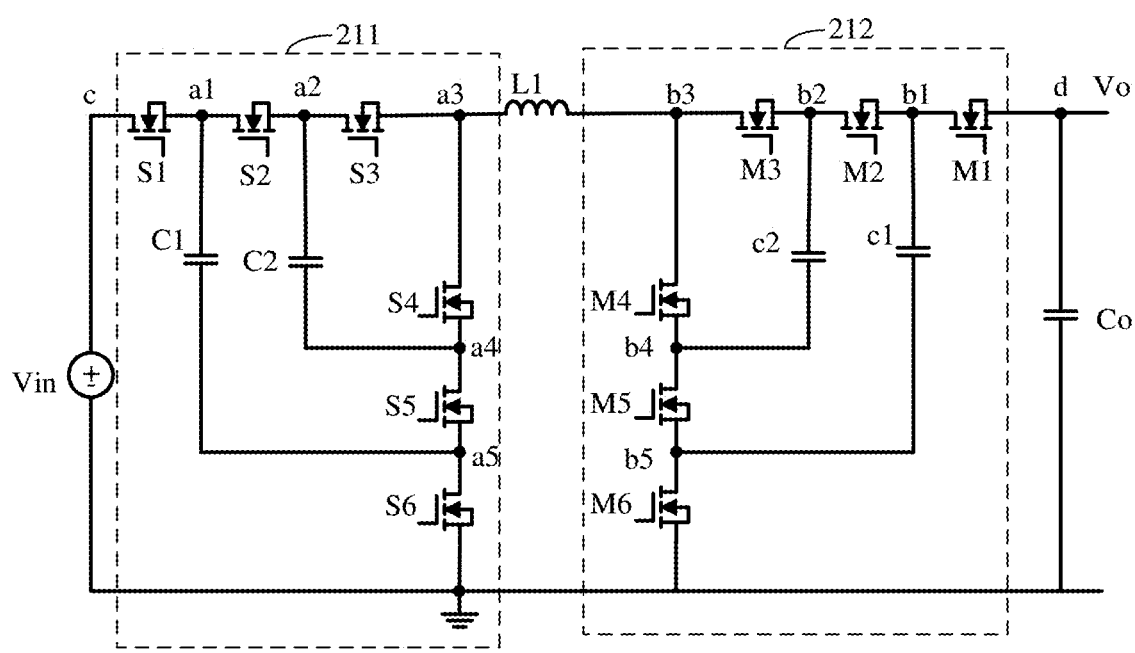
FIG. 16 is a schematic circuit diagram of a first DC to DC conversion module according to an eighth embodiment of the present disclosure.

FIG. 16 is a schematic circuit diagram of a first DC to DC conversion module according to an eighth embodiment of the present disclosure. The first DC to DC conversion module includes a four-level DC to DC buck-boost (positive voltage) converter. The four-level DC to DC buck-boost converter includes a first switched-capacitor circuit 211, a second switched-capacitor circuit 212 and a first inductor L1. A first end of the first switched-capacitor circuit 211 serves as a high potential input terminal c of the first DC to DC conversion module, and receives the DC input voltage Vin. A second end of the first switched-capacitor circuit 211 is coupled to a first terminal of the first inductor L1. A second terminal of the first inductor L1 is coupled to a first end of the second switched-capacitor circuit 212. A second end of the second switched-capacitor circuit 212 serves as a high potential output terminal d of the first DC to DC conversion module a low potential input terminal of the first DC to DC conversion module is grounded. A low potential output terminal of the first DC to DC conversion module is grounded.

In the eighth embodiment, the first switched-capacitor circuit 211 includes first power switches S1 to S6 and first flying capacitors C1 and C2. The first power switches S1 to S6 are connected in series sequentially between the high potential input terminal c of the first DC to DC conversion module and the ground, to form first intermediate nodes a1 to a5. The first flying capacitor C1 is coupled between the first intermediate nodes a1 and a5. The first flying capacitor C2 is coupled between the first intermediate nodes a2 and a4. The first intermediate node a3 serves as the second end of the first switched-capacitor circuit 211, and is coupled to the first terminal of the first inductor L1. The second switched-capacitor circuit 212 includes second power switches M1 to M6 and second flying capacitors c1 and c2. The second power switches M1 to M6 are connected in series sequentially between the high potential output terminal d of the first DC to DC conversion module and the ground, to form second intermediate nodes b1 to b5. The second flying capacitor c1 is coupled between the second intermediate nodes b1 and b5. The second flying capacitor c2 is coupled between the second intermediate nodes b2 and b4. The second intermediate node b3 serves as the first end of the second switched-capacitor circuit 212, and is coupled to the second terminal of the first inductor L1. In an embodiment, the four-level DC to DC buck-boost converter further includes an output capacitor Co. The output capacitor Co is coupled between the high potential output terminal d of the first DC to DC conversion module and the ground.

Figure 17:
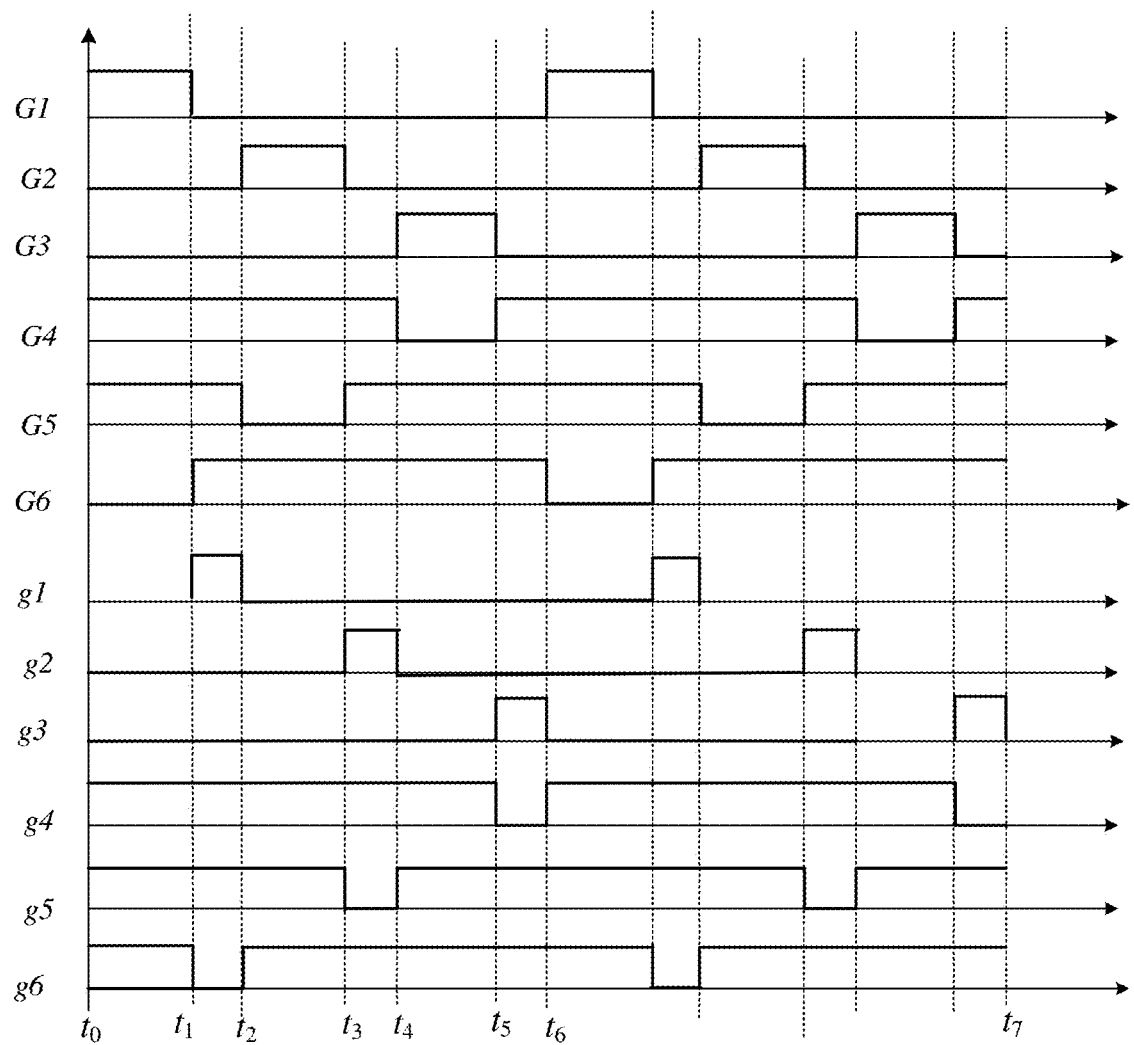
FIG. 17 is a schematic diagram showing operation waveforms of the first DC to DC conversion module according to the eighth embodiment of the present disclosure.

FIG. 17 is a schematic diagram showing operation waveforms of the first DC to DC conversion module according to the eighth embodiment of the present disclosure. Control signals G1 to G6 are used to drive the first power switches S1 to S6, respectively. Control signals g1 to g6 are used to drive the second power switches M1 to M6, respectively. During a time interval from a time instant $t_0$ to a time instant $t_1$, the control signals G1, G4, G5, g4, g5 and g6 are each at a high level, the first power switches S1, S4 and S5 and the second power switches M4, M5 and M6 are on, and the inductor current increases. During a time interval from the time instant $t_1$ to a time instant $t_2$, the control signals G4, G5, G6, g1, g4 and g5 each are at a high level, the first power switches S4, S5 and S6 and the second power switches M1, M4 and M5 are on, and the inductor current decreases. During a time interval from the time instant $t_2$ to a time instant $t_3$, the control signals G2, G4, G6, g4, g5 and g6 each are at a high level, the first power switches S2, S4 and S6 and the second power switches M4, M5 and M6 are on, and the inductor current increases. During a time interval from the time instant $t_3$ to a time instant $t_4$, the control signals G4, G5, G6, g2, g4 and g6 are at a high level, the first power switches S4, S5 and S6 and the second power switches M2, M4 and M6 are on, and the inductor current decreases. During a time interval from the time instant $t_4$ to a time instant $t_5$, the control signals G3, G5, G6, g4, g5 and g6 each are at a high level, the first power switches S3, S5 and S6 and the second power switches M4, M5 and M6 are on, and the inductor current increases. During a time interval from the time instant $t_5$ to a time instant $t_6$, the control signals G4, G5, G6, g3, g5 and g6 each are at a high level, the first power switches S4, S5 and S6 and the second power switches M3, M5 and M6 are on, and the inductor current decreases. A time interval from the time instant $t_0$ to the time instant $t_6$ is a switching period.

It can be seen from FIG. 17 that the switching state of first power switch S1 is complementary to the switching state of the first power switch S6. The switching state of the first power switch S2 is complementary to the switching state of the first power switch S5. The switching state of the first power switch S3 is complementary to the switching state of the first power switch S4. The switching state of the second power switch M1 is complementary to the switching state of the second power switch M6. The switching state of the second power switch M2 is complementary to the switching state of the second power switch M5. The switching state of the second power switch M3 is complementary to the switching state of the second power switch M4. Further, the second power switch M1 is turned on after the first power switch S1 is turned off and before the first power switch S2 is turned on. The second power switch M2 is turned on after the first power switch S2 is turned off and before the first power switch S3 is turned on. The second power switch M3 is turned on after the first power switch S3 is turned off and before the first power switch S1 is turned on for a next cycle. Moreover, it can be seen that at any time instant in a time period during which the four-level DC to DC buck-boost converter operates, three power switches in the first switched-capacitor circuit 211 and three power switches in the second switched-capacitor circuit 212 are in the turn-on state. Therefore, a voltage across each of the power switches in the first switched-capacitor circuit 211 is equal to one-third of the DC input voltage Vin, that is, ⅓×Vin, and a voltage across each of the power switches in the second switched-capacitor circuit 212 is equal to one-third of the output voltage Vo, that is, ⅓×Vo. In a buck-boost (positive voltage) converter according to the conventional technology, a voltage across a single power switch is equal to the output voltage Vo or the DC input voltage Vin. It can be seen that with the four-level DC to DC buck-boost converter, a withstand voltage of each of the power switches is reduced, so that the power switches each are implemented by a switching device with a low withstand voltage. Moreover, in a case that each of the power switches operates at a frequency fs, an equivalent switching frequency for the inductor current is equal to 3×fs. Therefore, in the eighth embodiment, the first inductor L1 is implemented by an inductor with small inductance, and a ripple of the output capacitor Co is small.

In the eighth embodiment, the AC to DC conversion circuit further includes two first control circuits. The two first control circuits control an operation state of the multi-level DC to DC converter in two manners, to perform the power factor correction. One of the two first control circuits is configured to control switching states of the power switches in the first switched-capacitor circuit 211, and the other of the two first control circuits is configured to control switching states of the power switches in the second switched-capacitor circuit 212. The first control circuit with a first structure according to the eighth embodiment is the same as the first control circuit with the first structure according to the first embodiment, and the first control circuit with a second structure according to the eighth embodiment is the same as the first control circuit with the second structure according to the first embodiment. Therefore, the first control circuit according to the eighth embodiment is not described in detail herein.

Figure 18:
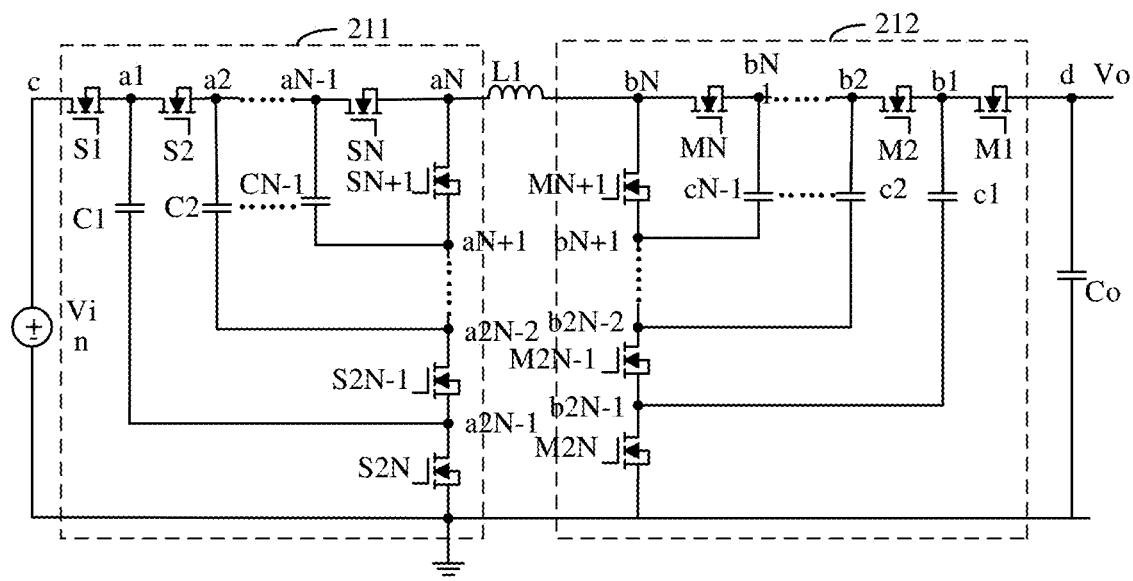
FIG. 18 is a schematic circuit diagram of a first DC to DC conversion module according to a ninth embodiment of the present disclosure.

In the eighth embodiment, the first DC to DC conversion module is implemented by a four-level DC to DC buck-boost (positive voltage) converter. In another embodiment, the first DC to DC conversion module is implemented by a DC to DC buck-boost converter of another level. Reference is made to FIG. 18, which is a schematic circuit diagram of a first DC to DC conversion module according to a ninth embodiment of the present disclosure. The first DC to DC conversion module is implemented by an (N+1)-level DC to DC buck-boost (positive voltage) converter, and N is greater than 1.

The (N+1)-level DC to DC buck-boost converter includes a first switched-capacitor circuit 211, a second switched-capacitor circuit 212 and a first inductor L1. A first end of the first switched-capacitor circuit 211 serve as a high potential input terminal c of the first DC to DC conversion module, and receives the DC input voltage Vin. A second end of the first switched-capacitor circuit 21 is coupled to a first terminal of the first inductor L1. A second terminal of the first inductor L1 is coupled to a first end of the second switched-capacitor circuit 212. A second end of the second switched-capacitor circuit 212 serves as a high potential output terminal d of the first DC to DC conversion module. The first DC to DC conversion module in the ninth embodiment is different from the first DC to DC conversion module in the eighth embodiment in that only the first switched-capacitor circuit 211 and the second switched-capacitor circuit 212 in the ninth embodiment are different from the first switched-capacitor circuit 211 and the second switched-capacitor circuit 212 in the eighth embodiment, respectively.

In the ninth embodiment, the first switched-capacitor circuit 211 includes 2N first power switches S1 to S2N and N−1 first flying capacitors C1 to CN−1. The 2N first power switches S1 to S2N are connected in series sequentially between the high potential input terminal c of the first DC to DC conversion module and the ground, to form 2N−1 first intermediate nodes a1 to a2N−1. An m-th first flying capacitor Cm is coupled between an m-th first intermediate node am and (2N−m)-th first intermediate node a2N−m. The N-th first intermediate node aN serves as the second end of the first switched-capacitor circuit 211, and is coupled to the first terminal of the first inductor L1. The second switched-capacitor circuit 212 includes 2N second power switches M1 to M2N and N−1 second flying capacitors c1 to cN−1. The 2N second power switches M1 to M2N are connected in series sequentially between the high potential output terminal d of the first DC to DC conversion module and the ground, to form 2N−1 second intermediate nodes b1 to b2N−1. An m-th second flying capacitor cm is coupled between an m-th second intermediate node bm and an (2N−m)-th second intermediate node bN−m. The N-th second intermediate node bN serves as the first end of the second switched-capacitor circuit 212, and is coupled to the second terminal of the first inductor L1, where m is less than or equal to N−1.

In the (N+1)-level DC to DC buck-boost (positive voltage) converter, a switching state of a (2N−n+1)-th first power switch S2N−n+1 is complementary to a switching state of an n-th first power switch Sn. A switching state of a (2N−n+1)-th second power switch M2N−n+1 is complementary to a switching state of an n-th second power switch Mn. n is less than or equal to N. An e-th second power switch Me is turned on after an e-th first power switch Se is turned off and before an (e+1)-th first power switch Se+1 is turned on e is less than N. An N-th second power switch MN is turned on after an N-th first power switch SN is turned off and before a 1st first power switch S1 is turned on for a next cycle. At any time instant in a time period during which the four-level DC to DC buck-boost converter operates, N power switches in the first switched-capacitor circuit 211 and N power switches in the second switched-capacitor circuit 212 are in the turn-on state. Therefore, a voltage across each of the power switches in the first switched-capacitor circuit 211 is equal to 1/N of the DC input voltage Vin, that is, 1/N×Vin, and a voltage across each of the power switches in the second switched-capacitor circuit 212 is equal to 1/N of the output voltage Vo, that is, 1/N×Vo. In a buck-boost (positive voltage) converter according to the conventional technology, a voltage across a single power switch is equal to the output voltage Vo or the DC input voltage Vin. It can be seen that with the (N+1)-level DC to DC buck-boost converter, a withstand voltage of each of the power switches is reduced, so that the power switches each are implemented by a switching device with a low withstand voltage. Moreover, in a case that each of the power switches operates at a frequency fs, an equivalent switching frequency for the inductor current is equal to N×fs. Therefore, in the ninth embodiment, the first inductor L1 is implemented by an inductor with small inductance, and a ripple of the output capacitor Co is small.

The AC to DC conversion circuit further includes two first control circuits. The two first control circuits control an operation state of the (N+1)-level DC to DC buck-boost converter, to perform the power factor correction. The two first control circuits control an operation state of the multilevel DC to DC converter in two manners, to perform the power factor correction. One of the two first control circuits is configured to control switching states of the power switches in the first switched-capacitor circuit 211, and the other of the two first control circuits is configured to control switching states of the power switches in the second switched-capacitor circuit 212. The first control circuit with a first structure according to the ninth embodiment is the same as the first control circuit with the first structure according to the second embodiment, and the first control circuit with a second structure according to the ninth embodiment is the same as the first control circuit with the second structure according to the second embodiment. Therefore, the first control circuit according to the ninth embodiment is not described in detail herein.

In addition, each of the first switched-capacitor circuit 211 and the second switched-capacitor circuit 212 in the eighth embodiment and the ninth embodiment may be replaced with a switched-capacitor converter, which is similar to the switched-capacitor converter according to the third embodiment in structure and control.

Figure 19:
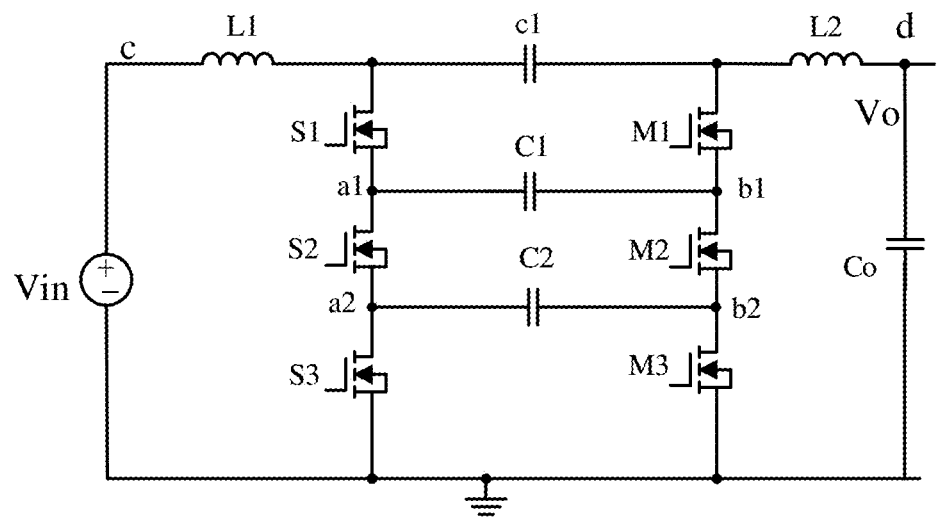
FIG. 19 is a schematic circuit diagram of a first DC to DC conversion module according to a tenth embodiment of the present disclosure.

FIG. 19 is a schematic circuit diagram of a first DC to DC conversion module according to a tenth embodiment of the present disclosure. The first DC to DC conversion module includes a four-level DC to DC cuk converter. The four-level DC to DC cuk converter includes first power switches S1 to S3, second power switches M1 to M3, flying capacitors C1 and C2, a first inductor L1, a second inductor L2 and a first capacitor c1. A first terminal of the first inductor L1 is coupled to a high potential input terminal c of the first DC to DC conversion module, and receives the DC input voltage Vin. A second terminal of the first inductor L1 is coupled to a first terminal of the first capacitor c1. A second terminal of the first capacitor c1 is coupled to a first terminal of the second inductor L2. A second terminal of the second inductor L2 is coupled to a high potential output terminal d of the first DC to DC conversion module. The first power switches S3 to S1 are connected in series sequentially between the ground and a common terminal of the first inductor L1 and the first capacitor c1, to form first intermediate nodes a2 and a1. The second power switches M3 to M1 are connected in series sequentially between the ground and a common terminal of the second inductor L2 and the first capacitor c1, to form second intermediate nodes b2 and b1. The flying capacitor C1 is coupled between the first intermediate node a1 and the second intermediate node b1. The flying capacitor C2 is coupled between the first intermediate node a2 and the second intermediate node b2. a low potential input terminal of the first DC to DC conversion module is grounded. A low potential output terminal of the first DC to DC conversion module is grounded. In an embodiment, the four-level DC to DC cuk converter further includes an output capacitor Co. The output capacitor Co is coupled between a high potential output terminal d of the first DC to DC conversion module and the ground.

Figure 20:
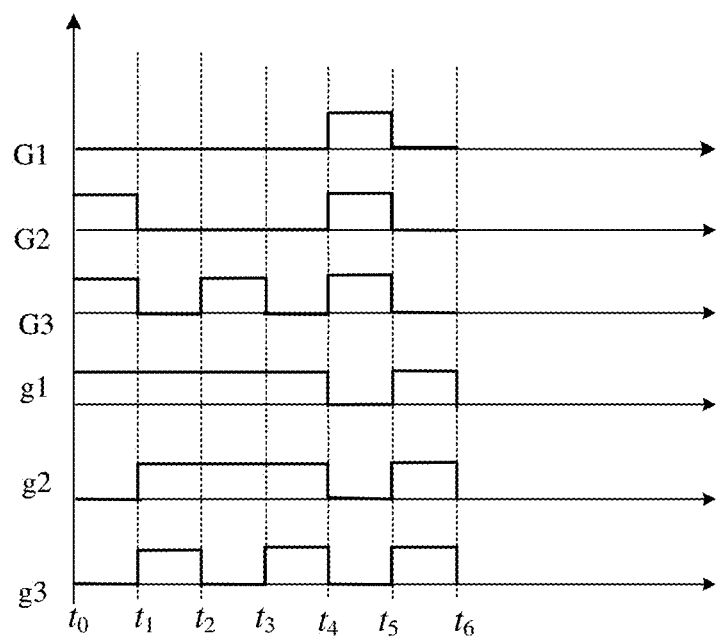
FIG. 20 is a schematic diagram showing operation waveforms of the first DC to DC conversion module according to the tenth embodiment of the present disclosure.

FIG. 20 is a schematic diagram showing operation waveforms of the first DC to DC conversion module according to the tenth embodiment of the present disclosure. Control signals G1 to G3 are used to drive the first power switches S1 to S3, respectively. Control signals g1 to g3 are used to drive the second power switches M1 to M3, respectively. During a time interval from a time instant $t_0$ to a time instant $t_1$, the control signals G2, G3 and g1 each are at a high level, the first power switches S2 and S3 and the second power switch M1 are on, and a current passing through the second inductor L2 increases. During a time interval from the time instant $t_1$ to a time instant $t_2$, the control signals g1, g2 and g3 each are at a high level, the second power switches M1, M2 and M3 are on, and the current passing through the second inductor L2 decreases. During a time interval from the time instant $t_2$ to a time instant $t_3$, the control signals G3, g1 and g2 each are at a high level, the first power switch S3 and the second power switches M1 and M2 are on, and the current passing through the second inductor L2 increases. During a time interval from the time instant $t_3$ to a time instant $t_4$, the control signals g1, g2, and g3 each are at a high level, the second power switches M1, M2 and M3 are on, and the current passing through the second inductor L2 decreases. During a time interval from the time instant $t_4$ to a time instant $t_5$, the control signals G1, G2 and G3 each are at a high level, the first power switches S1, S2 and S3 are on, and the current passing through the second inductor L2 increases. During a time interval from the time instant $t_5$ to a time instant $t_6$, the control signals g1, g2 and g3 each are at a high level, the second power switches M1, M2 and M3 are on, and the current passing through the second inductor L2 decreases. A time interval from the time instant $t_0$ to the time instant $t_6$ is a switching period. The time interval from the time instant $t_0$ to the time instant $t_1$, the time interval from the time instant $t_2$ to the time instant $t_3$ and the time interval from the time instant $t_4$ to the time instant $t_5$ are equal in length. The time interval from the time instant $t_1$ to the time instant $t_2$, the time interval from the time instant $t_3$ to the time instant $t_4$ and the time interval from the time instant $t_5$ to the time instant $t_6$ are equal in length.

It can be seen from FIG. 20 that the switching state of the first power switch S1 is complementary to the switching state of the second power switch M1. The switching state of the first power switch S2 is complementary to the switching state of the second power switch M2. The switching state of the first power switch S3 is complementary to the switching state of the second power switch M3. During one switching period, the first power switch S1 is turned on one time, the first power switch S2 is turned on twice, and the first power switch S3 is turned on three times. The three first power switches S1 to S3 are on for the same duration every time. During one switching period every time, the first power switch S3 is turned off three times and is off for the same duration. Moreover, it can be seen that at any time instant in a time period during which the four-level DC to DC cuk converter operates, three power switches are in the turn-on state, so that a voltage across each of the power switches is equal to one-third of a sum of the output voltage Vo and the DC input voltage Vin, that is, (Vo+Vin)/3. In a cuk converter according to the conventional technology, a voltage across a single power switch is equal to the sum of the output voltage Vo and the DC input voltage Vin, that is, (Vo+Vin). It can be seen that with the four-level DC to DC cuk converter, a withstand voltage of each of the power switches is reduced. Therefore, the power switches each are implemented by a switching device with a low withstand voltage. Moreover, in a case that each of the power switches operates at a frequency fs, an equivalent switching frequency for the inductor current is equal to 3×fs. Therefore, in the tenth embodiment, the second inductor L2 is implemented by an inductor with small inductance, and a ripple of the output capacitor Co is small.

In the tenth embodiment, the AC to DC conversion circuit further includes a first control circuit. The first control circuit controls an operation state of the four-level DC to DC cuk converter in two manners, to perform the power factor correction. The first control circuit with a first structure according to the tenth embodiment is similar to the first control circuit with the first structure according to the first embodiment, with a difference in that a structure of the PWM generation module 44 according to the tenth embodiment is different from the structure of the PWM generation module 44 according to the first embodiment. The PWM generation module 44 according to the tenth embodiment is configured to control the switching states of the first power switches S1 to S3 and the second power switches M1 to M3. In the tenth embodiment, the PWM generation module 44 is configured to receive the first duty cycle signal D, and turn on a q-th first power switch Sq q times during one switching period, where q is less than or equal to 3. The first power switch S1 is turned on once, the first power switch S2 is turned on twice, and the first power switch S3 is turned on three times. The three first power switches S1 to S3 are on for the same duration every time (that is, the time interval from the time instant $t_0$ to the time instant $t_1$, the time interval from the time instant $t_2$ to the time instant $t_3$ and the time interval from the time instant $t_4$ to the time instant $t_5$ are equal in length). The PWM generation module 44 is configured to determine, for each of the first power switches, conduction duration based on the first duty cycle signal D. During one switching period, the first power switch S3 is turned off three times, and is off for the same duration every time (that is, the time interval from the time instant $t_1$ to the time instant $t_2$, the time interval from the time instant $t_3$ to the time instant $t_4$ and the time interval from the time instant $t_5$ to the time instant $t_6$ are equal in length). Therefore, a time period from the time instant $t_1$ to the time instant $t_0$ divided by a time period from the time instant $t_2$ to the time instant $t_0$ is equal to the first duty cycle signal D (i.e., $(t_1-t_0)/(t_2-t_0)=D$), and the time period from the time instant $t_2$ to the time instant $t_0$ is equal to one-third of the switching period, so that the time period from the time instant $t_1$ to the time instant $t_0$ is divided by the one-third of the switching period is equal to the first duty cycle signal D, thereby obtaining, for each of the first power switches S1 to S3, a time instant when the first power switch is turned off. In an embodiment, for each of the first power switches S1 to S3, a time instant when the first power switch turned on is determined based on a clock signal. The PWM generation module 44 is further configured to control the second power switches M1 to M3, so that the switching state of the second switching transistor M1 is complementary to the switching state of the first switching transistor S1, the switching state of the second switching transistor M2 is complementary to the switching state of the first switching transistor S2, and the switching state of the second switching transistor M3 is complementary to the switching state of the first switching transistor S3. It should be noted that an inductor current sampling signal in the first control circuit is a sampling signal of a current passing through the second inductor L2. The first control circuit with a second structure according to the tenth embodiment is similar to the first control circuit with the second structure according to the first embodiment, and is not described in detail herein.

Figure 21:
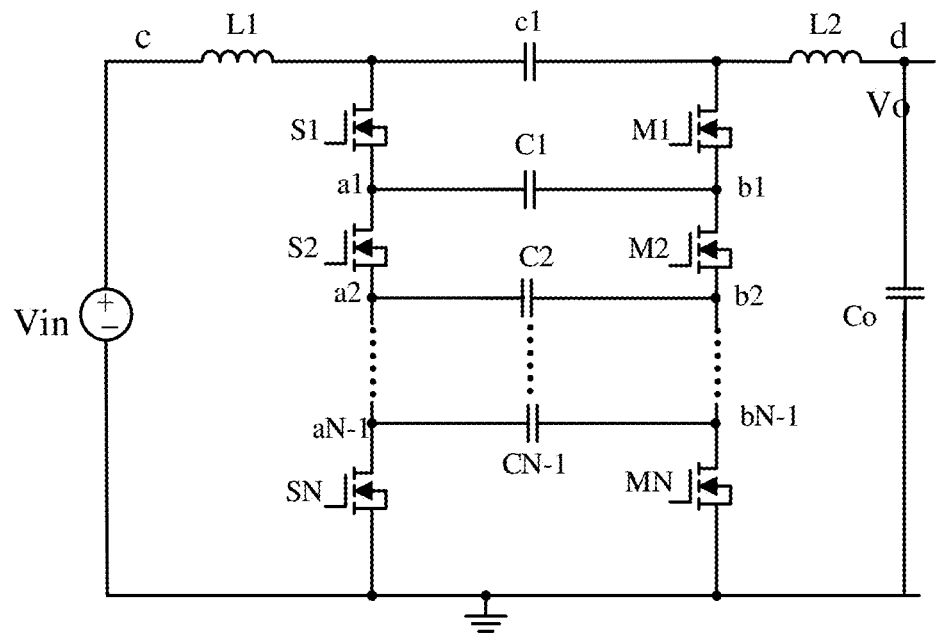
FIG. 21 is a schematic circuit diagram of a first DC to DC conversion module according to an eleventh embodiment of the present disclosure.

In the tenth embodiment, the first DC to DC conversion module is implemented by a four-level DC to DC cuk converter. In another embodiment, the first DC to DC conversion module is implemented by a DC to DC cuk converter with another level. Reference is made to FIG. 21, which is a schematic circuit diagram of a first DC to DC conversion module according to an eleventh embodiment of the present disclosure. The first DC to DC conversion module is implemented by an (N+1)-level DC to DC cuk converter, and N is greater than 1.

The (N+1)-level DC to DC cuk includes N first power switches S1 to SN, N second power switches M1 to MN, N−1 flying capacitors C1 to CN−1, a first inductor L1, a second inductor L2 and a first capacitor c1. A first terminal of the first inductor L1 is coupled to a high potential input terminal c of the first DC to DC conversion module, and receives the DC input voltage Vin. A second terminal of the first inductor L1 is coupled to a first terminal of the first capacitor c1. A second terminal of the first capacitor c1 is coupled to a first terminal of the second inductor L2. A second terminal of the second inductor L2 is coupled to a high potential output terminal d of the first DC to DC conversion module. The N first power switches SN to S1 are connected in series sequentially between the ground and a common terminal of the first inductor L1 and the first capacitor c1, to form N−1 first intermediate nodes aN−1 to a1. The N second power switches MN to M1 are connected in series sequentially between the ground and a common terminal of the second inductor L2 and the first capacitor c1, to form N−1 second intermediate nodes bN−1 to b1. An m-th flying capacitor Cm is coupled between an m-th first intermediate node am and an m-th second intermediate node bm, and m is less than or equal to N−1 a low potential input terminal of the first DC to DC conversion module is grounded. A low potential output terminal of the first DC to DC conversion module is grounded. In an embodiment, the (N+1)-level DC to DC cuk further includes an output capacitor Co. The output capacitor Co is coupled between the high potential output terminal d of the first DC to DC conversion module and the ground.

In the (N+1)-level DC to DC cuk converter operates, a switching state of an n-th second power switch Mn is complementary to a switching state of an n-th first power switch Sn, n is less than or equal to N. During one switching period, the n-th first power switch Sn is turned on n times. The N first power switches S1 to SN are on for the same duration every time. During one switching period, the N-th first power switch SN is turned off N times, and is off for the same duration every time. At any time instant in a time period during which the (N+1)-level DC to DC cuk converter operates, N power switches are turned on, so that a voltage across each of the N power switches is equal to a sum of an output voltage Vo and the DC input voltage Vin divided by N, that is, (Vo+Vin)/N. In a cuk converter according to the conventional technology, a voltage across a single power switch is equal to the sum of the output voltage Vo and the DC input voltage Vin, that is, Vo+Vin. It can be seen that with the (N+1)-level DC to DC cuk converter, a withstand voltage of each of the power switches is reduced. Therefore, the power switches each are implemented by a switching device with a low withstand voltage. Moreover, in a case that each of the power switches operates at a frequency fs, an equivalent switching frequency for the inductor current is equal to N×fs. Therefore, in the embodiment, the second inductor L2 is implemented by an inductor with small inductance, and a ripple of the output capacitor Co is small.

The AC to DC conversion circuit further includes a first control circuit. The first control circuit is configured to control an operation state of the (N+1)-level DC to DC cuk converter, to perform the power factor correction. The first control circuit with a first structure according to the eleventh embodiment is similar to the first control circuit with the first structure according to the tenth embodiment, with a difference in that a structure of the PWM generation module 44 according to the eleventh embodiment is different from the structure of the PWM generation module 44 according to the tenth embodiment. The PWM generation module 44 according to the eleventh embodiment is configured to control the switching states of the N first power switches S1 to SN and the N second power switches M1 to MN. In the eleventh embodiment, the PWM generation module 44 is configured to receive a first duty cycle signal D and turn on a q-th first power switch Sq q times during one switching period, where q is less than or equal to N. The N first power switches S1 to SN are on for the same duration every time, and the duration is determined based on the first duty cycle signal D. During one switching period, an N-th first power switch is turned off N times, and is off for the same duration every time. In an embodiment, for each of the first power switches S1 to SN, a time instant when the first power switch is turned on is determined based on a clock signal. The PWM generation module 44 is further configured to control the second power switches M1 to MN, so that a switching state of an n-th second switching transistor Mn is complementary to a switching state of an n-th first switching transistor Sn, and n is less than or equal to N. It should be noted that an inductor current sampling signal in the first control circuit is a sampling signal of a current passing through the second inductor L2. The first control circuit with a second structure according to the eleventh embodiment is similar to the first control circuit with the second structure according to the tenth embodiment, and is not described in detail herein.

Figure 22:
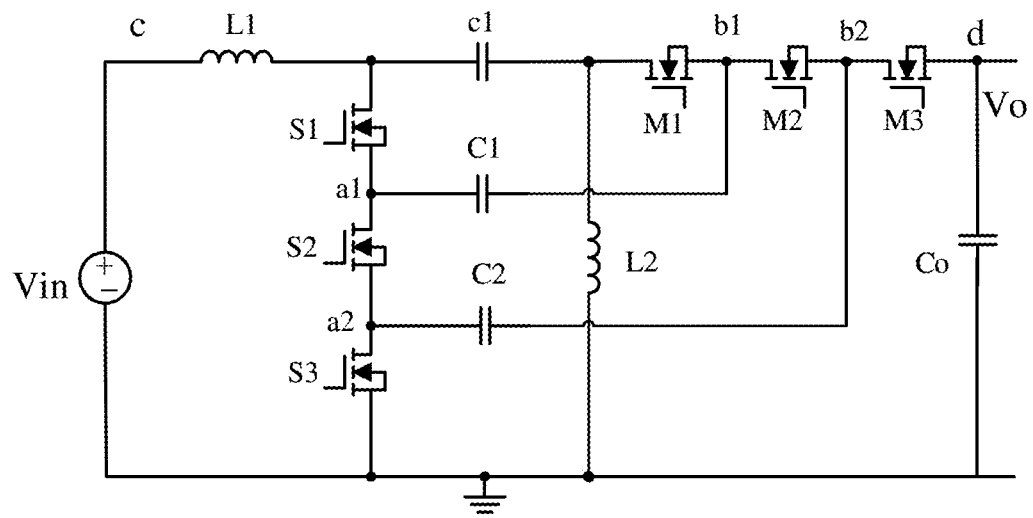
FIG. 22 is a schematic circuit diagram of a first DC to DC conversion module according to a twelfth embodiment of the present disclosure.

FIG. 22 is a schematic circuit diagram of a first DC to DC conversion module according to a twelfth embodiment of the present disclosure. The first DC to DC conversion module includes a four-level DC to DC sepic converter. The four-level DC to DC sepic converter includes first power switches S1 to S3, second power switches M1 to M3, flying capacitors C1 and C2, a first inductor L1, a second inductor L2 and a first capacitor c1. A first terminal of the first inductor L1 is coupled to a high potential input terminal c of the first DC to DC conversion module, and receives the DC input voltage Vin. A second terminal of the first inductor L1 is coupled to a first terminal of the first capacitor c1. A second terminal of the first capacitor c1 is coupled to a first terminal of the second inductor L2. A second terminal of the second inductor L2 is grounded. The first power switches S3 to S1 are connected in series sequentially between the ground and a common terminal of the first inductor L1 and the first capacitor c1, to form first intermediate nodes a2 and a1. The second power switches M3 to M1 are connected in series sequentially between a high potential output terminal d of the first DC to DC conversion module and a common terminal of the second inductor L2 and the first capacitor c1, to form second intermediate nodes b2 and b1. The flying capacitor C1 is coupled between the first intermediate node a1 and the second intermediate node b1. The flying capacitor C2 is coupled between the first intermediate node a2 and the second intermediate node b2. a low potential input terminal of the first DC to DC conversion module is grounded. A low potential output terminal of the first DC to DC conversion module is grounded. In an embodiment, the four-level DC to DC sepic converter further includes an output capacitor Co. The output capacitor Co is coupled between the high potential output terminal d of the first DC to DC conversion module and the ground.

Figure 23:
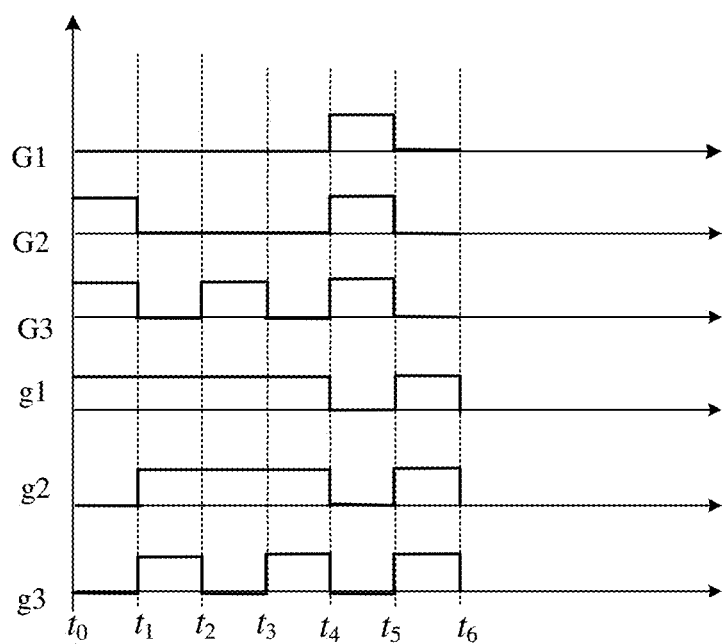
FIG. 23 is a schematic diagram showing operation waveforms of the first DC to DC conversion module according to the twelfth embodiment of the present disclosure.

FIG. 23 is a schematic diagram showing operation waveforms of the first DC to DC conversion module according to the twelfth embodiment of the present disclosure. Control signals G1 to G3 are used to drive the first power switches S1 to S3, respectively. Control signals g1 to g3 are used to drive the second power switches M1 to M3, respectively. During a time interval from a time instant $t_0$ to a time instant $t_1$, the control signals G2, G3 and g1 each are at a high level, the first power switches S2 and S3 and the second power switch M1 are on, and a current passing through the second inductor L2 increases. During a time interval from the time instant $t_1$ to a time instant $t_2$, the control signals g1, g2 and g3 each are at a high level, the second power switches M1, M2 and M3 are on, and the current passing through the second inductor L2 decreases. During a time interval from the time instant $t_2$ to a time instant $t_3$, the control signals G3, g1 and g2 each are at a high level, the first power switch S3 and the second power switches M1 and M2 are on, and the current passing through the second inductor L2 increases. During a time interval from the time instant $t_3$ to a time instant $t_4$, the control signals g1, g2, and g3 are at a high level, the second power switches M1, M2 and M3 are on, and the current passing through the second inductor L2 decreases. During a time interval from the time instant $t_4$ to a time instant $t_5$, the control signals G1, G2 and G3 each are at a high level, the first power switches S1, S2 and S3 are on, and the current passing through the second inductor L2 increases. During a time interval from the time instant $t_5$ to a time instant $t_6$, the control signals g1, g2 and g3 each are at a high level, the second power switches M1, M2 and M3 are on, and the current passing through the second inductor L2 decreases. A time interval from the time instant $t_0$ to the time instant $t_6$ is a switching period. The time interval from the time instant $t_0$ to the time instant $t_1$, the time interval from the time instant $t_2$ to the time instant $t_3$ and the time interval from the time instant $t_4$ to the time instant $t_5$ are equal in length. The time interval from the time instant $t_1$ to the time instant $t_2$, the time interval from the time instant $t_3$ to the time instant $t_4$ and the time interval from the time instant $t_5$ to the time instant $t_6$ are equal in length.

It can be seen from FIG. 23 that the switching state of the first power switch S1 is complementary to switching state of the second power switch M1. The switching state of the first power switch S2 is complementary to the switching state of the second power switch M2. The switching state of the first power switch S3 is complementary to the switching state of the second power switch M3. During one switching period, the first power switch S1 is turned on once, the first power switch S2 is turned on twice, and the first power switch S3 is turned on three times. The three first power switches S1 to S3 are on for the same duration every time. During one switching period, the first power switch S3 is turned off three times, and is off for the same duration every time. Moreover, it can be seen that at any time instant in a time period during which the four-level DC to DC sepic converter operates, three power switches are in the turn-on state, so that a voltage across each of the power switches is equal to one-third of a sum of the output voltage Vo and the DC input voltage Vin, that is, (Vo+Vin)/3. In a sepic converter according to the conventional technology, a voltage across a single power switch is equal to the sum of the output voltage Vo and the DC input voltage Vin, that is, (Vo+Vin). It can be seen that with the four-level DC to DC sepic converter, a withstand voltage of each of the power switches is reduced. Therefore, the power switches each are implemented by a switching device with a low withstand voltage. Moreover, in a case that each of the power switches operates at a frequency fs, an equivalent switching frequency for the inductor current is equal to 3×fs. Therefore, in the twelfth embodiment, the second inductor L2 is implemented by an inductor with small inductance, and a ripple of the output capacitor Co is small.

In the twelfth embodiment, the AC to DC conversion circuit further includes a first control circuit. The first control circuit controls an operation state of the four-level DC to DC sepic converter in two manners, to perform the power factor correction. The first control circuit with a first structure according to the twelfth embodiment is the same as the first control circuit with the first structure according to the tenth embodiment, and the first control circuit with a second structure according to the twelfth embodiment is the same as the first control circuit with the second structure according to the tenth embodiment. Therefore, the first control circuit according to the twelfth embodiment is not described in detail herein.

Figure 24:
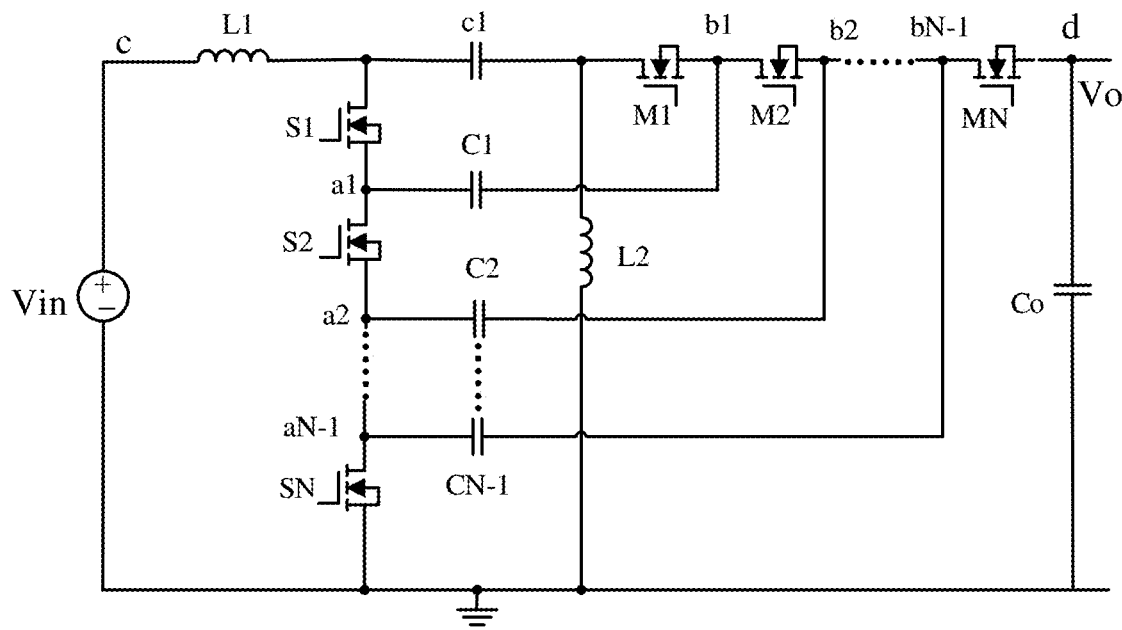
FIG. 24 is a schematic circuit diagram of a first DC to DC conversion module according to a thirteenth embodiment of the present disclosure.

In the twelfth embodiment, the first DC to DC conversion module is implemented by a four-level DC to DC sepic converter. In another embodiment, the first DC to DC conversion module is implemented by a DC to DC sepic converter with another level. Reference is made to FIG. 24, which is a schematic circuit diagram of a first DC to DC conversion module according to a thirteenth embodiment of the present disclosure. The first DC to DC conversion module is implemented by an (N+1)-level DC to DC sepic converter, and N is greater than 1.

The (N+1)-level DC to DC sepic converter includes N first power switches S1 to SN, N second power switches M1 to MN, N−1 flying capacitors C1 to CN−1, a first inductor L1, a second inductor L2 and a first capacitor c1. A first terminal of the first inductor L1 is coupled to a high potential input terminal c of the first DC to DC conversion module, and receives the DC input voltage Vin. A second terminal of the first inductor L1 is coupled to a first terminal of the first capacitor c1. A second terminal of the first capacitor c1 is coupled to a first terminal of the second inductor L2. A second terminal of the second inductor L2 is grounded. The N first power switches SN to S1 are connected in series sequentially between the ground and a common terminal of the first inductor L1 and the first capacitor c1, to form N−1 first intermediate nodes a1 to aN−1. The N second power switches MN to M1 are connected in series sequentially between a high potential output terminal d of the first DC to DC conversion module and a common terminal of the second inductor L2 and the first capacitor c1, to form N−1 second intermediate nodes b1 to bN−1. An m-th flying capacitor Cm is coupled between an m-th first intermediate node am and an m-th second intermediate node bm, and m is less than or equal to N−1 a low potential input terminal of the first DC to DC conversion module is grounded. A low potential output terminal of the first DC to DC conversion module is grounded. In an embodiment, the N+1-level DC to DC sepic converter further includes an output capacitor Co. The output capacitor Co is coupled between the high potential output terminal d of the first DC to DC conversion module and the ground.

In the (N+1)-level DC to DC sepic converter, a switching state of an n-th second power switch Mn is complementary to a switching state of an n-th first power switch Sn, n is less than or equal to N. During one switching period, the n-th first power switch Sn is turned on n times. The N first power switches S1 to SN are on for the same duration every time. During one switching period, the N-th first power switch SN is turned off N times, and is off for the same duration every time. At any time instant in a time period during which the (N+1)-level DC to DC sepic converter operates, N power switches are in the turn-on state, so that a voltage across each of the N power switches is equal to a sum of an output voltage Vo and the DC input voltage Vin divided by N, that is, (Vo+Vin)/N. In a sepic converter according to the conventional technology, a voltage across aa single power switch is equal to the sum of the output voltage Vo and the DC input voltage Vin, that is, Vo+Vin. It can be seen that with the (N+1)-level DC to DC sepic converter, a withstand voltage of each of the power switches is reduced. Therefore, the power switches each are implemented by a switching device with a low withstand voltage. Moreover, in a case that each of the power switches operates at a frequency fs, an equivalent switching frequency for the inductor current is equal to N×fs. Therefore, in the thirteenth embodiment, the second inductor L2 is implemented by an inductor with small inductance, and a ripple of the output capacitor Co is small.

The AC to DC conversion circuit further includes a first control circuit. The first control circuit is configured to control an operation state of the (N+1)-level DC to DC sepic converter, to perform the power factor correction. The first control circuit with a first structure according to the thirteenth embodiment is the same as the first control circuit with the first structure according to the eleventh embodiment, and the first control circuit with a second structure according to the thirteenth embodiment is the same as the first control circuit with the second structure according to the eleventh embodiment. Therefore, the first control circuit according to the thirteenth embodiment is not described in detail herein.

Figure 25:
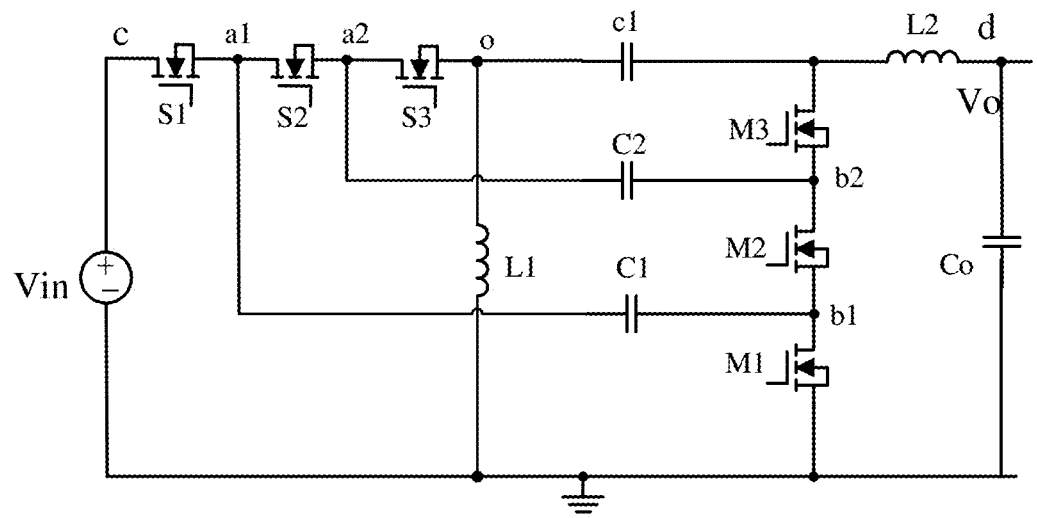
FIG. 25 is a schematic circuit diagram of a first DC to DC conversion module according to a fourteenth embodiment of the present disclosure.

FIG. 25 is a schematic circuit diagram of a first DC to DC conversion module according to a fourteenth embodiment of the present disclosure. The first DC to DC conversion module includes a four-level DC to DC zeta converter. The four-level DC to DC zeta converter includes first power switches S1 to S3, second power switches M1 to M3, flying capacitors C1 and C2, a first inductor L1, a second inductor L2 and a first capacitor c1. The first power switches S1 to S3 are connected in series sequentially between a high potential input terminal c of the first DC to DC conversion module and a first node o, to form first intermediate nodes a1 and a2. A first terminal of the first inductor L1 is coupled to the first node o. A second terminal of the first inductor L1 is grounded. A first terminal of the first capacitor c1 is coupled to the first node o. A second terminal of the first capacitor c1 is coupled to a first terminal of the second inductor L2. A second terminal of the second inductor L2 is coupled to a high potential output terminal d of the first DC to DC conversion module. The second power switches M3 to M1 are connected in series sequentially between the ground and a common terminal of the second inductor L2 and the first capacitor c1, to form second intermediate nodes b2 and b1. The flying capacitor C1 is coupled between the first intermediate node a1 and the second intermediate node b1. The flying capacitor C2 is coupled between the first intermediate node a2 and the second intermediate node b2. A common terminal of the first inductor L1 and the first capacitor c1 serves as the first node o a low potential input terminal of the first DC to DC conversion module is grounded. A low potential output terminal of the first DC to DC conversion module is grounded. In an embodiment, the four-level DC to DC zeta converter further includes an output capacitor Co. The output capacitor Co is coupled between the high potential output terminal d of the first DC to DC conversion module and the ground.

Figure 26:
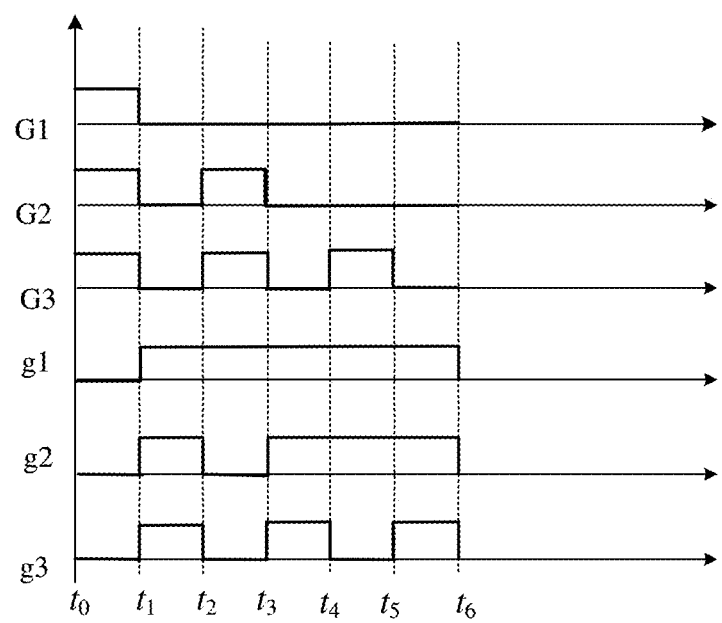
FIG. 26 is a schematic diagram showing operation waveforms of the first DC to DC conversion module according to the fourteenth embodiment of the present disclosure.

FIG. 26 is a schematic diagram showing operation waveforms of the first DC to DC conversion module according to the fourteenth embodiment of the present disclosure. Control signals G1 to G3 are used to drive the first power switches S1 to S3, respectively. Control signals g1 to g3 are used to drive the second power switches M1 to M3, respectively. During a time interval from a time instant $t_0$ to a time instant $t_1$, the control signals G1, G2, and G3 each are at a high level, the first power switches S1, S2 and S3 are on, and a current passing through the second inductor L2 increases. During a time interval from the time instant $t_1$ to a time instant $t_2$, the control signals g1, g2 and g3 each are at a high level, the second power switches M1, M2 and M3 are on, and the current passing through the second inductor L2 decreases. During a time interval from the time instant $t_2$ to a time instant $t_3$, the control signals G2, G3 and g1 each are at a high level, the first power switches S2 and S3 and the second power switch M1 are on, and the current passing through the second inductor L2 increases. During a time interval from the time instant $t_3$ to a time instant $t_4$, the control signals g1, g2, and g3 each are at a high level, the second power switches M1, M2 and M3 are on, and the current passing through the second inductor L2 decreases. During a time interval from the time instant $t_4$ to a time instant $t_5$, the control signals G3, g1 and g2 each are at a high level, the first power switch S3 and the second power switches M1, M2 and are on, and the current passing through the second inductor L2 increases. During a time interval from the time instant $t_5$ to a time instant $t_6$, the control signals g1, g2 and g3 each are at a high level, the second power switches M1, M2 and M3 are on, and the current passing through the second inductor L2 decreases. A time interval from the time instant $t_0$ to the time instant $t_6$ is a switching period. The time interval from the time instant $t_0$ to the time instant $t_1$, the time interval from the time instant $t_2$ to the time instant $t_3$ and the time interval from the time instant $t_4$ to the time instant $t_5$ are equal in length. The time interval from the time instant $t_1$ to the time instant $t_2$, the time interval from the time instant $t_3$ to the time instant $t_4$ and the time interval from the time instant $t_5$ to the time instant $t_6$ are equal in length.

It can be seen from FIG. 26 that during one switching period, the first power switch S1 is turned on once, the first power switch S2 is turned on twice, and the first power switch S3 is turned on three times. The three first power switches S1 to S3 are on for the same duration every time. During one switching period, the first power switch S3 is turned off three times, and is off for the same duration every time. The switching state of the first power switch S1 is complementary to the switching state of the second power switch M1. The switching state of the first power switch S2 is complementary to the switching state of the second power switch M2. The switching state of the first power switch S3 is complementary to the switching state of the second power switch M3. Moreover, it can be seen that at any time instant in a time period during which the four-level DC to DC zeta converter operates, three power switches are in the turn-on state, so that a voltage across each of the power switches is equal to one-third of a sum of the output voltage Vo and the DC input voltage Vin, that is, (Vo+Vin)/3. In a zeta converter according to the conventional technology, a voltage across a single power switch is equal to the sum of the output voltage Vo and the DC input voltage Vin, that is, (Vo+Vin). It can be seen that with the four-level DC to DC zeta converter, a withstand voltage of each of the power switches is reduced. Therefore, the power switches each are implemented by a switching device with a low withstand voltage. Moreover, in a case that each of the power switches operates at a frequency fs, an equivalent switching frequency for the inductor current is equal to 3×fs. Therefore, in the fourteenth embodiment, the second inductor L2 is implemented by an inductor with small inductance, and a ripple of the output capacitor Co is small.

In the fourteenth embodiment, the AC to DC conversion circuit further includes a first control circuit. The first control circuit is configured to control an operation state of the four-level DC to DC zeta converter in two manners, to perform the power factor correction. The first control circuit with a first structure according to the fourteenth embodiment is the same as the first control circuit with the first structure according to the tenth embodiment, and the first control circuit with a second structure according to the fourteenth embodiment is the same as the first control circuit with the second structure according to the tenth embodiment. Therefore, the first control circuit according to the fourteenth embodiment is not described in detail herein.

Figure 27:
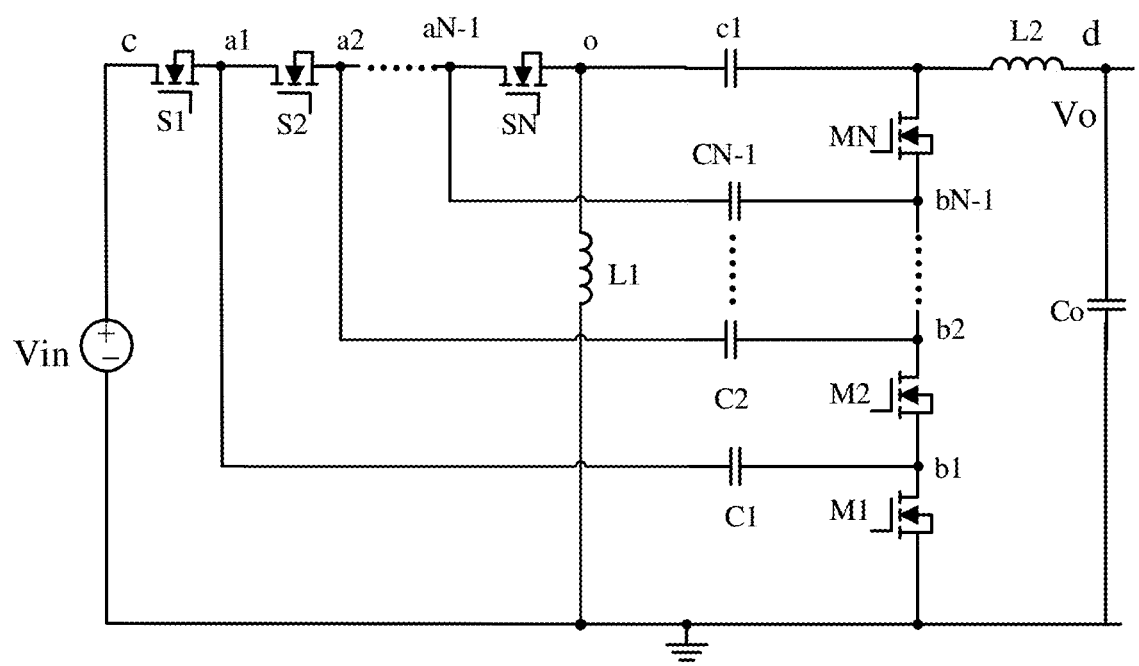
FIG. 27 is a schematic circuit diagram of a first DC to DC conversion module according to a fifteenth embodiment of the present disclosure.

In the fourteenth embodiment, the first DC to DC conversion module is implemented by a four-level DC to DC zeta converter. In another embodiment, the first DC to DC conversion module is implemented by a DC to DC zeta converter with another level. Reference is made to FIG. 27, which is a schematic circuit diagram of a first DC to DC conversion module according to a fifteenth embodiment of the present disclosure. The first DC to DC conversion module is implemented by an (N+1)-level DC to DC zeta converter, and N is greater than 1.

The (N+1)-level DC to DC zeta converter includes N first power switches S1 to SN, N second power switches M1 to MN, N−1 flying capacitors C1 to CN−1, a first inductor L1, a second inductor L2 and a first capacitor c1. The N first power switches S1 to SN are connected in series sequentially between a high potential input terminal c of the first DC to DC conversion module and a first node o, to form N−1 first intermediate nodes a1 to aN−1. A first terminal of the first inductor L1 is coupled to the first node o. A second terminal of the first inductor L1 is grounded. A first terminal of the first capacitor c1 is coupled to the first node o. A second terminal of the first capacitor c1 is coupled to a first terminal of the second inductor L2. A second terminal of the second inductor L2 is coupled to a high potential output terminal d of the first DC to DC conversion module. The N second power switches M1 to MN are connected in series sequentially between the ground and a common terminal of the second inductor L2 and the first capacitor c1, to form N−1 second intermediate nodes b1 to bN−1. An m-th flying capacitor Cm is coupled between an m-th first intermediate node am and an m-th second intermediate node bm. A common terminal of the first inductor L1 and the first capacitor c1 serves as the first node, and m is less than or equal to N−1 a low potential input terminal of the first DC to DC conversion module is grounded. A low potential output terminal of the first DC to DC conversion module is grounded. In an embodiment, the N+1-level DC to DC zeta converter further includes an output capacitor Co. The output capacitor Co is coupled between the high potential output terminal d of the first DC to DC conversion module and the ground.

In the (N+1)-level DC to DC zeta converter, a switching state of an n-th second power switch Mn is complementary to a switching state of an n-th first power switch Sn, n is less than or equal to N. During one switching period, the n-th first power switch Sn is turned on n times. The N first power switches S1 to SN are on for the same duration every time. During one switching period, the N-th first power switch SN is turned off N times, and is off for the same duration every time. At any time instant in a time period during which the (N+1)-level DC to DC zeta converter operates, N power switches are in the turn-on state, so that a voltage across each of the N power switches is equal to a sum of an output voltage Vo and the DC input voltage Vin divided by N, that is, (Vo+Vin)/N. In a zeta converter according to the conventional technology, a voltage across a single power switch is equal to the sum of the output voltage Vo and the DC input voltage Vin, that is, Vo+Vin. It can be seen that with the (N+1)-level DC to DC zeta converter, a withstand voltage of each of the power switches is reduced. Therefore, the power switches each are implemented by a switching device with a low withstand voltage. Moreover, in a case that each of the power switches operates at a frequency fs, an equivalent switching frequency for the inductor current is equal to N×fs. Therefore, in the fifteenth embodiment, the second inductor L2 is implemented by an inductor with small inductance, and a ripple of the output capacitor Co is small.

The AC to DC conversion circuit further includes a first control circuit. The first control circuit is configured to control an operation state of the (N+1)-level DC to DC zeta converter, to perform the power factor correction. The first control circuit controls an operation state of the multi-level DC to DC converter in two manners, to perform the power factor correction. The first control circuit with a first structure according to the fifteenth embodiment is the same as the first control circuit with the first structure according to the eleventh embodiment, and the first control circuit with a second structure according to the fifteenth embodiment is the same as the first control circuit with the second structure according to the eleventh embodiment. Therefore, the first control circuit according to the fifteenth embodiment is not described in detail herein.

Figure 28:
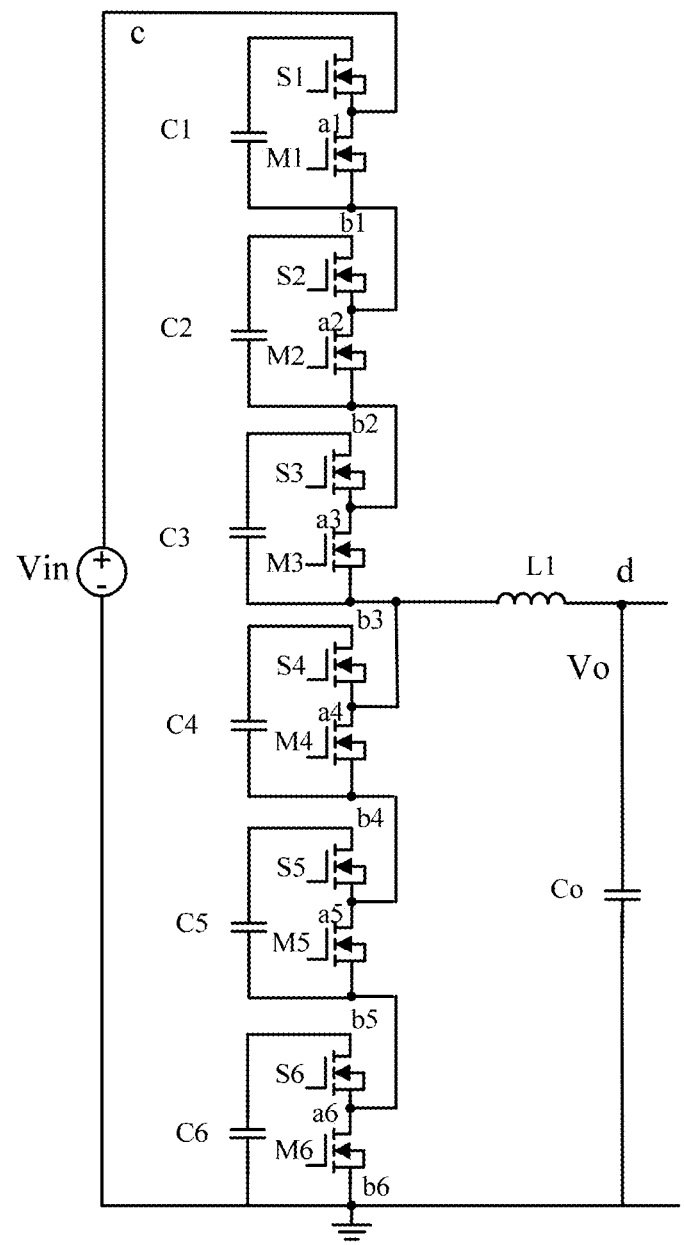
FIG. 28 is a schematic circuit diagram of a first DC to DC conversion module according to a sixteenth embodiment of the present disclosure.

FIG. 28 is a schematic circuit diagram of a first DC to DC conversion module according to a sixteenth embodiment of the present disclosure. The first DC to DC conversion module includes a four-level half-bridge DC to DC converter. The four-level half-bridge DC to DC converter includes six switched-capacitor units and a first inductor L1. An i-th switched-capacitor unit includes a first power switch Si, a second power switch Mi and a first capacitor Ci. The first power switch Si is connected in series with the second power switch Mi to form a branch. The branch is connected in parallel with the first capacitor Ci, where i ranges from 1 to 6. A 1st first intermediate node a1 is coupled to a high potential input terminal c of the first DC to DC conversion module, and receives the DC input voltage Vin. A 6-th second intermediate node b6 is grounded. An m-th second intermediate node bm is coupled to an (m+1)-th first intermediate node am+1. A first terminal of the first inductor L1 is coupled to a 3-th second intermediate node b3. A second terminal of the first inductor L1 is coupled to a high potential output terminal d of the first DC to DC conversion module. A first intermediate node ai is a common terminal of the first power switch Si and the second power switch Mi. A second intermediate node bi is a common terminal of the first capacitor Ci and the second power switch Mi, where i ranges from 1 to 6, and m is greater than 1 and less than 6. a low potential input terminal of the first DC to DC conversion module is grounded. A low potential output terminal of the first DC to DC conversion module is grounded. In an embodiment, the four-level half-bridge DC to DC converter further includes an output capacitor Co. The output capacitor Co is coupled between the high potential output terminal d of the first DC to DC conversion module and the ground.

Figure 29:
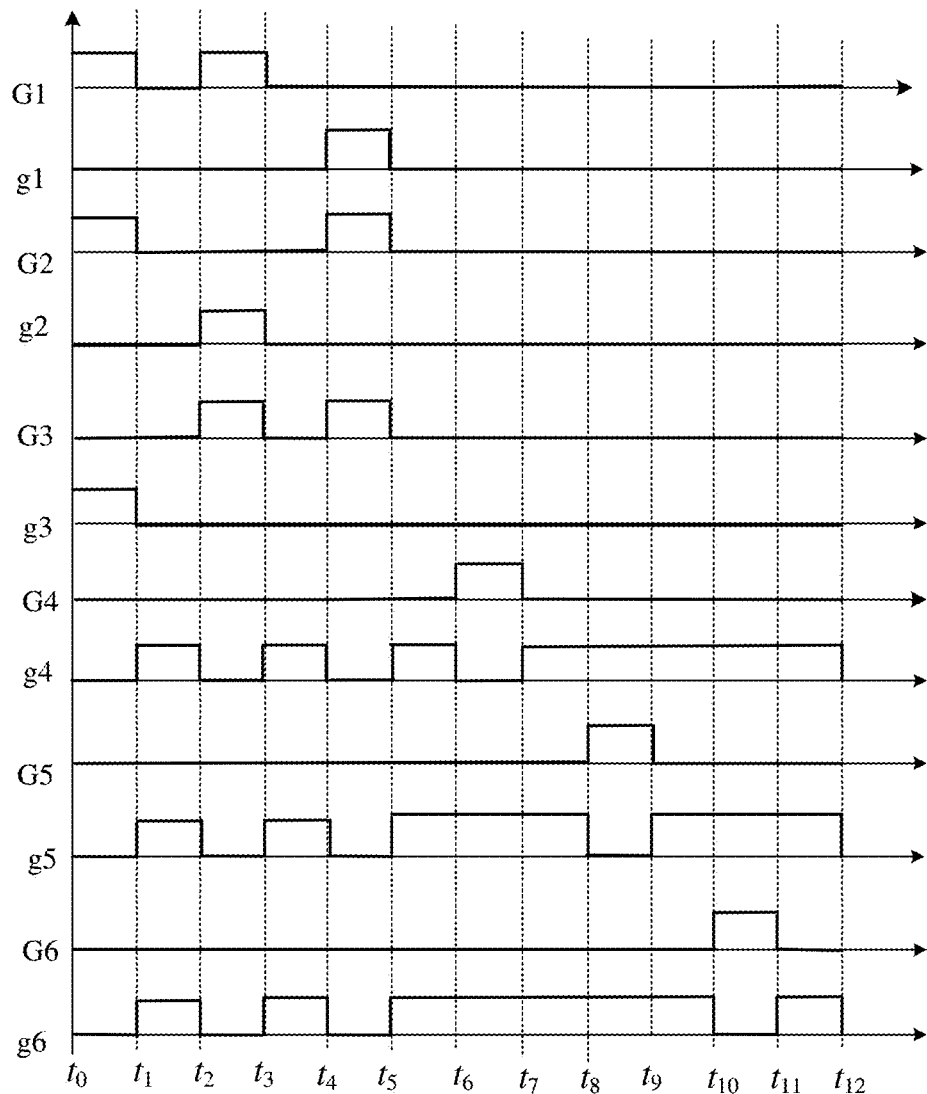
FIG. 29 is a schematic diagram showing operation waveforms of the first DC to DC conversion module according to the sixteenth embodiment of the present disclosure.

FIG. 29 is a schematic diagram showing operation waveforms of the first DC to DC conversion module according to the sixteenth embodiment of the present disclosure. Control signals G1 to G6 are used to drive the first power switches S1 to S6, respectively. Control signals g1 to g6 are used to drive the second power switches M1 to M6, respectively. During a time interval from a time instant $t_0$ to a time instant $t_1$, the control signals G1, G2, and g3 each are at a high level, the first power switches S1 and S2, and the second power switch M3 are on, and a inductor current increases. During a time interval from the time instant $t_1$ to a time instant $t_2$, the control signals g4, g5 and g6 each are at a high level, the second power switches M4, M5 and M6 are on, and the inductor current decreases. During a time interval from the time instant $t_2$ to a time instant $t_3$, the control signals G1, G3 and g2 each are at a high level, the first power switches S1 and S3 and the second power switch M2 are on, and the inductor current increases. During a time interval from the time instant $t_3$ to a time instant $t_4$, the control signals g4, g5, and g6 each are at a high level, the second power switches M4, M5 and M6 are on, and the inductor current decreases. During a time interval from the time instant $t_4$ to a time instant $t_5$, the control signals G2, G3 and g1 each are at a high level, the first power switch S2 and S3 and the second power switches M1 and are on, and the inductor current increases. During a time interval from the time instant $t_5$ to a time instant $t_6$, the control signals g4, g5 and g6 each are at a high level, the second power switches M4, M5 and M6 are on, and the inductor current decreases. During a time interval from the time instant $t_6$ to a time instant $t_7$, the control signals G4, g5 and g6 each are at a high level, the first power switch S4 and the second power switches M5 and M6 are on, and the inductor current increases. During a time interval from the time instant $t_7$ to a time instant $t_8$, the control signals g4, g5 and g6 each are at a high level, the second power switches M4, M5 and M6 are turned on, and the inductor current decreases. During a time interval from the time instant $t_8$ to a time instant $t_9$, the control signals G5, g4 and g6 each are at a high level, the first power switch S5, and the second power switches M4 and M6 are on, and the inductor current increases. During a time interval from the time instant $t_9$ to a time instant $t_{10}$, the control signals g4, g5 and g6 each are at a high level, the second power switches M4, M5 and M6 are on, and the inductor current decreases. During a time interval from the time instant $t_{10}$ to a time instant $t_{11}$, the control signals G6, g4 and g5 each are at a high level, the first power switch S6, and the second power switches M4 and M5 are on, and the inductor current increases. During a time interval from the time instant $t_{11}$ to a time instant $t_{12}$, the control signals g4, g5 and g6 each are at a high level, the second power switches M4, M5 and M6 are on, and the inductor current decreases. A time interval from the time instant $t_0$ to the time instant $t_{12}$ is a switching period. The time interval from the time instant $t_0$ to the time instant $t_1$, the time interval from the time instant $t_2$ to the time instant $t_3$, the time interval from the time instant $t_4$ to the time instant $t_5$, the time interval from the time instant $t_6$ to the time instant $t_7$, the time interval from the time instant $t_8$ to the time instant $t_9$, the time interval from the time instant $t_{10}$ to the time instant $t_{11}$ are equal in length. The time interval from the time instant $t_1$ to the time instant $t_2$, the time interval from the time instant $t_3$ to the time instant $t_4$, the time interval from the time instant $t_5$ to the time instant $t_6$, the time interval from the time instant $t_7$ to the time instant $t_8$, the time interval from the time instant $t_9$ to the time instant $t_{10}$ and the time interval from the time instant $t_{11}$ to the time instant $t_{12}$ are equal in length.

It can be seen from FIG. 29 that at any time instant in a time period during which the four-level half-bridge DC to DC operates, three power switches are in the turn-on state, so that a voltage across each of the power switches is equal to one-third of the DC input voltage Vin, that is, Vin/3. In a half-bridge converter according to the conventional technology, a voltage across a single power switch is equal to the DC input voltage Vin. It can be seen that with the four-level half-bridge DC to DC, a withstand voltage of each of the power switches is reduced. Therefore, the power switches each are implemented by a switching device with a low withstand voltage. Moreover, in a case that each of the power switches operates at a frequency fs, an equivalent switching frequency for the inductor current is equal to 6×fs. Therefore, in the embodiment, the first inductor L1 is implemented by an inductor with small inductance, and a ripple of the output capacitor Co is small.

In the sixteenth embodiment, the AC to DC conversion circuit further includes a first control circuit. The first control circuit controls an operation state of the four-level half-bridge DC to DC converter in two manners, to perform the power factor correction. The first control circuit with a first structure according to the sixteenth embodiment is the same as the first control circuit with the first structure according to the tenth embodiment, and the first control circuit with a second structure according to the sixteenth embodiment is the same as the first control circuit with the second structure according to the tenth embodiment. Therefore, the first control circuit according to the sixteenth embodiment is not described in detail herein.

Figure 30:
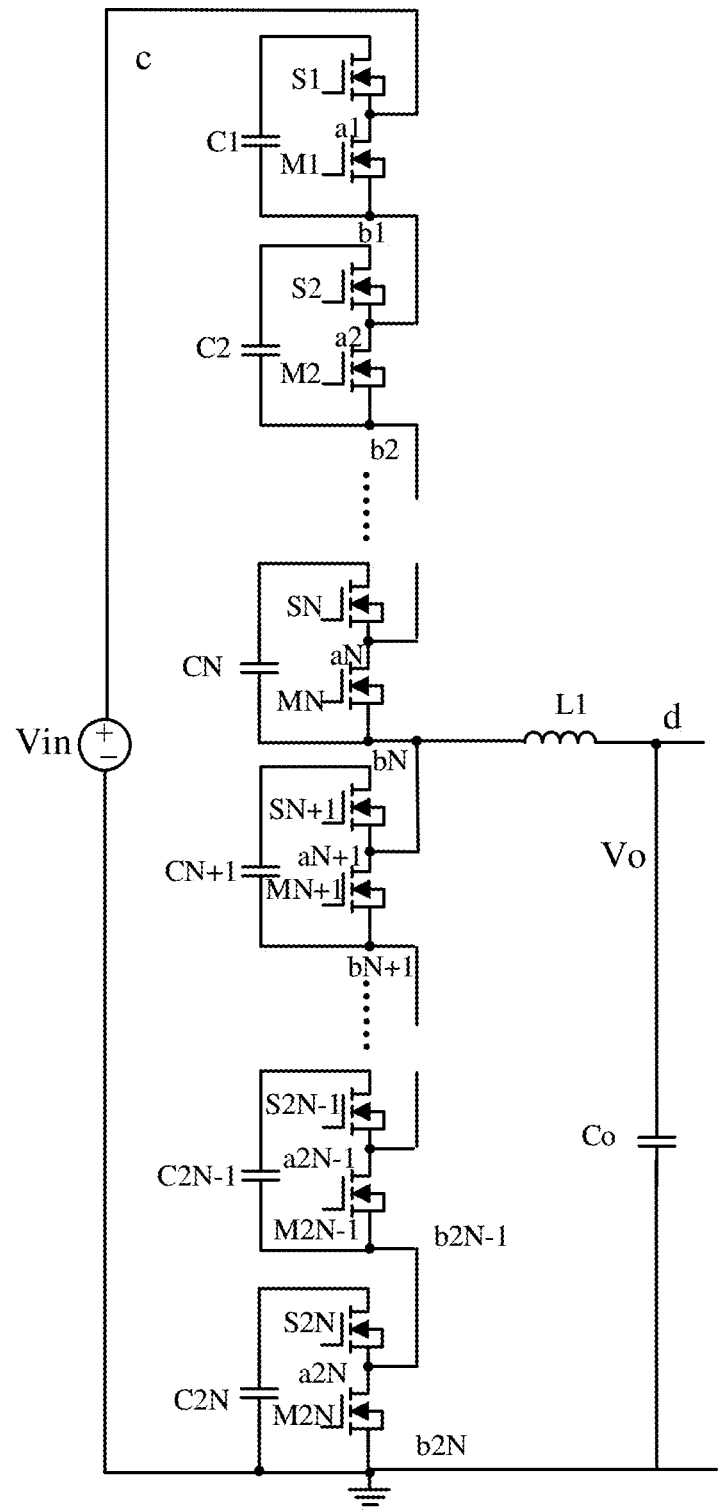
FIG. 30 is a schematic circuit diagram of a first DC to DC conversion module according to a seventeenth embodiment of the present disclosure.

In the sixteenth embodiment, the first DC to DC conversion module is implemented by a four-level half-bridge DC to DC converter. In another embodiment, the first DC to DC conversion module is implemented by a half-bridge DC to DC converter with another level. Reference is made to FIG. 30, which is a schematic circuit diagram of a first DC to DC conversion module according to a seventeenth embodiment of the present disclosure. The first DC to DC conversion module is implemented by an (N+1)-level half-bridge DC to DC converter, and N is greater than 1.

The (N+1)-level half-bridge DC to DC converter includes 2N switched-capacitor units and a first inductor L1. An i-th switched-capacitor unit includes a first power switch Si, a second power switch Mi and a first capacitor Ci. The first power switch Si is connected in series with the second power switch Mi to form a branch. The branch is connected in parallel with the first capacitor Ci, where i ranges from 1 to 2N. A 1st first intermediate node a1 is coupled to a high potential input terminal c of the first DC to DC conversion module, and receives the DC input voltage Vin. A 2N-th second intermediate node b2N is grounded. An m-th second intermediate node bm is coupled to an (m+1)-th first intermediate node am+1. A first terminal of the first inductor L1 is coupled to an N-th second intermediate node bN. A second terminal of the first inductor L1 is coupled to a high potential output terminal d of the first DC to DC conversion module. A first intermediate node ai is a common terminal of the first power switch Si and the second power switch Mi. A second intermediate node bi is a common terminal of the first capacitor Ci and the second power switch Mi, where i ranges from 1 to 2N, and m is greater than 1 and less than 2N a low potential input terminal of the first DC to DC conversion module is grounded. A low potential output terminal of the first DC to DC conversion module is grounded. In an embodiment, the (N+1)-level half-bridge DC to DC converter further includes an output capacitor Co. The output capacitor Co is coupled between the high potential output terminal d of the first DC to DC conversion module and the ground.

At any time instant in a time period during which the half-bridge DC to DC converter operates, N switched-capacitor units operates and N power switches are in the turn-on state, so that a voltage across each of the power switches is equal to the DC input voltage Vin divided by N, that is, Vin/N. In a half-bridge converter according to the conventional technology, a voltage across a single power switch is equal to the DC input voltage Vin. It can be seen that with the (N+1)-level half-bridge DC to DC converter, a withstand voltage of each of the power switches is reduced. Therefore, the power switches are each implemented by a switching device with a low withstand voltage. Moreover, in a case that each of the power switches operates at a frequency fs, an equivalent switching frequency for the inductor current is equal to 2N×fs. Therefore, in the seventeenth embodiment, the first inductor L1 is implemented by an inductor with small inductance, and a ripple of the output capacitor Co is small.

The AC to DC conversion circuit further includes a first control circuit. The first control circuit is configured to control an operation state of the (N+1)-level half-bridge DC to DC converter, to perform the power factor correction. The first control circuit controls the operation state of the multi-level DC to DC converter in two manners, to perform the power factor correction. The first control circuit with a first structure according to the seventeenth embodiment is the same as the first control circuit with the first structure according to the eleventh embodiment, and the first control circuit with a second structure according to the seventeenth embodiment is the same as the first control circuit with the second structure according to the eleventh embodiment. Therefore, the first control circuit according to the seventeenth embodiment is not described in detail herein.

Figure 31:
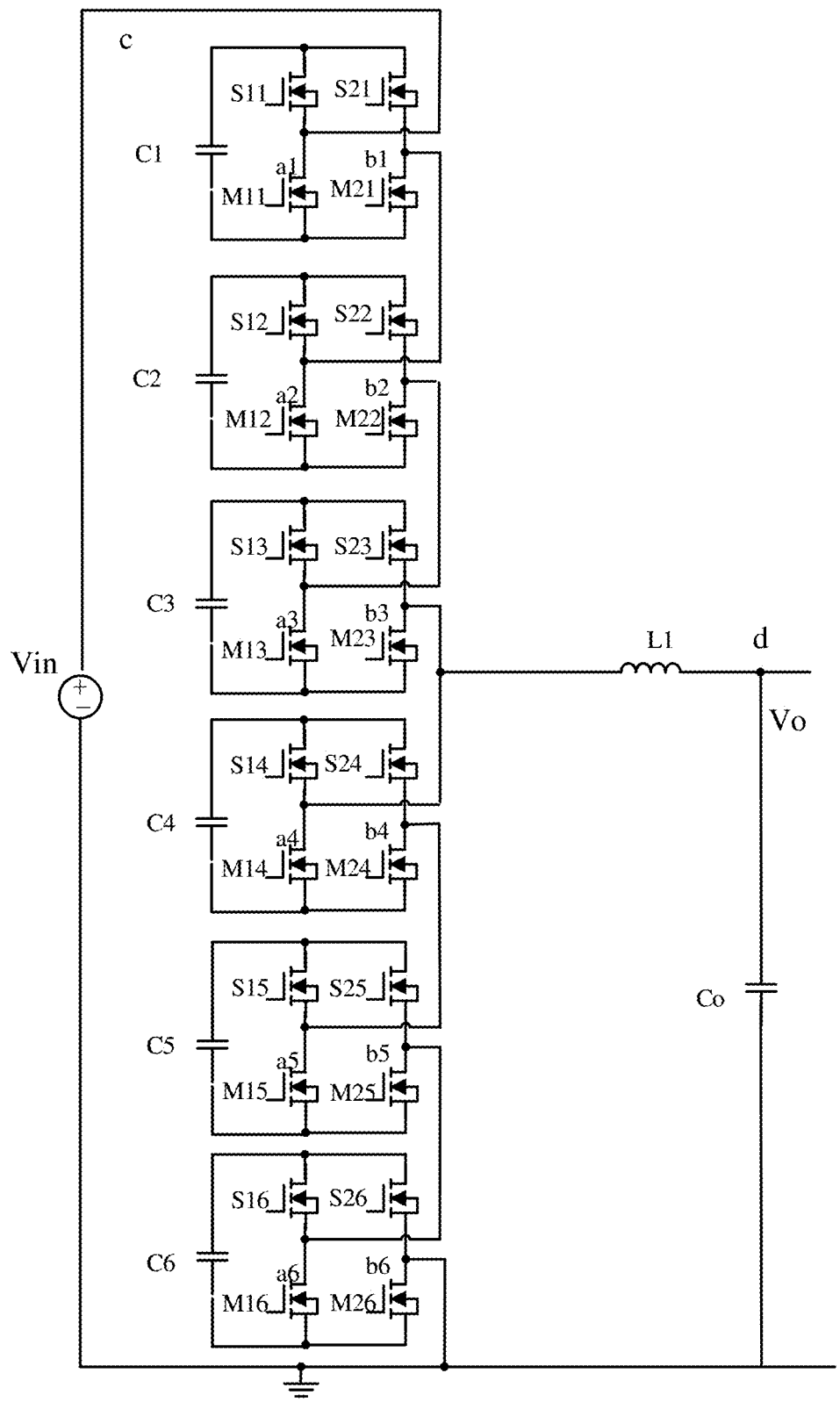
FIG. 31 is a schematic circuit diagram of a first DC to DC conversion module according to an eighteenth embodiment of the present disclosure.

FIG. 31 is a schematic circuit diagram of a first DC to DC conversion module according to an eighteenth embodiment of the present disclosure. The first DC to DC conversion module includes a four-level full-bridge DC to DC converter. The four-level full-bridge DC to DC converter includes six switched-capacitor units and a first inductor L1. An i-th switched-capacitor unit includes four power switches and a first capacitor. A power switch S1$i$ is connected in series with a power switch M1$i$ to form a first branch. A power switch S2$i$ is connected in series with a power switch M2$i$ to form a second branch. The first capacitor Ci is connected in parallel with the first branch and the second branch. A 1st first intermediate node a1 is coupled to a high potential input terminal c of the first DC to DC conversion module, and receives the DC input voltage Vin. A 6-th second intermediate node b6 is grounded. An m-th second intermediate node bm is coupled to an (m+1)-th first intermediate node am+1. A first terminal of the first inductor L1 is coupled to a 3-th second intermediate node b3. A second terminal of the first inductor L1 is coupled to a high potential output terminal d of the first DC to DC conversion module. A first intermediate node ai is a common terminal of the power switch S1$i$ and the power switch M1$i$ in the first branch. A second intermediate node bi is a common terminal of the power switch S2$i$ and the power switch M2$i$ in the second branch, where i ranges from 1 to 6, and m is greater than 1 and less than 6 a low potential input terminal of the first DC to DC conversion module is grounded. A low potential output terminal of the first DC to DC conversion module is grounded. In an embodiment, the four-level full-bridge DC to DC converter further includes an output capacitor Co. The output capacitor Co is coupled between the high potential output terminal d of the first DC to DC conversion module and the ground.

Figure 32:
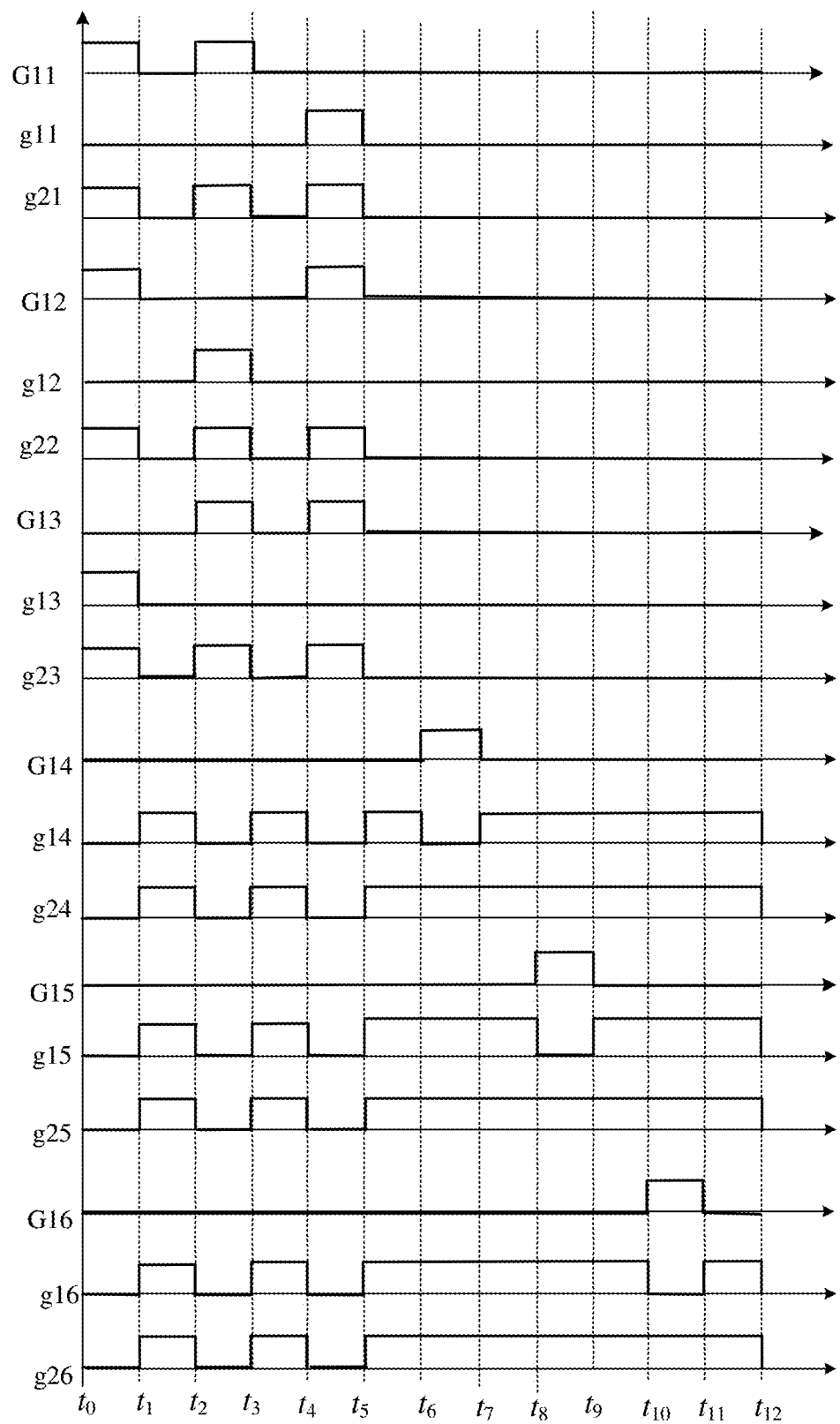
FIG. 32 is a schematic diagram showing operation waveforms of the first DC to DC conversion module according to the eighteenth embodiment of the present disclosure.

FIG. 32 is a schematic diagram showing operation waveforms of the first DC to DC conversion module according to the eighteenth embodiment of the present disclosure. Control signals G11 to G16 are used to drive the first power switches S11 to S16, respectively. Control signals g11 to g16 are used to drive the second power switches M1 to M16, respectively. Control signals g21 to g26 are used to drive the second power switches M21 to M26, respectively. A time interval from the time instant $t_0$ to the time instant $t_{12}$ is a switching period. A time interval from a time instant $t_0$ to a time instant $t_1$, a time interval from a time instant $t_2$ to a time instant $t_3$, a time interval from a time instant $t_4$ to a time instant $t_5$, a time interval from a time instant $t_6$ to a time instant $t_7$, a time interval from a time instant $t_8$ to a time instant $t_9$, a time interval from a time instant $t_{10}$ to a time instant $t_{11}$ are equal in length. A time interval from a time instant $t_1$ to a time instant $t_2$, a time interval from a time instant $t_3$ to a time instant $t_4$, a time interval from a time instant $t_5$ to a time instant $t_6$, a time interval from a time instant $t_7$ to a time instant $t_8$, a time interval from a time instant $t_9$ to a time instant $t_{10}$ and a time interval from a time instant $t_{11}$ to a time instant $t_{12}$ are equal in length.

It can be seen from FIG. 32 that at any time instant in a time period during which the four-level full-bridge DC to DC converter operates, three switched-capacitor units each have two power switches that are in the turn-on state. For each of the three switched-capacitor units, one power switch in the first branch and one power switch in the second branch are on, so that a voltage across each of the switched-capacitor units is equal to one-third of the DC input voltage Vin, that is, ⅓×Vin. In a full-bridge converter according to the conventional technology, a voltage across a single switched-capacitor unit is equal to the DC input voltage Vin. Therefore, a withstand voltage of a power switch in each of the switched-capacitor units is reduced. It can be seen that with the four-level full-bridge DC to DC converter, a withstand voltage of each of the power switches is reduced. Therefore, the power switches each are implemented by a switching device with a low withstand voltage. Moreover, in a case that each of the power switches operates at a frequency fs, an equivalent switching frequency for the inductor current is equal to 6×fs. Therefore, in the eighteenth embodiment, the first inductor L1 is implemented by an inductor with small inductance, and a ripple of the output capacitor Co is small.

In the eighteenth embodiment, the AC to DC conversion circuit further includes a first control circuit. The first control circuit controls an operation state of the four-level full-bridge DC to DC converter in two manners, to perform the power factor correction. The first control circuit with a first structure according to the eighteenth embodiment is the same as the first control circuit with the first structure according to the tenth embodiment, and the first control circuit with a second structure according to the eighteenth embodiment is the same as the first control circuit with the second structure according to the tenth embodiment. Therefore, the first control circuit according to the eighteenth embodiment is not described in detail herein.

Figure 33:
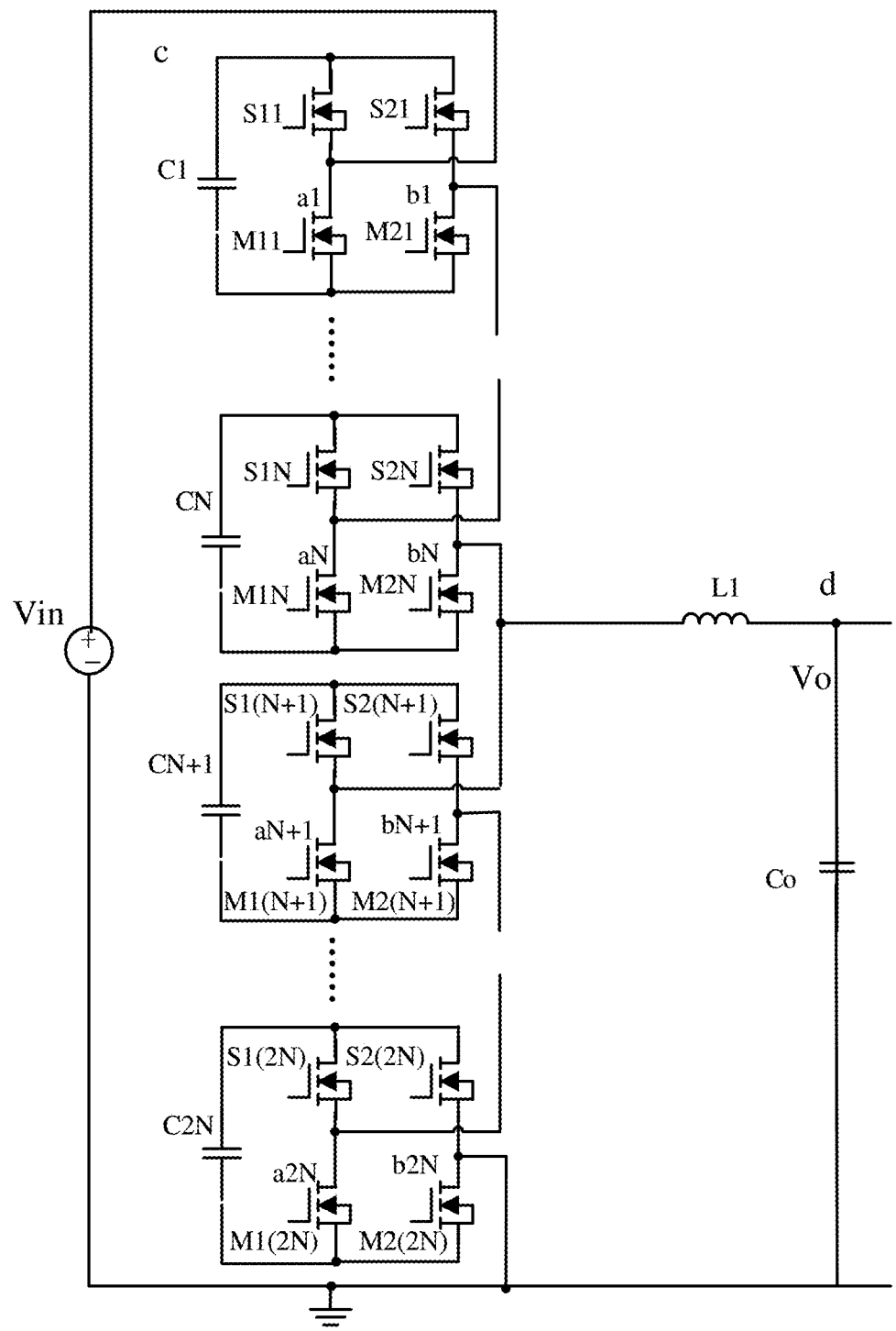
FIG. 33 is a schematic circuit diagram of a first DC to DC conversion module according to a nineteenth embodiment of the present disclosure.

In eighteenth embodiment, the first DC to DC conversion module is implemented by a four-level full-bridge DC to DC converter. In another embodiment, the first DC to DC conversion module is implemented by a full-bridge DC to DC converter with another level. Reference is made to FIG. 33, which a schematic circuit diagram of a first DC to DC conversion module according to a nineteenth embodiment of the present disclosure. The first DC to DC conversion module is implemented by an (N+1)-level full-bridge DC to DC converter, and N is greater than 1.

The (N+1)-level full-bridge DC to DC converter includes 2N switched-capacitor units and a first inductor L1. An i-th switched-capacitor unit includes four power switches S1$i$, M1$i$, S2$i$ and M2$i$, and a first capacitor Ci, where i ranges from 1 to 2N. A power switch S1$i$ is connected in series with a power switch M1$i$ to form a first branch. A power switch S2$i$ is connected in series with a power switch M2$i$ to form a second branch. The first capacitor Ci is connected in parallel with the first branch and the second branch. A 1st first intermediate node a1 is coupled to a high potential input terminal c of the first DC to DC conversion module, and receives the DC input voltage Vin. A 2N-th second intermediate node b2N is grounded. An m-th second intermediate node bm is coupled to an (m+1)-th first intermediate node am+1. A first terminal of the first inductor L1 is coupled to an N-th second intermediate node bN. A second terminal of the first inductor L1 is coupled to a high potential output terminal d of the first DC to DC conversion module. A first intermediate node ai is a common terminal of the power switch S1$i$ and the power switch M1$i$ in the first branch. A second intermediate node bi is a common terminal of the power switch S2$i$ and the power switch M2$i$ in the second branch, where i ranges from 1 to 2N, and m is greater than 1 and less than 2N. a low potential input terminal of the first DC to DC conversion module is grounded. A low potential output terminal of the first DC to DC conversion module is grounded. In an embodiment, the (N+1)-level full-bridge DC to DC converter further includes an output capacitor Co. The output capacitor Co is coupled between the high potential output terminal d of the first DC to DC conversion module and the ground.

At any time instant in a time period during which the (N+1)-level full-bridge DC to DC converter operates, N switched-capacitor units each have two power switches that are in the turn-on state. For each of the N switched-capacitor units, one power switch in the first branch and one power switch in the second branch are on, so that a voltage across each switched-capacitor unit is equal to the DC input voltage Vin divided by N, that is, 1/N×Vin. In a full-bridge converter according to the conventional technology, a voltage across a single switched-capacitor unit is equal to the DC input voltage Vin. Therefore, a withstand voltage of a power switch in each of the switched-capacitor units is reduced. It can be seen that with the (N+1)-level full-bridge DC to DC converter, a withstand voltage of each of the power switches is reduced. Therefore, the power switches are each implemented by a switching device with a low withstand voltage. Moreover, in a case that each of the power switches operates at a frequency fs, an equivalent switching frequency for the inductor current is equal to 2N×fs. Therefore, in the nineteenth embodiment, the first inductor L1 is implemented by an inductor with small inductance, and a ripple of the output capacitor Co is small.

The AC to DC conversion circuit further includes a first control circuit. The first control circuit is configured to control an operation state of the (N+1)-level full-bridge DC to DC converter, to perform the power factor correction. The first control circuit controls an operation state of the multi-level DC to DC converter in two manners, to perform the power factor correction. The first control circuit with a first structure according to the nineteenth embodiment is the same as the first control circuit with the first structure according to the eleventh embodiment, and the first control circuit with a second structure according to the nineteenth embodiment is the same as the first control circuit with the eleventh structure according to the tenth embodiment. Therefore, the first control circuit according to the nineteenth embodiment is not described in detail herein.

Figure 34:
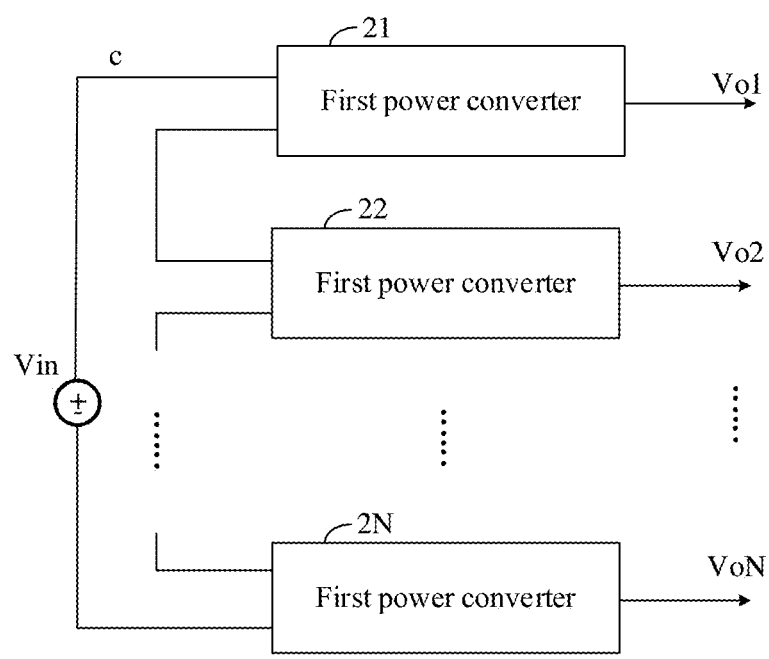
FIG. 34 is a block diagram showing a second example of a first DC to DC conversion module according to an embodiment of the present disclosure.

FIG. 34 is a block diagram showing a second example of the first DC to DC conversion module according to an embodiment of the present disclosure. The first DC to DC conversion module 2 includes N first power converters 21 to 2N. Input ends of the N first power converters 21 to 2N are connected in series between a high potential input terminal c of the first DC to DC conversion module and the ground. The first DC to DC conversion module includes N output ends. Output ends of the N first power converters 21 to 2N serve as the N output ends of the first DC to DC conversion module to obtain output voltages Vo1 to VoN of the first DC to DC conversion module, respectively. In the case that the first DC to DC conversion module 2 includes N first power converters 21 to 2N, the second DC to DC conversion module 3 is implemented by N isolated DC to DC converters. Input ends the N isolated DC to DC converters are independent of each other, and are coupled to the output ends of the N first power converters 21 to 2N, respectively.

The first power converter is a non-isolated power converter. In an embodiment, the first power converter is implemented by one of a buck converter, a boost converter, a buck-boost converter, a cuk Converter, a sepic converter, a zeta converter, a half-bridge converter and a full-bridge converter.

The first power converters described above each include at least one first power switch and at least one second power switch. In the first power converter, all the first power switches are turned on or off simultaneously, all the second power switches are turned on or off simultaneously, and the switching state of the first power switch is complementary to the switching state of the second power switch. For example, a buck circuit includes a first power switch and a second power switch, and the switching state of the first power switch is complementary to the switching state of the second power switch.

It should be noted that the N first power converters may include the same non-isolated power converter, for example, N buck converters. Alternatively, the N first power converters include various non-isolated power converters. For example, the N first power converters include both a boost converter and a buck converter, or the like, which is not limited in the present disclosure.

In practice, a voltage across each of power switches in the first DC to DC conversion module 2 including N first power converters 21 to 2N is equal to 1/N of a voltage across a single power switch in a first DC to DC conversion module according to the conventional technology including only one first power converter, so that a withstand voltage of each power switch is reduced. At any time instant in a time period during which the first DC to DC module 2 operates, at least N power switches are in the turn-on state, that is, each of the N first power converters 21 to 2N has at least one power switch that is on, so that a voltage (that is, a withstand voltage) of each power switch is reduced.

Based on the block diagram showing the second example of the first DC to DC conversion module, the AC to DC conversion circuit further includes N first control circuits. The N first control circuits are configured to control operation states of the N first power converters 21 to 2N respectively, to perform the power factor correction.

Each of the N first control circuits performs control in two manners. The first control circuit with a first structure is similar to the first control circuit with the first structure in the first embodiment, and the first control circuit with a second structure is similar to the first control circuit with the second structure in the first embodiment. The first control circuit is described in combination with a twentieth embodiment below, which is not limited in the present disclosure.

Figure 35:
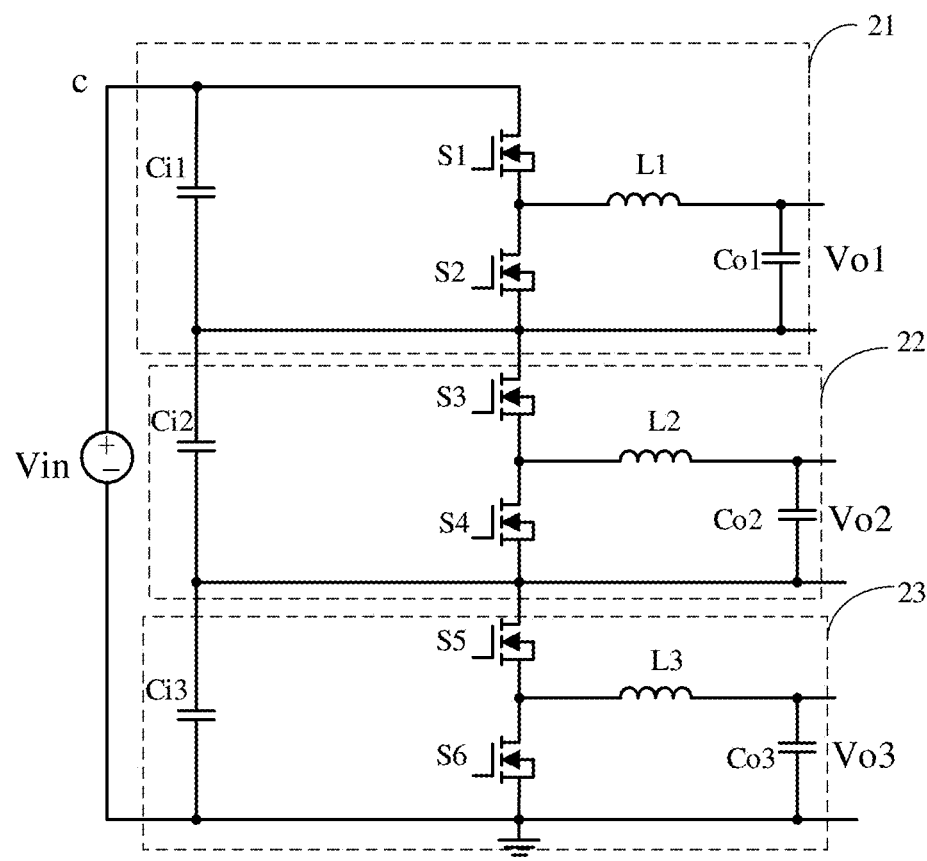
FIG. 35 is a schematic circuit diagram of a first DC to DC conversion module according to a twentieth embodiment of the present disclosure.

FIG. 35 is a schematic circuit diagram of a first DC to DC conversion module according to a twentieth embodiment of the present disclosure. The first DC to DC conversion module includes three buck converters 21 to 23. Input ends of the three buck converters 21 to 23 are connected in series between a high potential input terminal c of the first DC to DC conversion module and the ground. The first DC to DC conversion module has three output ends, that is, an output end of each of the three buck converters 21 to 23. The three output ends output voltages Vo1 to Vo3 of the first DC to DC conversion module, respectively.

When the first DC to DC conversion module 2 including three buck converters 21 to 23 operates, a voltage across each of power switches is ⅓ of a voltage across each of power switches when a first DC to DC conversion module 2 according to the conventional technology including only one buck converter operates, so as to reduce a withstand voltage of each of power switches.

The AC to DC conversion circuit further includes three first control circuits. The three first control circuits are configured to control operation states of the three buck converters 21 to 23 respectively, to perform the power factor correction.

In the twentieth embodiment, three first control circuits each have two structures. The first control circuit with a first structure is similar to the first control circuit with the first structure according to the first embodiment, with a difference in that a structure of a PWM generation module 44 according to the twentieth embodiment is different from the structure of the PWM generation module 44 according to the first embodiment. The PWM generation module 44 according to the twentieth embodiment is configured to control switching states of power switches S1 and S2 (or S3 and S4 or S5 and S6). In the twentieth embodiment, the PWM generation module 44 includes a conduction control circuit 441 and a turn-off control circuit 442. The conduction control circuit 441 is configured to turn on the power switch S1 (or S3 or S5). In an embodiment, a time instant when the power switch S1 (or S3 or S5) is turned on is determined based on a clock signal. The turn-off control circuit 442 receives the first duty cycle signal D, and is configured to determine a time instant when the power switch S1 (or S3 or S5) is turned off based on the first duty cycle signal D. The conduction control circuit 441 and the turn-off control circuit 442 are further configured to control the switching state of the power switch S2 (or S4 or S6), so that the switching state of the power switch S2 is complementary to the switching state of the power switch S1, the switching state of the power switch S4 is complementary to the switching state of the power switch S3, and the switching state of the power switch S6 is complementary to the switching state of the power switch S5.

The first control circuit with a second structure according to the twentieth embodiment is similar to the first control circuit with the second structure according to the first embodiment, with a difference in that a structure of a conduction control circuit 61 according to the twentieth embodiment is different from the structure of the conduction control circuit 61 according to the first embodiment, and the conduction control circuit 61 according to the twentieth embodiment is configured to control switching states of the power switches S1 and S2 (or S3 and S4 or S5 and S6). In the twentieth embodiment, the first control circuit includes a conduction control circuit 61 and a turn-off control circuit 62. The conduction control circuit 61 receives an inductor current IL, and generates a conduction trigger signal when the inductor current IL is equal to zero, to control the power switch S1 (or S3, or S5) to be turned on. The turn-off control circuit 62 receives the output voltage sampling signal SVout and the first proportional coefficient K1 to generate a conduction duration signal Ton, and determines a time instant when the power switches S1 (or S3, or S5) is turned off based on the conduction duration signal Ton. The conduction control circuit 61 and the turn-off control circuit 62 are further configured to control the switching state of the power switch S2 (or S4, or S6), so that the switching state of the power switch S2 is complementary to the switching state of the power switch S1, the switching state of the power switch S4 is complementary to the switching state of the power switch S3, and the switching state of the power switch S6 is complementary to the switching state of the power switch S5.

Further, the second DC to DC conversion module 3 according to the present disclosure is implemented by an isolated DC to DC converter for electrical isolation. In an embodiment, the second DC to DC conversion module 3 is configured to perform output voltage stabilization or output constant current, which is not limited in the present disclosure.

In an embodiment, the second DC to DC conversion module 3 includes N second power converters, and N is greater than 1. Each of the second power converters is an isolated DC to DC converter for electrical isolation. The second power converter is implemented by one of a flyback converter, a forward converter, an isolated cuk Converter, an isolated sepic converter, an isolated zeta converter, a PWM half-bridge converter, a PWM full-bridge converter, a half-bridge resonant converter and a full-bridge resonant converter.

Figure 36:
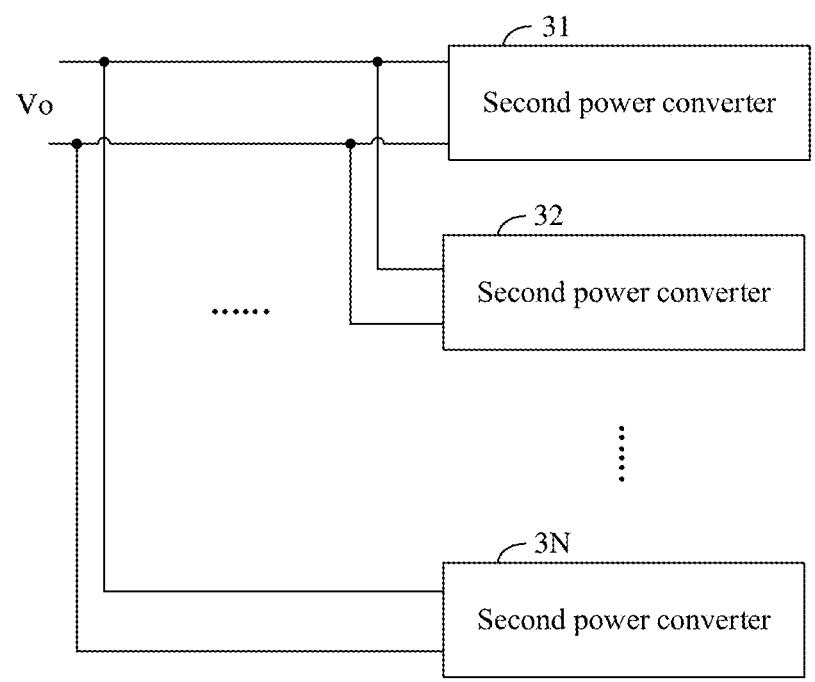
FIG. 36 is a block diagram showing a first example of a second DC to DC conversion module according to the embodiments of the present disclosure.
Figure 37:
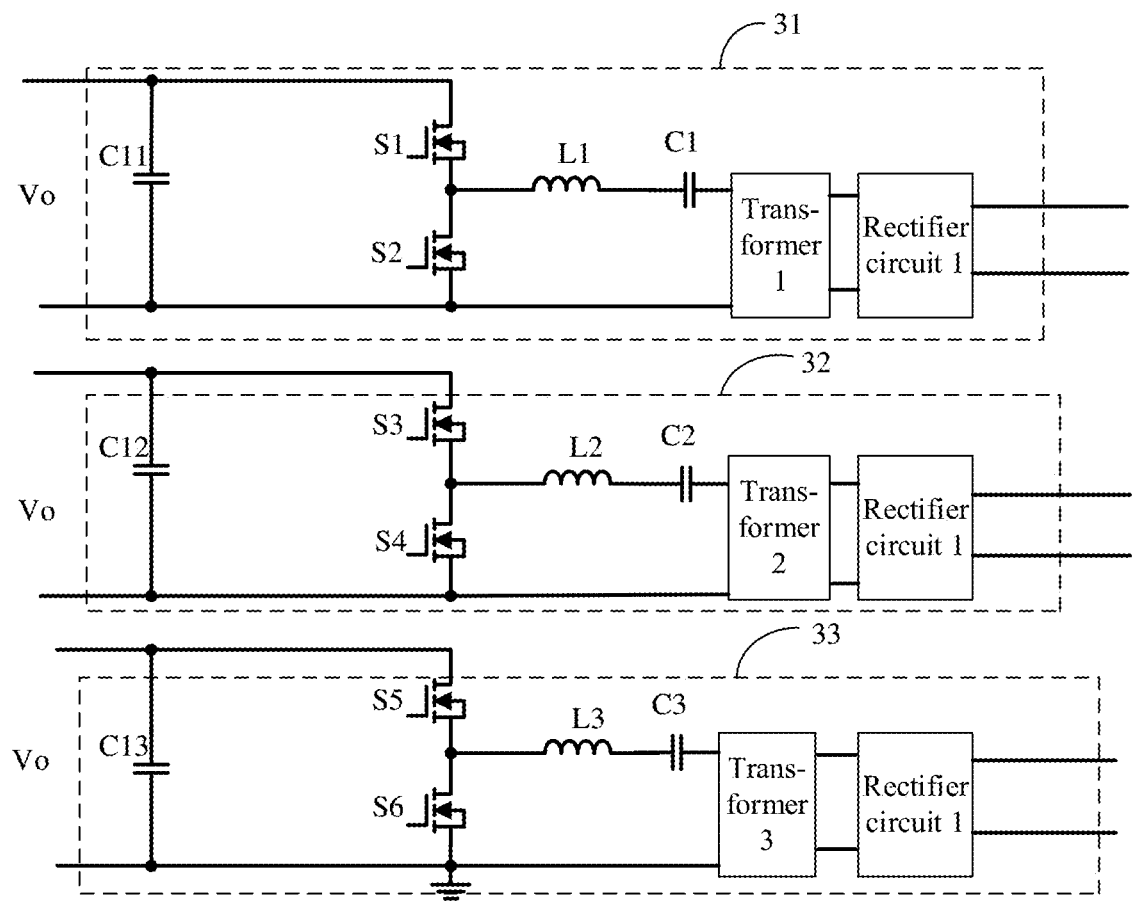
FIG. 37 is a schematic circuit diagram of the second DC to DC conversion module according to a first embodiment of the present disclosure.

FIG. 36 is a block diagram showing a first example of the second DC to DC conversion module according to the present disclosure. The second DC to DC conversion module 3 includes N second power converters 31 to 3N. In a case that the first DC to DC conversion module 2 includes a multi-level DC to DC converter, input ends of the N second power converters 31 to 3N are connected in parallel to receive a voltage Vo outputted by the multi-level DC to DC converter. Output ends of the N second power converters are independent of each other, or connected in series or connected in parallel. In a case that the input ends of the N second power converters 31 to 3N in the second DC to DC conversion module 3 are connected in parallel, a current outputted by each of the second power converters is small, so that circuit loss is small, efficiency is improved and output power is increased. FIG. 37 is a schematic circuit diagram of the second DC to DC conversion module according to a first embodiment of the present disclosure. The second DC to DC conversion module 3 includes three half-bridge resonant converters 31 to 33. Input ends of the three half-bridge resonant converters 31 to 33 are connected in parallel to receive the voltage Vo outputted by the multi-level DC to DC converter. Output ends of the three half-bridge resonant converters 31 to 33 are independent of each other, or connected in series or connected in parallel.

Figure 38:
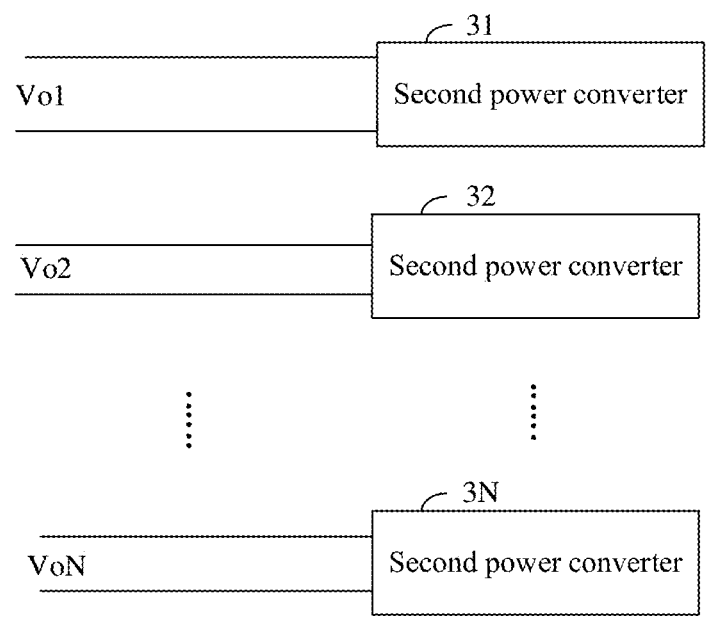
FIG. 38 is a block diagram showing a second example of the second DC to DC conversion module according to the embodiments of the present disclosure.
Figure 39:
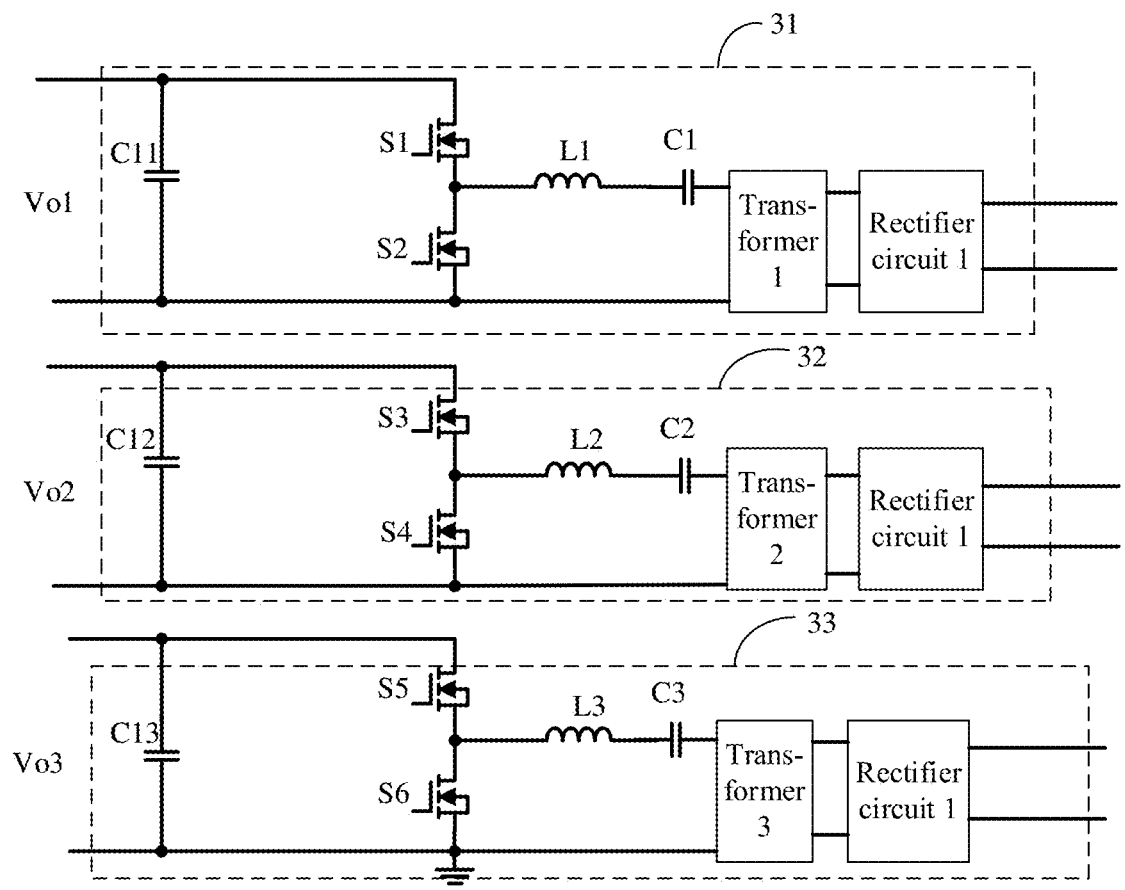
FIG. 39 is a schematic circuit diagram of a second DC to DC conversion module according to a second embodiment of the present disclosure.

FIG. 38 is a block diagram showing a second example of the second DC to DC conversion module according to the present disclosure. The second DC to DC conversion module 3 includes N second power converters 31 to 3N. In a case that the first DC to DC conversion module 2 includes N first power converters 21 to 2N, input ends of the N second power converters 31 to 3N are coupled to output ends of the N first power converters 21 to 2N, to receive voltages Vo1 to VoN outputted by the first power converter 21 to 2N, respectively. Output ends of the N second power converters are independent of each other, or connected in series or connected in parallel. In a case that the input ends of the N second power converters 31 to 3N in the second DC to DC conversion module 3 are respectively coupled to the output ends of the N first power converters 21 to 2N, a current outputted by each of the second power converters is small, so that the circuit loss is small, the efficiency is improved and the output power is increased. FIG. 39 is a schematic circuit diagram of the second DC to DC conversion module according to the second embodiment of the present disclosure. The second DC to DC conversion module 3 includes three half-bridge resonant converters 31 to 33. Input ends of the three half-bridge resonant converters 31 to 33 are coupled to the output ends of three first power converters 21 to 23, to receive voltages Vo1 to Vo3 outputted by the first power converters 21 to 23, respectively. Output ends of the three half-bridge resonant converters 31 to 33 are independent of each other, or connected in series or connected in parallel.

Further, the output ends of the N second power converters are connected depending on the load to be driven. For example, in a case that the AC to DC conversion circuit according to the present disclosure drives multiple loads, the output ends of the N second power converters are independent of each other. The output ends of the N second power converters each output a driving voltage, so as to drive N loads. In a case that a load requires a high driving voltage, the output ends of the N second power converters are connected in series to generate a high driving voltage to drive the load. In a case that a load requires a large driving current, the output ends of the N second power converters are connected in parallel to generate a large driving current to drive the load. The present disclosure is not limited hereto. In a case that the output ends of the N second power converters 31 to 3N are connected in series or in parallel, operation states of two adjacent second power converters 3$i$ and 3$i$+1 (where i ranges from 1 to N−1) are under a phase-shift control, to reduce an output ripple.

Figure 40:
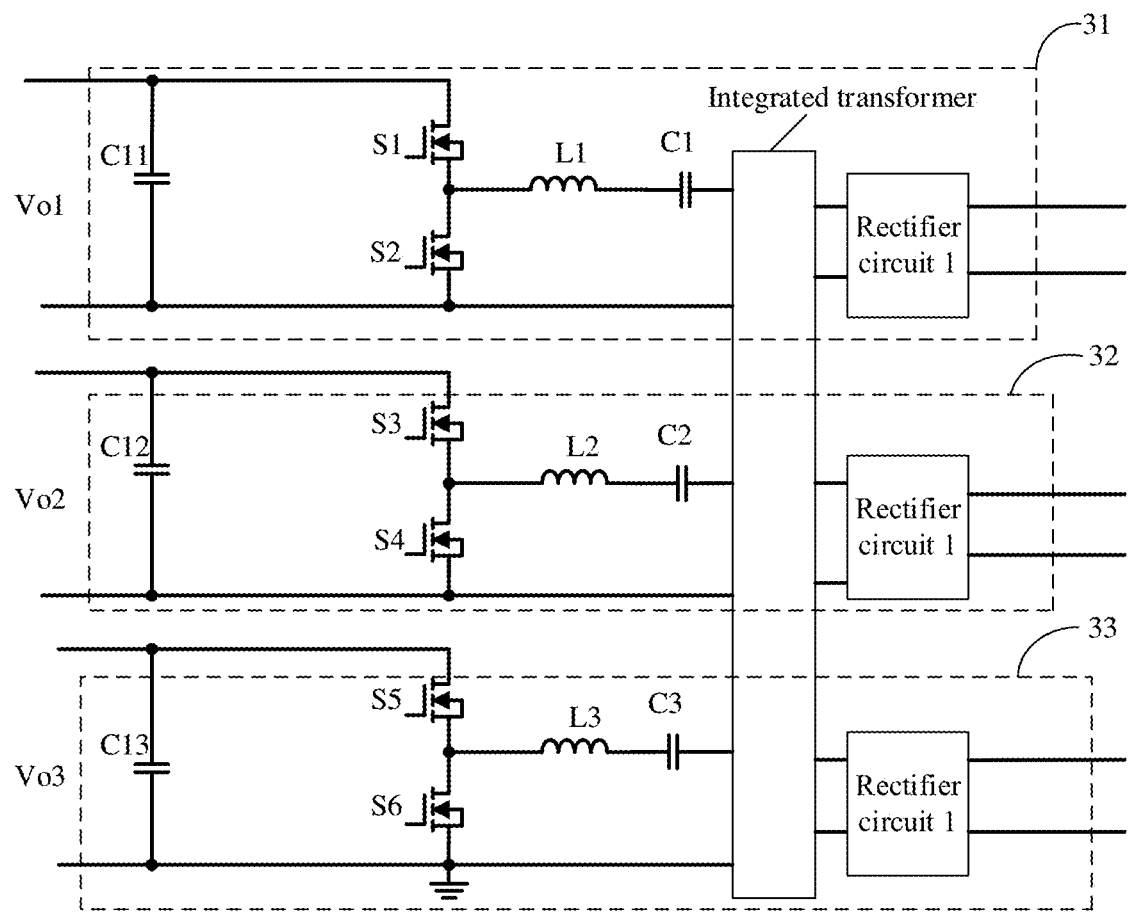
FIG. 40 is a schematic circuit diagram of a second DC to DC conversion module according to a third embodiment of the present disclosure.

N transformers in respective second power converters are integrated into an N-phase integrated transformer with a single magnetic core by utilizing the magnetic integration technology, to further reduce a volume and improve power density. As shown in FIG. 40, the three transformers 1 to 3 respectively in the three half-bridge resonant converters 31 to 33 shown in FIG. 39 are integrated into a 3-phase integrated transformer with a single magnetic core by utilizing the magnetic integration technology.

Further, the AC to DC conversion circuit further includes a second control circuit. The second control circuit is configured to control operation states of the N second power converters, to control a signal outputted by the second DC to DC conversion module. The signal output by the second DC to DC conversion module serves as a first output signal. The first output signal is an output voltage signal or an output current signal, for performing the output voltage stabilization or output constant current.

Although the above embodiments are described and explained separately, there are some common technologies between different embodiments. Those skilled in the art may replace and integrate these embodiments. For details not clearly described in an embodiment, reference is made to relevant description in another embodiment.

The embodiments of the present disclosure are described above. Not all details are described in the embodiments, and the present disclosure is not limited to the described embodiments. Apparently, numerous modifications and variations may be made based on the above descriptions. The embodiments are selected and described in the specification to explain the principle and practical applications of the present disclosure well, so that those skilled in the art can make good use of the present disclosure and make modifications based on the present disclosure. The present disclosure is limited only by the claims, full scope and equivalents thereof.

The invention claimed is:

1. An alternating current (AC) to direct current (DC) conversion circuit, comprising:
   a rectifier circuit, a first direct current to direct current (DC to DC) conversion module and a second DC to DC conversion module; wherein,
   the rectifier circuit is configured to receive an AC input voltage, convert the AC input voltage into a DC input voltage, and output the converted DC input voltage;
   an input end of the first DC to DC conversion module is coupled to an output end of the rectifier circuit, an output end of the first DC to DC conversion module is coupled to an input end of the second DC to DC conversion module, and the first DC to DC conversion module is configured to perform power factor correction, so that a waveform of an input current of the first DC to DC conversion module corresponds to a waveform of the DC input voltage, wherein the first DC to DC conversion module comprises N first power converters each comprising an input end, and input ends of the N first power converters are connected in series to receive the DC input voltage, to reduce a voltage across each power switch in the first DC to DC conversion module, wherein N is a positive integer; and
   an output end of the second DC to DC conversion module is coupled to a load, and the second DC to DC conversion module is configured to convert a signal outputted by the first DC to DC conversion module into a first output signal, to drive the load, wherein the input ends of the N first power converters are connected in series between a high potential input terminal of the first DC to DC conversion module and a ground, the N first power converters each comprise an output end, and output ends of the N first power converters serve as N output ends of the first DC to DC conversion module correspondingly.

2. The alternating current to direct current conversion circuit according to claim 1, wherein
   each of the N first power converters is a non-isolated DC to DC converter.

3. The alternating current to direct current conversion circuit according to claim 1, wherein
   for each of the N first power converters, at least one power switch in the first power converter is controlled to be turned on, to reduce a voltage across each power switch.

4. The alternating current to direct current conversion circuit according to claim 1, further comprising:
   N first control circuits configured to control the N first power converters respectively, wherein each of the N first control circuits is configured to control a first power converter corresponding to the first control circuit to operate at a fixed frequency or a variable frequency.

5. The alternating current to direct current conversion circuit according to claim 1, further comprising:
   N first control circuits configured to control the N first power converters respectively, wherein
   each of the N first control circuits is configured to:
   generate a first duty cycle signal based on an output voltage sampling signal, an input voltage sampling signal and an inductor current sampling signal of a first power converter corresponding to the first control circuit; and generate a control signal based on the first duty cycle signal, to control each power switch in the first power converter to be turned on or off, wherein the first duty cycle signal indicates a duty cycle correspondingly of the power switch.

6. The alternating current to direct current conversion circuit according to claim 5, wherein each of the N first control circuits comprises:
   a voltage compensation module configured to receive the output voltage sampling signal and a voltage reference signal, and generate a voltage compensation signal;
   a current reference signal generation module configured to receive the voltage compensation signal and the input voltage sampling signal, and generate a current reference signal; and
   a current compensation module configured to receive the current reference signal and the inductor current sampling signal, and output the first duty cycle signal,
   wherein the current reference signal is positively correlated with a product of the voltage compensation signal and the input voltage sampling signal.

7. The alternating current to direct current conversion circuit according to claim 6, wherein
   each of the N first power converters comprises at least one first power switch and at least one second power switch, the at least one first power switch is configured to be turned on or off simultaneously, the at least one second power switch is configured to be turned on or off simultaneously, and a switching state of the first power switch is complementary to a switching state of the second power switch.

8. The alternating current to direct current conversion circuit according to claim 7, wherein each of the N first control circuits further comprises:
   a pulse-width modulation (PWM) generation module configured to generate the control signal based on the first duty cycle signal, to control the power switch in the first power converter corresponding to the first control circuit to be turned on or off, and wherein the PWM generation module comprises:
   a conduction control circuit configured to determine, based on a clock signal, a time instant when the first power switch in the first power converter is turned on; and
   a turn-off control circuit configured to receive the first duty cycle signal and determine, based on the first duty cycle signal, a time instant when the first power switch in the first power converter is turned off; wherein
   the conduction control circuit and the turn-off control circuit are further configured to control the second power switch in the first power converter, so that the switching state of the second power switch is complementary to the switching state of the first power switch.

9. The alternating current to direct current conversion circuit according to claim 1, further comprising:
   N first control circuits configured to control the N first power converters respectively, wherein each of the N first control circuits is configured to determine, for each power switch in a first power converter corresponding to the first control circuit and based on an output voltage sampling signal and an inductor current of the first power converter, a time instant when the power switch is turned on and a time instant when the power switch is turned off.

10. The alternating current to direct current conversion circuit according to claim 9, wherein
    each of the N first power converters comprises at least one first power switch and at least one second power switch, all the at least one first power switch is configured to be turned on or off simultaneously, all the at least one second power switch is configured to be turned on or off simultaneously, and a switching state of the first power switch is complementary to a switching state of the second power switch.

11. The alternating current to direct current conversion circuit according to claim 10, wherein each of the first control circuit comprises:

a conduction control circuit configured to receive the inductor current, and generate a conduction trigger signal when the inductor current is equal to zero, to control the at least one first power switch in the first power converter corresponding to the first control circuit to be turned on; and a turn-off control circuit configured to receive the output voltage sampling signal and a first proportional coefficient, generate a conduction duration signal, and determine, based on the conduction duration signal, a time instant when the at least one first power switch in the first power converter is turned off, wherein the conduction control circuit and the turn-off control circuit are further configured to control the second power switch in the first power converter, so that the switching state of the second power switch is complementary to the switching state of the first power switch.

12. The alternating current to direct current conversion circuit according to claim 11, wherein the turn-off control circuit comprises:

a voltage compensation circuit configured to receive the output voltage sampling signal and a voltage reference signal, and generate a voltage compensation signal;

a conduction duration generation circuit configured to receive the voltage compensation signal and the first proportional coefficient, and generate the conduction duration signal; and a conduction duration timer configured to start timekeeping from a time instant at which the at least one first power switch in the first power converter is turned on, and turn off the at least one first power switch when recorded duration matches the conduction duration signal, wherein the conduction duration signal is positively correlated with a product of the voltage compensation signal and the first proportional coefficient.

13. The alternating current to direct current conversion circuit according to claim 1, wherein the second DC to DC conversion module comprises N second power converters each comprising an input end, and input ends of the N second power converters are coupled to output ends of the N first power converters respectively, wherein N is integer greater than 1.

14. The alternating current to direct current conversion circuit according to claim 13, wherein the N second power converters each comprise an output end, and output ends of the N second power converters are independent of each other, or connected in series, or in parallel.

15. The alternating current to direct current conversion circuit according to claim 13, wherein each of the N second power converters is an isolated DC to DC converter, for electrical isolation.

16. The alternating current to direct current conversion circuit according to claim 13, wherein the N second power converters each comprise a transformer, and N transformers of the N second power converters are integrated into an N-phase integrated transformer with a single magnetic core.

17. The alternating current to direct current conversion circuit according to claim 13, wherein in a case that the output ends of the N second power converters are connected in series or in parallel, two adjacent second power converters are under a phase-shifted control, to reduce an output ripple.

18. The alternating current to direct current conversion circuit according to claim 13, further comprising:

a second control circuit configured to control operation states of the N second power converters, to control the first output signal outputted by the second DC to DC conversion module to drive the load.

* * * * *